(12) United States Patent
Hotta et al.

(10) Patent No.: US 12,522,818 B2
(45) Date of Patent: Jan. 13, 2026

(54) METHOD FOR INDUCING DELETION IN GENOMIC DNA

(71) Applicants: The University of Osaka, Suita (JP); Kyoto University, Kyoto (JP)

(72) Inventors: Akitsu Hotta, Kyoto (JP); Yuya Okuzaki, Kyoto (JP); Huaigeng Xu, Kyoto (JP); Peter David Gee, Kyoto (JP); Yuto Kita, Kyoto (JP); Tomoji Mashimo, Suita (JP); Kazuto Yoshimi, Suita (JP)

(73) Assignees: The University of Osaka, Osaka (JP); Kyoto University, Kyoto (JP)

( * ) Notice: Subject to any disclaimer, the term of this patent is extended or adjusted under 35 U.S.C. 154(b) by 966 days.

(21) Appl. No.: 17/309,607

(22) PCT Filed: Dec. 11, 2019

(86) PCT No.: PCT/JP2019/048426
§ 371 (c)(1),
(2) Date: Jun. 9, 2021

(87) PCT Pub. No.: WO2020/122104
PCT Pub. Date: Jun. 18, 2020

(65) Prior Publication Data
US 2022/0017888 A1 Jan. 20, 2022

Related U.S. Application Data

(60) Provisional application No. 62/938,346, filed on Nov. 21, 2019.

(30) Foreign Application Priority Data

Dec. 11, 2018 (JP) .................................. 2018-231649

(51) Int. Cl.
*C12N 15/10* (2006.01)
*C12N 9/22* (2006.01)

(52) U.S. Cl.
CPC ............ *C12N 15/102* (2013.01); *C12N 9/22* (2013.01); *C12N 2310/20* (2017.05)

(58) Field of Classification Search
CPC ..... C12N 15/102; C12N 9/22; C12N 2310/20
See application file for complete search history.

(56) References Cited

U.S. PATENT DOCUMENTS

2018/0334688 A1* 11/2018 Gersbach ................. C12N 9/22

FOREIGN PATENT DOCUMENTS

| WO | 2017066497 A2 | 4/2017 | |
|---|---|---|---|
| WO | 2018005556 A1 | 1/2018 | |
| WO | 2018098480 A1 | 5/2018 | |
| WO | 2018129296 A1 | 7/2018 | |
| WO | 2018175733 A1 | 9/2018 | |
| WO | 2018198077 A2 | 11/2018 | |
| WO | 2018204493 A1 | 11/2018 | |
| WO | 2018213708 A1 | 11/2018 | |
| WO | WO-2018225858 A1 * | 12/2018 | .......... A01K 67/027 |
| WO | 2019039417 A1 | 2/2019 | |
| WO | 2019246555 A1 | 12/2019 | |

OTHER PUBLICATIONS

Mosaad, Y M. "Clinical Role of Human Leukocyte Antigen in Health and Disease." Scandinavian journal of immunology vol. 82,4 (2015): 283-306. doi:10.1111/sji.12329 (Year: 2015).*
Translation of WO2018225858-A, obtained from Google Patents on Mar. 12, 2024, https://patents.google.com/patent/WO2018225858A1/en?oq=WO2018225858 (Year: 2018).*
Li, Hongmei Lisa, et al. "Precise correction of the dystrophin gene in duchenne muscular dystrophy patient induced pluripotent stem cells by TALEN and CRISPR-Cas9." Stem cell reports 4.1 (2015): 143-154. (Year: 2015).*
Office Action for Japanese Patent Application No. 2020-559274, mailed Jun. 27, 2023 (13 pages).
Prarthana Mohanraju et al., Diverse evolutionary roots and mechanistic variations of the CRISPR-Cas systems, Science, 353 (6299), ad5147, 2016.
Edze R. Westra et al., CRISPR immunity relies on the consecutive binding and degradation of negatively supercoiled Invader DNA by Cascade and Cas3, Mol Cell, 2012, 46 (5): 595-605.
Hideto Matsui et al., Delivery of Full-Length Factor VIII Using a piggyBac Transposon Vector to Correct a Mouse Model of Hemophilia A, Plos One, 9 (8), e104957, 2014.
Kentaro Ishida et al., Site-specific randomization of the endogenous genome by a regulatable CRISPR-Cas9 piggyBac system in human cells, Scientific Reports, 2018, 8 (1), 310.
Prashant Mali et al., RNA-Guided Human Genome Engineering via Cas9, Science. 2013, 339 (6121): 823-826.
H. Morisaka et al., Genome editing in mammalian cells by Cascade and Cas3, Japanese Society for Investigative Dermatology, May 2017, vol. 137, p. S84.
H. Morisaka et al., Genome editing in mammalian cells by Cascade and Cas3, Programs and abstracts of the 42nd Annual Meeting of the Japanese Society for Investigative Dermatology, Nov. 2017, p. 232.
A.E. Dolan et al., Introducing a Spectrum of Long-Range Genomic Deletions in Human Embryonic Stem Cells Using Type I CRISPR-Cas, Molecular Cell 74, 936-950, 2019.
P. Cameron et al., Harnessing type I CRISPR-Cas systems for genome engineering in human cells, nature biotechnology, vol. 37, 2019, 1471-1477.

(Continued)

*Primary Examiner* — Jennifer Dunston
*Assistant Examiner* — Christina Tran
(74) *Attorney, Agent, or Firm* — KNOBBE, MARTENS, OLSON & BEAR, LLP

(57) ABSTRACT

A production method of genomic DNA in which a deletion of more than 100 bases of nucleotides is introduced into a target region of the genomic DNA, the method includes a contact step of bringing a type I CRISPR associated complex for anti-viral defense (type I Cascade complex), CRISPR RNA (crRNA), and Cas3 protein into contact with the genomic DNA.

3 Claims, 34 Drawing Sheets

Specification includes a Sequence Listing.

(56) References Cited

OTHER PUBLICATIONS

H. Morisaka et al., CRISPR-Cas3 induces broad and unidirectional genome editing in human cells, Nature Communications, 2019, vol. 10:5302.
International Search Report in International Application No. PCT/JP2019/048426, mailed on Mar. 17, 2020 (7 pages).
Bálint at al., "A compact Cascade-Cas3 system for targeted genome engineering," Nature Methods. 2020; 17 (12):1183-90.
Supplementary European Search Report for EP Application No. 19896405.8, mailed on Oct. 4, 2022 (6 pages).

* cited by examiner

FIG. 7
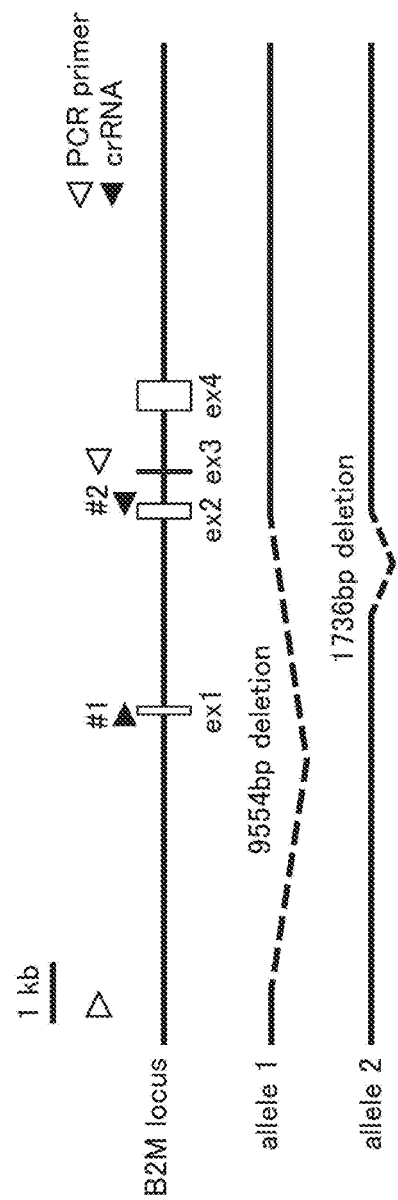
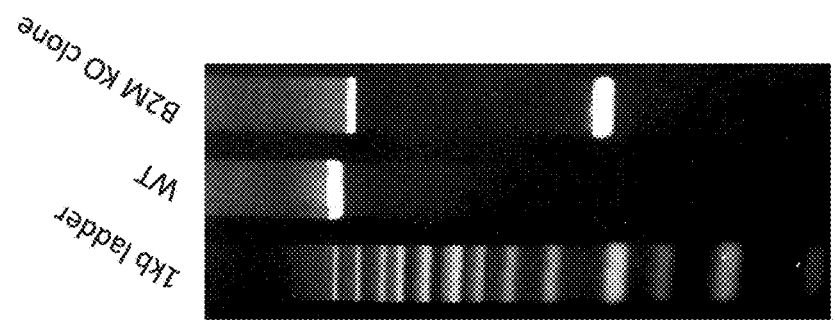

FIG. 29
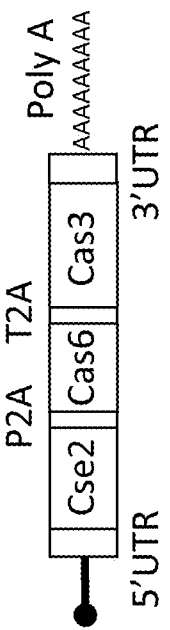
(b)
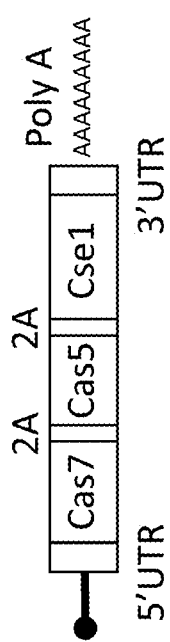
(a)

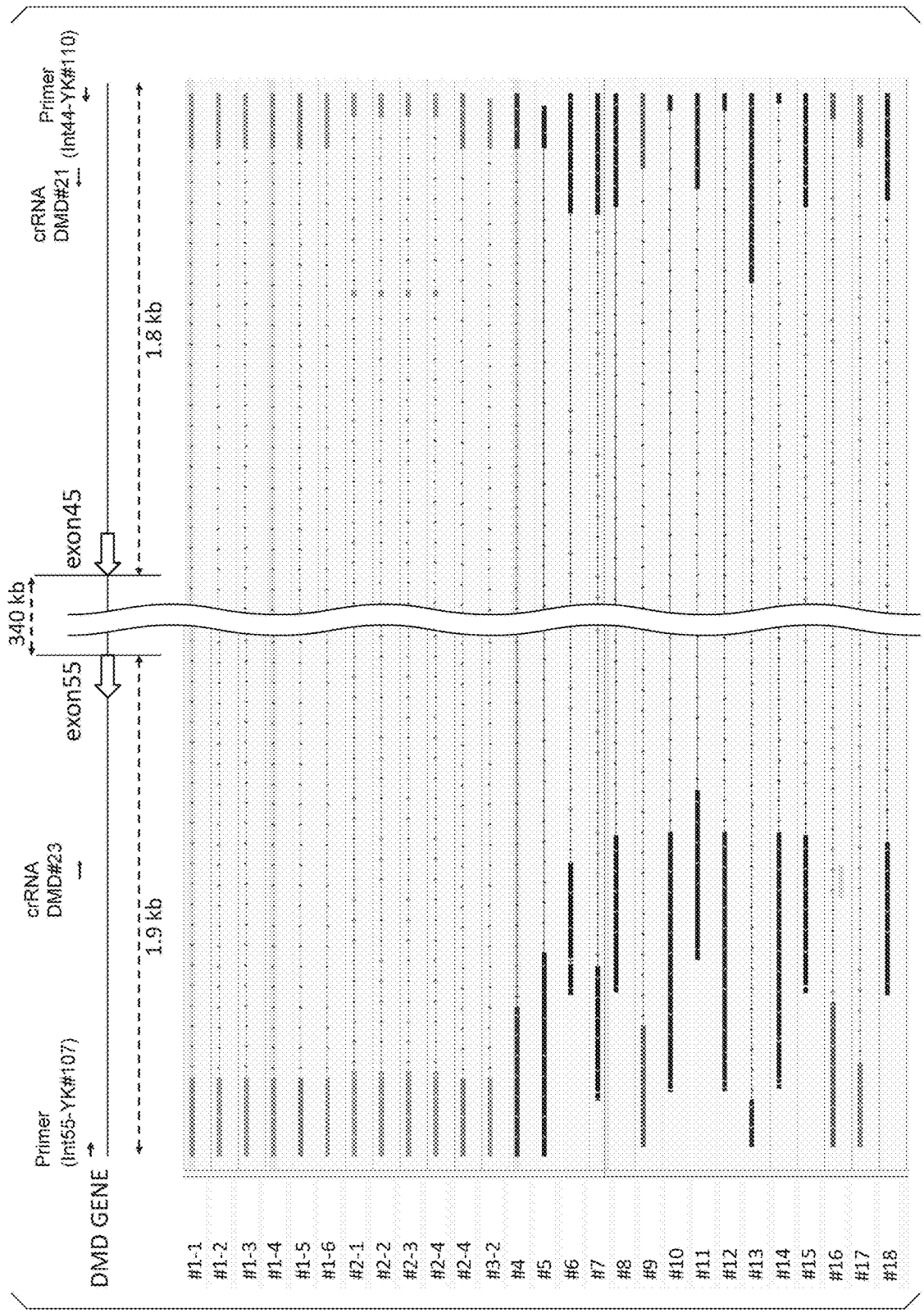

SEQUENCE LISTING

```
<160> NUMBER OF SEQ ID NOS: 111

<210> SEQ ID NO 1
<211> LENGTH: 32
<212> TYPE: DNA
<213> ORGANISM: Homo sapiens

<400> SEQUENCE: 1
gccacggagc gagacatctc ggcccgaatg ct                              32

<210> SEQ ID NO 2
<211> LENGTH: 32
<212> TYPE: DNA
<213> ORGANISM: Homo sapiens

<400> SEQUENCE: 2
atagttaagt ggggtaagtc ttacattctt tt                              32

<210> SEQ ID NO 3
<211> LENGTH: 32
<212> TYPE: DNA
<213> ORGANISM: Homo sapiens

<400> SEQUENCE: 3
ccagcgacgc agtgccaggt tagagagagg ga                              32

<210> SEQ ID NO 4
<211> LENGTH: 32
<212> TYPE: DNA
<213> ORGANISM: Homo sapiens

<400> SEQUENCE: 4
agagagtagc gcgagcacag ctaaggccac gg                              32
```

```
<210> SEQ ID NO 5
<211> LENGTH: 32
<212> TYPE: DNA
<213> ORGANISM: Homo sapiens

<400> SEQUENCE: 5
ggggtgcgca cccgggacgc gcgctacttg cc                                   32

<210> SEQ ID NO 6
<211> LENGTH: 32
<212> TYPE: DNA
<213> ORGANISM: Homo sapiens

<400> SEQUENCE: 6
gcgcggcgct gaggtttgtg aacgcgtgga gg                                   32

<210> SEQ ID NO 7
<211> LENGTH: 32
<212> TYPE: DNA
<213> ORGANISM: Homo sapiens

<400> SEQUENCE: 7
gtggcctggt actcctcctt ctccccacag cc                                   32

<210> SEQ ID NO 8
<211> LENGTH: 32
<212> TYPE: DNA
<213> ORGANISM: Homo sapiens

<400> SEQUENCE: 8
aatcctacag ggtcatgttc ccttctcctg tg                                   32

<210> SEQ ID NO 9
<211> LENGTH: 32
<212> TYPE: DNA
<213> ORGANISM: Homo sapiens

<400> SEQUENCE: 9
cgtgcataag ttaacttcca atttacatac tc                                   32

<210> SEQ ID NO 10
<211> LENGTH: 32
<212> TYPE: DNA
<213> ORGANISM: Homo sapiens

<400> SEQUENCE: 10
atgagtatgc ctgccgtgtg aaccatgtga ct                                   32

<210> SEQ ID NO 11
<211> LENGTH: 28
<212> TYPE: DNA
<213> ORGANISM: Homo sapiens

<400> SEQUENCE: 11
gagagtctga tgcaccctta tgtatgtc                                        28

<210> SEQ ID NO 12
<211> LENGTH: 26
<212> TYPE: DNA
<213> ORGANISM: Homo sapiens

<400> SEQUENCE: 12
catgatgctg cttacatgtc tcgatc                                          26
```

```
<210> SEQ ID NO 13
<211> LENGTH: 181
<212> TYPE: DNA
<213> ORGANISM: Artificial Sequence
<220> FEATURE:
<223> OTHER INFORMATION: Synthesized nucleotide

<400> SEQUENCE: 13
ggatgtgttg tttgtgtgat actataaagt tggtagattg tgactggctt aaaaaatcat    60
taattaataa taggttatgt ttagagtgtt ccccgcgcca gcggggataa accggccacg   120
gagcgagaca tctcggcccg aatgctgtgt tccccgcgcc agcggggata aaccgttttt   180
t                                                                   181

<210> SEQ ID NO 14
<211> LENGTH: 181
<212> TYPE: DNA
<213> ORGANISM: Artificial Sequence
<220> FEATURE:
<223> OTHER INFORMATION: Synthesized nucleotide

<400> SEQUENCE: 14
ggatgtgttg tttgtgtgat actataaagt tggtagattg tgactggctt aaaaaatcat    60
taattaataa taggttatgt ttagagtgtt ccccgcgcca gcggggataa accgatagtt   120
aagtggggta agtcttacat tcttttgtgt tccccgcgcc agcggggata aaccgttttt   180
t                                                                   181

<210> SEQ ID NO 15
<211> LENGTH: 18
<212> TYPE: DNA
<213> ORGANISM: Homo sapiens

<400> SEQUENCE: 15
taacctggca ctgcgtcg                                                  18

<210> SEQ ID NO 16
<211> LENGTH: 20
<212> TYPE: DNA
<213> ORGANISM: Homo sapiens

<400> SEQUENCE: 16
tgggatggga ctcattcagg                                                20

<210> SEQ ID NO 17
<211> LENGTH: 32
<212> TYPE: DNA
<213> ORGANISM: Homo sapiens

<400> SEQUENCE: 17
ctcccttaga ctctcgtttc acatacattt ct                                  32

<210> SEQ ID NO 18
<211> LENGTH: 32
<212> TYPE: DNA
<213> ORGANISM: Homo sapiens

<400> SEQUENCE: 18
gaagacttgg cctttattta ccaaatgaga ct                                  32

<210> SEQ ID NO 19
```

```
<211> LENGTH: 20
<212> TYPE: DNA
<213> ORGANISM: Homo sapiens

<400> SEQUENCE: 19
tatgtgaaac gagagtctaa                                              20

<210> SEQ ID NO 20
<211> LENGTH: 20
<212> TYPE: DNA
<213> ORGANISM: Homo sapiens

<400> SEQUENCE: 20
tagtctcatt tggtaaataa                                              20

<210> SEQ ID NO 21
<211> LENGTH: 30
<212> TYPE: DNA
<213> ORGANISM: Homo sapiens

<400> SEQUENCE: 21
ttcctaatta cagccaaatc cctagctgta                                   30

<210> SEQ ID NO 22
<211> LENGTH: 32
<212> TYPE: DNA
<213> ORGANISM: Homo sapiens

<400> SEQUENCE: 22
tctaaccctc catatgccta agttctacga tt                                32

<210> SEQ ID NO 23
<211> LENGTH: 36
<212> TYPE: DNA
<213> ORGANISM: Homo sapiens

<400> SEQUENCE: 23
acactctaac cctccatatg cctaagttct acgatt                            36

<210> SEQ ID NO 24
<211> LENGTH: 36
<212> TYPE: DNA
<213> ORGANISM: Homo sapiens

<400> SEQUENCE: 24
acacaacgaa agatattcat caatgagttg ttctag                            36

<210> SEQ ID NO 25
<211> LENGTH: 35
<212> TYPE: DNA
<213> ORGANISM: Artificial Sequence
<220> FEATURE:
<223> OTHER INFORMATION: Synthesized nucleotide
<220> FEATURE:
<221> NAME/KEY: misc_feature
<222> LOCATION: (4)..(35)
<223> OTHER INFORMATION: n is a, c, g, or t

<400> SEQUENCE: 25
aagnnnnnnn nnnnnnnnnn nnnnnnnnnn nnnnn                             35

<210> SEQ ID NO 26
<211> LENGTH: 35
<212> TYPE: DNA
<213> ORGANISM: Artificial Sequence
```

-continued

```
<220> FEATURE:
<223> OTHER INFORMATION: Synthesized nucleotide
<220> FEATURE:
<221> NAME/KEY: misc_feature
<222> LOCATION: (4)..(35)
<223> OTHER INFORMATION: n is a, c, g, or t

<400> SEQUENCE: 26
aggnnnnnnn nnnnnnnnnn nnnnnnnnnn nnnnn                               35

<210> SEQ ID NO 27
<211> LENGTH: 520
<212> TYPE: PRT
<213> ORGANISM: Artificial Sequence
<220> FEATURE:
<223> OTHER INFORMATION: Synthesized polypeptide derived from E. coli

<400> SEQUENCE: 27

Met Pro Lys Lys Lys Arg Lys Val Gly Ser Asn Leu Leu Ile Asp Asn
1               5                   10                  15

Trp Ile Pro Val Arg Pro Arg Asn Gly Gly Lys Val Gln Ile Ile Asn
            20                  25                  30

Leu Gln Ser Leu Tyr Cys Ser Arg Asp Gln Trp Arg Leu Ser Leu Pro
        35                  40                  45

Arg Asp Asp Met Glu Leu Ala Ala Leu Ala Leu Val Cys Ile Gly
    50                  55                  60

Gln Ile Ile Ala Pro Ala Lys Asp Asp Val Glu Phe Arg His Arg Ile
65                  70                  75                  80

Met Asn Pro Leu Thr Glu Asp Glu Phe Gln Gln Leu Ile Ala Pro Trp
                85                  90                  95

Ile Asp Met Phe Tyr Leu Asn His Ala Glu His Pro Phe Met Gln Thr
            100                 105                 110

Lys Gly Val Lys Ala Asn Asp Val Thr Pro Met Glu Lys Leu Leu Ala
        115                 120                 125

Gly Val Ser Gly Ala Thr Asn Cys Ala Phe Val Asn Gln Pro Gly Gln
    130                 135                 140

Gly Glu Ala Leu Cys Gly Gly Cys Thr Ala Ile Ala Leu Phe Asn Gln
145                 150                 155                 160

Ala Asn Gln Ala Pro Gly Phe Gly Gly Phe Lys Ser Gly Leu Arg
                165                 170                 175

Gly Gly Thr Pro Val Thr Thr Phe Val Arg Gly Ile Asp Leu Arg Ser
            180                 185                 190

Thr Val Leu Leu Asn Val Leu Thr Leu Pro Arg Leu Gln Lys Gln Phe
        195                 200                 205

Pro Asn Glu Ser His Thr Glu Asn Gln Pro Thr Trp Ile Lys Pro Ile
    210                 215                 220

Lys Ser Asn Glu Ser Ile Pro Ala Ser Ile Gly Phe Val Arg Gly
225                 230                 235                 240

Leu Phe Trp Gln Pro Ala His Ile Glu Leu Cys Asp Pro Ile Gly Ile
                245                 250                 255

Gly Lys Cys Ser Cys Cys Gly Gln Glu Ser Asn Leu Arg Tyr Thr Gly
            260                 265                 270

Phe Leu Lys Glu Lys Phe Thr Phe Thr Val Asn Gly Leu Trp Pro His
        275                 280                 285

Pro His Ser Pro Cys Leu Val Thr Val Lys Lys Gly Glu Val Glu Glu
    290                 295                 300

Lys Phe Leu Ala Phe Thr Thr Ser Ala Pro Ser Trp Thr Gln Ile Ser
```

-continued

```
        305                 310                 315                 320
Arg Val Val Asp Lys Ile Ile Gln Asn Glu Asn Gly Asn Arg Val
                325                 330                 335

Ala Ala Val Val Asn Gln Phe Arg Asn Ile Ala Pro Gln Ser Pro Leu
                340                 345                 350

Glu Leu Ile Met Gly Gly Tyr Arg Asn Asn Gln Ala Ser Ile Leu Glu
                355                 360                 365

Arg Arg His Asp Val Leu Met Phe Asn Gln Gly Trp Gln Gln Tyr Gly
        370                 375                 380

Asn Val Ile Asn Glu Ile Val Thr Val Gly Leu Gly Tyr Lys Thr Ala
385                 390                 395                 400

Leu Arg Lys Ala Leu Tyr Thr Phe Ala Glu Gly Phe Lys Asn Lys Asp
                405                 410                 415

Phe Lys Gly Ala Gly Val Ser Val His Glu Thr Ala Glu Arg His Phe
                420                 425                 430

Tyr Arg Gln Ser Glu Leu Leu Ile Pro Asp Val Leu Ala Asn Val Asn
        435                 440                 445

Phe Ser Gln Ala Asp Glu Val Ile Ala Asp Leu Arg Asp Lys Leu His
450                 455                 460

Gln Leu Cys Glu Met Leu Phe Asn Gln Ser Val Ala Pro Tyr Ala His
465                 470                 475                 480

His Pro Lys Leu Ile Ser Thr Leu Ala Leu Ala Arg Ala Thr Leu Tyr
                485                 490                 495

Lys His Leu Arg Glu Leu Lys Pro Gln Gly Gly Pro Ser Asn Gly Ala
        500                 505                 510

Ser Pro Lys Lys Lys Arg Lys Val
        515                 520

<210> SEQ ID NO 28
<211> LENGTH: 190
<212> TYPE: PRT
<213> ORGANISM: Artificial Sequence
<220> FEATURE:
<223> OTHER INFORMATION: Synthesized polypeptide derived from E. coli

<400> SEQUENCE: 28

Met Pro Lys Lys Lys Arg Lys Val Arg Ser Glu Ala Asp Glu Ile Asp
1               5                   10                  15

Ala Met Ala Leu Tyr Arg Ala Trp Gln Gln Leu Asp Asn Gly Ser Cys
                20                  25                  30

Ala Gln Ile Arg Arg Val Ser Glu Pro Asp Glu Leu Arg Asp Ile Pro
            35                  40                  45

Ala Phe Tyr Arg Leu Val Gln Pro Phe Gly Trp Glu Asn Pro Arg His
        50                  55                  60

Gln Gln Ala Leu Leu Arg Met Val Phe Cys Leu Ser Ala Gly Lys Asn
65                  70                  75                  80

Val Ile Arg His Gln Asp Lys Lys Ser Glu Gln Thr Thr Gly Ile Ser
                85                  90                  95

Leu Gly Arg Ala Leu Ala Asn Ser Gly Arg Ile Asn Glu Arg Arg Ile
                100                 105                 110

Phe Gln Leu Ile Arg Ala Asp Arg Thr Ala Asp Met Val Gln Leu Arg
            115                 120                 125

Arg Leu Leu Thr His Ala Glu Pro Val Leu Asp Trp Pro Leu Met Ala
        130                 135                 140

Arg Met Leu Thr Trp Trp Gly Lys Arg Glu Arg Gln Gln Leu Leu Glu
```

```
            145                 150                 155                 160
Asp Phe Val Leu Thr Thr Asn Lys Asn Ala Lys Arg Thr Ala Asp Gly
                165                 170                 175
Ser Glu Phe Glu Ser Thr Ser Pro Lys Lys Lys Arg Lys Val
                180                 185                 190

<210> SEQ ID NO 29
<211> LENGTH: 254
<212> TYPE: PRT
<213> ORGANISM: Artificial Sequence
<220> FEATURE:
<223> OTHER INFORMATION: Synthesized polypeptide derived from E. coli

<400> SEQUENCE: 29

Met Pro Lys Lys Lys Arg Lys Val Thr Arg Glu Arg Ser Tyr Leu Ile
1               5                   10                  15
Leu Arg Leu Ala Gly Pro Met Gln Ala Trp Gly Gln Pro Thr Phe Glu
                20                  25                  30
Gly Thr Arg Pro Thr Gly Arg Phe Pro Thr Arg Ser Gly Leu Leu Gly
            35                  40                  45
Leu Leu Gly Ala Cys Leu Gly Ile Gln Arg Asp Asp Thr Ser Ser Leu
        50                  55                  60
Gln Ala Leu Ser Glu Ser Val Gln Phe Ala Val Arg Cys Asp Glu Leu
65                  70                  75                  80
Ile Leu Asp Asp Arg Val Ser Val Thr Gly Leu Arg Asp Tyr His
                85                  90                  95
Thr Val Leu Gly Ala Arg Glu Asp Tyr Arg Gly Leu Lys Ser His Glu
                100                 105                 110
Thr Ile Gln Thr Trp Arg Glu Tyr Leu Cys Asp Ala Ser Phe Thr Val
            115                 120                 125
Ala Leu Trp Leu Thr Pro His Ala Thr Met Val Ile Ser Glu Leu Glu
        130                 135                 140
Lys Ala Val Leu Lys Pro Arg Tyr Thr Pro Tyr Leu Gly Arg Arg Ser
145                 150                 155                 160
Cys Pro Leu Thr His Pro Leu Phe Leu Gly Thr Cys Gln Ala Ser Asp
                165                 170                 175
Pro Gln Lys Ala Leu Leu Asn Tyr Glu Pro Val Gly Gly Asp Ile Tyr
                180                 185                 190
Ser Glu Glu Ser Val Thr Gly His His Leu Lys Phe Thr Ala Arg Asp
            195                 200                 205
Glu Pro Met Ile Thr Leu Pro Arg Gln Phe Ala Ser Arg Glu Trp Tyr
        210                 215                 220
Val Ile Lys Gly Gly Met Asp Val Ser Gln Lys Arg Thr Ala Asp Gly
225                 230                 235                 240
Ser Glu Phe Glu Ser Ser Arg Pro Lys Lys Lys Arg Lys Val
                245                 250

<210> SEQ ID NO 30
<211> LENGTH: 229
<212> TYPE: PRT
<213> ORGANISM: Artificial Sequence
<220> FEATURE:
<223> OTHER INFORMATION: Synthesized polypeptide derived from E. coli

<400> SEQUENCE: 30

Met Pro Lys Lys Lys Arg Lys Val Thr Arg Glu Tyr Leu Ser Lys Val
1               5                   10                  15
```

Ile Ile Ala Arg Ala Trp Ser Arg Asp Leu Tyr Gln Leu His Gln Gly
            20                  25                  30

Leu Trp His Leu Phe Pro Asn Arg Pro Asp Ala Ala Arg Asp Phe Leu
        35                  40                  45

Phe His Val Glu Lys Arg Asn Thr Pro Glu Gly Cys His Val Leu Leu
    50                  55                  60

Gln Ser Ala Gln Met Pro Val Ser Thr Ala Val Ala Thr Val Ile Lys
65                  70                  75                  80

Thr Lys Gln Val Glu Phe Gln Leu Gln Val Gly Val Pro Leu Tyr Phe
                85                  90                  95

Arg Leu Arg Ala Asn Pro Ile Lys Thr Ile Leu Asp Asn Gln Lys Arg
            100                 105                 110

Leu Asp Ser Lys Gly Asn Ile Lys Arg Cys Arg Val Pro Leu Ile Lys
        115                 120                 125

Glu Ala Glu Gln Ile Ala Trp Leu Gln Arg Lys Leu Gly Asn Ala Ala
    130                 135                 140

Arg Val Glu Asp Val His Pro Ile Ser Glu Arg Pro Gln Tyr Phe Ser
145                 150                 155                 160

Gly Asp Gly Lys Ser Gly Lys Ile Gln Thr Val Cys Phe Glu Gly Val
                165                 170                 175

Leu Thr Ile Asn Asp Ala Pro Ala Leu Ile Asp Leu Val Gln Gln Gly
            180                 185                 190

Ile Gly Pro Ala Lys Ser Met Gly Cys Gly Leu Leu Ser Leu Ala Pro
        195                 200                 205

Leu Lys Arg Thr Ala Asp Gly Ser Glu Phe Ser Ser Arg Pro Lys
210                 215                 220

Lys Lys Arg Lys Val
225

<210> SEQ ID NO 31
<211> LENGTH: 393
<212> TYPE: PRT
<213> ORGANISM: Artificial Sequence
<220> FEATURE:
<223> OTHER INFORMATION: Synthesized polypeptide derived from E. coli

<400> SEQUENCE: 31

Met Pro Lys Lys Arg Lys Val Arg Ser Glu Ser Asn Phe Ile Asn
1               5                   10                  15

Ile His Val Leu Ile Ser His Ser Pro Ser Cys Leu Asn Arg Asp Asp
            20                  25                  30

Met Asn Met Gln Lys Asp Ala Ile Phe Gly Gly Lys Arg Arg Val Arg
        35                  40                  45

Ile Ser Ser Gln Ser Leu Lys Arg Ala Met Arg Lys Ser Gly Tyr Tyr
    50                  55                  60

Ala Gln Asn Ile Gly Glu Ser Ser Leu Arg Thr Ile His Leu Ala Gln
65                  70                  75                  80

Leu Arg Asp Val Leu Arg Gln Lys Leu Gly Glu Arg Phe Asp Gln Lys
                85                  90                  95

Ile Ile Asp Lys Thr Leu Ala Leu Leu Ser Gly Lys Ser Val Asp Glu
            100                 105                 110

Ala Glu Lys Ile Ser Ala Asp Ala Val Thr Pro Trp Val Val Gly Glu
        115                 120                 125

Ile Ala Trp Phe Cys Glu Gln Val Ala Lys Ala Glu Ala Asp Asn Leu
    130                 135                 140

Asp Asp Lys Lys Leu Leu Lys Val Leu Lys Glu Asp Ile Ala Ala Ile
145                 150                 155                 160

Arg Val Asn Leu Gln Gln Gly Val Asp Ile Ala Leu Ser Gly Arg Met
            165                 170                 175

Ala Thr Ser Gly Met Met Thr Glu Leu Gly Lys Val Asp Gly Ala Met
            180                 185                 190

Ser Ile Ala His Ala Ile Thr Thr His Gln Val Asp Ser Asp Ile Asp
        195                 200                 205

Trp Phe Thr Ala Val Asp Asp Leu Gln Glu Gln Gly Ser Ala His Leu
        210                 215                 220

Gly Thr Gln Glu Phe Ser Ser Gly Val Phe Tyr Arg Tyr Ala Asn Ile
225                 230                 235                 240

Asn Leu Ala Gln Leu Gln Glu Asn Leu Gly Gly Ala Ser Arg Glu Gln
            245                 250                 255

Ala Leu Glu Ile Ala Thr His Val Val His Met Leu Ala Thr Glu Val
            260                 265                 270

Pro Gly Ala Lys Gln Arg Thr Tyr Ala Ala Phe Asn Pro Ala Asp Met
            275                 280                 285

Val Met Val Asn Phe Ser Asp Met Pro Leu Ser Met Ala Asn Ala Phe
290                 295                 300

Glu Lys Ala Val Lys Ala Lys Asp Gly Phe Leu Gln Pro Ser Ile Gln
305                 310                 315                 320

Ala Phe Asn Gln Tyr Trp Asp Arg Val Ala Asn Gly Tyr Gly Leu Asn
            325                 330                 335

Gly Ala Ala Ala Gln Phe Ser Leu Ser Asp Val Asp Pro Ile Thr Ala
            340                 345                 350

Gln Val Lys Gln Met Pro Thr Leu Glu Gln Leu Lys Ser Trp Val Arg
            355                 360                 365

Asn Asn Gly Glu Ala Lys Arg Thr Ala Asp Gly Ser Glu Phe Glu Ser
            370                 375                 380

Thr Ser Pro Lys Lys Lys Arg Lys Val
385                 390

<210> SEQ ID NO 32
<211> LENGTH: 918
<212> TYPE: PRT
<213> ORGANISM: Artificial Sequence
<220> FEATURE:
<223> OTHER INFORMATION: Synthesized polypeptide derived from E. coli

<400> SEQUENCE: 32

Met Pro Lys Lys Lys Arg Lys Val Gly Ser Glu Pro Phe Lys Tyr
1               5                   10                  15

Ile Cys His Tyr Trp Gly Lys Ser Lys Ser Leu Thr Lys Gly Asn
            20                  25                  30

Asp Ile His Leu Leu Ile Tyr His Cys Leu Asp Val Ala Val Ala
        35                  40                  45

Asp Cys Trp Trp Asp Gln Ser Val Val Leu Gln Asn Thr Phe Cys Arg
        50                  55                  60

Asn Glu Met Leu Ser Lys Gln Arg Val Lys Ala Trp Leu Leu Phe Phe
65                  70                  75                  80

Ile Ala Leu His Asp Ile Gly Lys Phe Asp Ile Arg Phe Gln Tyr Lys
            85                  90                  95

Ser Ala Glu Ser Trp Leu Lys Leu Asn Pro Ala Thr Pro Ser Leu Asn
            100                 105                 110

-continued

```
Gly Pro Ser Thr Gln Met Cys Arg Lys Phe Asn His Gly Ala Ala Gly
            115                 120                 125

Leu Tyr Trp Phe Asn Gln Asp Ser Leu Ser Glu Gln Ser Leu Gly Asp
130                 135                 140

Phe Phe Ser Phe Phe Asp Ala Ala Pro His Pro Tyr Glu Ser Trp Phe
145                 150                 155                 160

Pro Trp Val Glu Ala Val Thr Gly His His Gly Phe Ile Leu His Ser
                165                 170                 175

Gln Asp Gln Asp Lys Ser Arg Trp Glu Met Pro Ala Ser Leu Ala Ser
            180                 185                 190

Tyr Ala Ala Gln Asp Lys Gln Ala Arg Glu Glu Trp Ile Ser Val Leu
195                 200                 205

Glu Ala Leu Phe Leu Thr Pro Ala Gly Leu Ser Ile Asn Asp Ile Pro
210                 215                 220

Pro Asp Cys Ser Ser Leu Leu Ala Gly Phe Cys Ser Leu Ala Asp Trp
225                 230                 235                 240

Leu Gly Ser Trp Thr Thr Thr Asn Thr Phe Leu Phe Asn Glu Asp Ala
                245                 250                 255

Pro Ser Asp Ile Asn Ala Leu Arg Thr Tyr Phe Gln Asp Arg Gln Gln
            260                 265                 270

Asp Ala Ser Arg Val Leu Glu Leu Ser Gly Leu Val Ser Asn Lys Arg
275                 280                 285

Cys Tyr Glu Gly Val His Ala Leu Leu Asp Asn Gly Tyr Gln Pro Arg
290                 295                 300

Gln Leu Gln Val Leu Val Asp Ala Leu Pro Val Ala Pro Gly Leu Thr
305                 310                 315                 320

Val Ile Glu Ala Pro Thr Gly Ser Gly Lys Thr Glu Thr Ala Leu Ala
                325                 330                 335

Tyr Ala Trp Lys Leu Ile Asp Gln Gln Ile Ala Asp Ser Val Ile Phe
            340                 345                 350

Ala Leu Pro Thr Gln Ala Thr Ala Asn Ala Met Leu Thr Arg Met Glu
355                 360                 365

Ala Ser Ala Ser His Leu Phe Ser Ser Pro Asn Leu Ile Leu Ala His
370                 375                 380

Gly Asn Ser Arg Phe Asn His Leu Phe Gln Ser Ile Lys Ser Arg Ala
385                 390                 395                 400

Ile Thr Glu Gln Gly Gln Glu Glu Ala Trp Val Gln Cys Cys Gln Trp
                405                 410                 415

Leu Ser Gln Ser Asn Lys Lys Val Phe Leu Gly Gln Ile Gly Val Cys
            420                 425                 430

Thr Ile Asp Gln Val Leu Ile Ser Val Leu Pro Val Lys His Arg Phe
435                 440                 445

Ile Arg Gly Leu Gly Ile Gly Arg Ser Val Leu Ile Val Asp Glu Val
450                 455                 460

His Ala Tyr Asp Thr Tyr Met Asn Gly Leu Leu Glu Ala Val Leu Lys
465                 470                 475                 480

Ala Gln Ala Asp Val Gly Gly Ser Val Ile Leu Leu Ser Ala Thr Leu
                485                 490                 495

Pro Met Lys Gln Lys Gln Lys Leu Leu Asp Thr Tyr Gly Leu His Thr
            500                 505                 510

Asp Pro Val Glu Asn Asn Ser Ala Tyr Pro Leu Ile Asn Trp Arg Gly
515                 520                 525

Val Asn Gly Ala Gln Arg Phe Asp Leu Leu Ala His Pro Glu Gln Leu
```

```
            530                 535                 540
Pro Pro Arg Phe Ser Ile Gln Pro Glu Pro Ile Cys Leu Ala Asp Met
545                 550                 555                 560

Leu Pro Asp Leu Thr Met Leu Glu Arg Met Ile Ala Ala Asn Ala
                565                 570                 575

Gly Ala Gln Val Cys Leu Ile Cys Asn Leu Val Asp Val Ala Gln Val
                580                 585                 590

Cys Tyr Gln Arg Leu Lys Glu Leu Asn Asn Thr Gln Val Asp Ile Asp
                595                 600                 605

Leu Phe His Ala Arg Phe Thr Leu Asn Asp Arg Arg Glu Lys Glu Asn
                610                 615                 620

Arg Val Ile Ser Asn Phe Gly Lys Asn Gly Lys Arg Asn Val Gly Arg
625                 630                 635                 640

Ile Leu Val Ala Thr Gln Val Val Glu Gln Ser Leu Asp Val Asp Phe
                645                 650                 655

Asp Trp Leu Ile Thr Gln His Cys Pro Ala Asp Leu Leu Phe Gln Arg
                660                 665                 670

Leu Gly Arg Leu His Arg His Arg Lys Tyr Arg Pro Ala Gly Phe
                675                 680                 685

Glu Ile Pro Val Ala Thr Ile Leu Leu Pro Asp Gly Glu Gly Tyr Gly
                690                 695                 700

Arg His Glu His Ile Tyr Ser Asn Val Arg Val Met Trp Arg Thr Gln
705                 710                 715                 720

Gln His Ile Glu Glu Leu Asn Gly Ala Ser Leu Phe Phe Pro Asp Ala
                725                 730                 735

Tyr Arg Gln Trp Leu Asp Ser Ile Tyr Asp Asp Ala Glu Met Asp Glu
                740                 745                 750

Pro Glu Trp Val Gly Asn Gly Met Asp Lys Phe Glu Ser Ala Glu Cys
                755                 760                 765

Glu Lys Arg Phe Lys Ala Arg Lys Val Leu Gln Trp Ala Glu Glu Tyr
                770                 775                 780

Ser Leu Gln Asp Asn Asp Glu Thr Ile Leu Ala Val Thr Arg Asp Gly
785                 790                 795                 800

Glu Met Ser Leu Pro Leu Leu Pro Tyr Val Gln Thr Ser Ser Gly Lys
                805                 810                 815

Gln Leu Leu Asp Gly Gln Val Tyr Glu Asp Leu Ser His Glu Gln Gln
                820                 825                 830

Tyr Glu Ala Leu Ala Leu Asn Arg Val Asn Val Pro Phe Thr Trp Lys
                835                 840                 845

Arg Ser Phe Ser Glu Val Val Asp Glu Asp Gly Leu Leu Trp Leu Glu
850                 855                 860

Gly Lys Gln Asn Leu Asp Gly Trp Val Trp Gln Gly Asn Ser Ile Val
865                 870                 875                 880

Ile Thr Tyr Thr Gly Asp Glu Gly Met Thr Arg Val Ile Pro Ala Asn
                885                 890                 895

Pro Lys Lys Arg Thr Ala Asp Gly Ser Glu Phe Glu Ser Ala Ser Pro
                900                 905                 910

Lys Lys Lys Arg Lys Val
                915

<210> SEQ ID NO 33
<211> LENGTH: 87
<212> TYPE: DNA
<213> ORGANISM: Artificial Sequence
```

```
<220> FEATURE:
<223> OTHER INFORMATION: Synthesized nucleotide

<400> SEQUENCE: 33
cagtgaattg taatacgact cactataggg cgaattaaga gagaaaagaa gagtaagaag    60
aaatataaga caccggtcgc caccatg                                        87

<210> SEQ ID NO 34
<211> LENGTH: 212
<212> TYPE: DNA
<213> ORGANISM: Artificial Sequence
<220> FEATURE:
<223> OTHER INFORMATION: Synthesized nucleotide

<400> SEQUENCE: 34
tctagacctt ctgcggggct tgccttctgg ccatgccctt cttctctccc ttgcacctgt    60
acctcttggt ctttgaataa agcctgagta ggaaaaaaaa aaaaaaaaaa aaaaaaaaaa   120
aaaaaaaaaa aaaaaaaaaa aaaaaaaaaa aaaaaaaaaa aaaaaaaaaa aaaaaaaaaa   180
aaaaaaaaaa aaaaaaaaaa aaaaaaaaaa aa                                 212

<210> SEQ ID NO 35
<211> LENGTH: 32
<212> TYPE: DNA
<213> ORGANISM: Homo sapiens

<400> SEQUENCE: 35
aggaagtgga ccatggcgat ggggaggggc ag                                  32

<210> SEQ ID NO 36
<211> LENGTH: 32
<212> TYPE: DNA
<213> ORGANISM: Homo sapiens

<400> SEQUENCE: 36
tccctctctc taacctggca ctgcgtcgct gg                                  32

<210> SEQ ID NO 37
<211> LENGTH: 32
<212> TYPE: DNA
<213> ORGANISM: Homo sapiens

<400> SEQUENCE: 37
tatcttgggg ccaaatcatg tagactcttg ag                                  32

<210> SEQ ID NO 38
<211> LENGTH: 32
<212> TYPE: DNA
<213> ORGANISM: Homo sapiens

<400> SEQUENCE: 38
agtctacatg atttggcccc aagatacttt tc                                  32

<210> SEQ ID NO 39
<211> LENGTH: 32
<212> TYPE: DNA
<213> ORGANISM: Homo sapiens

<400> SEQUENCE: 39
ttaaatggca tagttggggt gacacagctg tc                                  32

<210> SEQ ID NO 40
```

```
<211> LENGTH: 32
<212> TYPE: DNA
<213> ORGANISM: Homo sapiens

<400> SEQUENCE: 40
gctggcctcc cactagacag ctgtgtcacc cc                              32

<210> SEQ ID NO 41
<211> LENGTH: 32
<212> TYPE: DNA
<213> ORGANISM: Homo sapiens

<400> SEQUENCE: 41
caatccttcc gcctcaggct ctagagtagc tg                              32

<210> SEQ ID NO 42
<211> LENGTH: 20
<212> TYPE: DNA
<213> ORGANISM: Homo sapiens

<400> SEQUENCE: 42
aggaagtgga ccatggcgat                                            20

<210> SEQ ID NO 43
<211> LENGTH: 20
<212> TYPE: DNA
<213> ORGANISM: Homo sapiens

<400> SEQUENCE: 43
gcagtgccag gttagagaga                                            20

<210> SEQ ID NO 44
<211> LENGTH: 20
<212> TYPE: DNA
<213> ORGANISM: Homo sapiens

<400> SEQUENCE: 44
ggccacggag cgagacatct                                            20

<210> SEQ ID NO 45
<211> LENGTH: 20
<212> TYPE: DNA
<213> ORGANISM: Homo sapiens

<400> SEQUENCE: 45
gagtagcgcg agcacagcta                                            20

<210> SEQ ID NO 46
<211> LENGTH: 20
<212> TYPE: DNA
<213> ORGANISM: Homo sapiens

<400> SEQUENCE: 46
gctacttgcc cctttcggcg                                            20

<210> SEQ ID NO 47
<211> LENGTH: 20
<212> TYPE: DNA
<213> ORGANISM: Homo sapiens

<400> SEQUENCE: 47
actcaagagt ctacatgatt                                            20
```

```
<210> SEQ ID NO 48
<211> LENGTH: 20
<212> TYPE: DNA
<213> ORGANISM: Homo sapiens

<400> SEQUENCE: 48
cagcccaaga tagttaagtg                                               20

<210> SEQ ID NO 49
<211> LENGTH: 20
<212> TYPE: DNA
<213> ORGANISM: Homo sapiens

<400> SEQUENCE: 49
agggaaagaa gaatcctaca                                               20

<210> SEQ ID NO 50
<211> LENGTH: 20
<212> TYPE: DNA
<213> ORGANISM: Homo sapiens

<400> SEQUENCE: 50
gaagttaaat ggcatagttg                                               20

<210> SEQ ID NO 51
<211> LENGTH: 20
<212> TYPE: DNA
<213> ORGANISM: Homo sapiens

<400> SEQUENCE: 51
tcaagcaatc cttccgcctc                                               20

<210> SEQ ID NO 52
<211> LENGTH: 32
<212> TYPE: DNA
<213> ORGANISM: Homo sapiens

<400> SEQUENCE: 52
gagacgctgc agcgcacggg taccaggggc ca                                 32

<210> SEQ ID NO 53
<211> LENGTH: 32
<212> TYPE: DNA
<213> ORGANISM: Homo sapiens

<400> SEQUENCE: 53
gacaagctgg agcgcgctgg taccaggggc ag                                 32

<210> SEQ ID NO 54
<211> LENGTH: 35
<212> TYPE: DNA
<213> ORGANISM: Homo sapiens

<400> SEQUENCE: 54
aagcaggcca atggggagga catcgatgtc acctc                              35

<210> SEQ ID NO 55
<211> LENGTH: 25
<212> TYPE: DNA
<213> ORGANISM: Homo sapiens

<400> SEQUENCE: 55
atgtcactct catctcctaa tacac                                         25
```

<210> SEQ ID NO 56
<211> LENGTH: 25
<212> TYPE: DNA
<213> ORGANISM: Homo sapiens

<400> SEQUENCE: 56
tggcccttcc ctatgtctag cctgt                                          25

<210> SEQ ID NO 57
<211> LENGTH: 89
<212> TYPE: DNA
<213> ORGANISM: Escherichia coli

<400> SEQUENCE: 57
gatctttaat aataaggaaa tgttacatta aggttggtgg gttgttttta tgggaaaaaa    60
tgctttaaga acaaatgtat acttttaga                                      89

<210> SEQ ID NO 58
<211> LENGTH: 85
<212> TYPE: DNA
<213> ORGANISM: Escherichia coli

<400> SEQUENCE: 58
ggatgtgttg tttgtgtgat actataaagt tggtagattg tgactggctt aaaaaatcat    60
taattaataa taggttatgt ttaga                                          85

<210> SEQ ID NO 59
<211> LENGTH: 176
<212> TYPE: DNA
<213> ORGANISM: Artificial Sequence
<220> FEATURE:
<223> OTHER INFORMATION: Synthesized nucleotide

<400> SEQUENCE: 59
tggatgtgtt gtttgtgtga tactataaag ttggtagatt gtgactggct taaaaaatca    60
ttaattaata ataggttatg tttagagtgt tccccgcgcc agcggggata aaccggccac   120
ggagcgagac atctcggccc gaatgctgtg ttccccgcgc cagcggggat aaaccg       176

<210> SEQ ID NO 60
<211> LENGTH: 90
<212> TYPE: DNA
<213> ORGANISM: Artificial Sequence
<220> FEATURE:
<223> OTHER INFORMATION: Synthesized nucleotide

<400> SEQUENCE: 60
gtgttccccg cgccagcggg gataaaccgg ccacggagcg agacatctcg gcccgaatgc    60
tgtgttcccc gcgccagcgg ggataaaccg                                     90

<210> SEQ ID NO 61
<211> LENGTH: 84
<212> TYPE: DNA
<213> ORGANISM: Artificial Sequence
<220> FEATURE:
<223> OTHER INFORMATION: Synthesized nucleotide

<400> SEQUENCE: 61
cccgcgccag cggggataaa ccggccacgg agcgagacat ctcggcccga atgctgtgtt    60
ccccgcgcca gcggggataa accg                                           84

<210> SEQ ID NO 62
<211> LENGTH: 79
<212> TYPE: DNA
<213> ORGANISM: Artificial Sequence
<220> FEATURE:
<223> OTHER INFORMATION: Synthesized nucleotide

<400> SEQUENCE: 62

```
gccagcgggg ataaaccggc cacggagcga gacatctcgg cccgaatgct gtgttccccg     60
cgccagcggg gataaaccg                                                  79
```

<210> SEQ ID NO 63
<211> LENGTH: 75
<212> TYPE: DNA
<213> ORGANISM: Artificial Sequence
<220> FEATURE:
<223> OTHER INFORMATION: Synthesized nucleotide

<400> SEQUENCE: 63

```
gcggggataa accggccacg gagcgagaca tctcggcccg aatgctgtgt tccccgcgcc     60
agcggggata aaccg                                                      75
```

<210> SEQ ID NO 64
<211> LENGTH: 69
<212> TYPE: DNA
<213> ORGANISM: Artificial Sequence
<220> FEATURE:
<223> OTHER INFORMATION: Synthesized nucleotide

<400> SEQUENCE: 64

```
ataaaccggc cacggagcga gacatctcgg cccgaatgct gtgttccccg cgccagcggg     60
gataaaccg                                                             69
```

<210> SEQ ID NO 65
<211> LENGTH: 61
<212> TYPE: DNA
<213> ORGANISM: Artificial Sequence
<220> FEATURE:
<223> OTHER INFORMATION: Synthesized nucleotide

<400> SEQUENCE: 65

```
gccacggagc gagacatctc ggcccgaatg ctgtgttccc cgcgccagcg gggataaacc     60
g                                                                     61
```

<210> SEQ ID NO 66
<211> LENGTH: 916
<212> TYPE: PRT
<213> ORGANISM: Artificial Sequence
<220> FEATURE:
<223> OTHER INFORMATION: Synthesized polypeptide derived from E. coli

<400> SEQUENCE: 66

```
Met Pro Lys Lys Arg Lys Val Glu Glu Pro Phe Lys Tyr Ile Cys
1               5                   10                  15

His Tyr Trp Gly Lys Ser Ser Lys Ser Leu Thr Lys Gly Asn Asp Ile
            20                  25                  30

His Leu Leu Ile Tyr His Cys Leu Asp Val Ala Ala Val Ala Asp Cys
        35                  40                  45

Trp Trp Asp Gln Ser Val Val Leu Gln Asn Thr Phe Cys Arg Asn Glu
    50                  55                  60

Met Leu Ser Lys Gln Arg Val Lys Ala Trp Leu Leu Phe Phe Ile Ala
65                  70                  75                  80
```

```
Leu Ala Asp Ile Gly Lys Phe Asp Ile Arg Phe Gln Tyr Lys Ser Ala
            85                  90                  95

Glu Ser Trp Leu Lys Leu Asn Pro Ala Thr Pro Ser Leu Asn Gly Pro
           100                 105                 110

Ser Thr Gln Met Cys Arg Lys Phe Asn His Gly Ala Ala Gly Leu Tyr
           115                 120                 125

Trp Phe Asn Gln Asp Ser Leu Ser Glu Gln Ser Leu Gly Asp Phe Phe
           130                 135                 140

Ser Phe Phe Asp Ala Ala Pro His Pro Tyr Glu Ser Trp Phe Pro Trp
145                 150                 155                 160

Val Glu Ala Val Thr Gly His His Gly Phe Ile Leu His Ser Gln Asp
               165                 170                 175

Gln Asp Lys Ser Arg Trp Glu Met Pro Ala Ser Leu Ala Ser Tyr Ala
               180                 185                 190

Ala Gln Asp Lys Gln Ala Arg Glu Glu Trp Ile Ser Val Leu Glu Ala
               195                 200                 205

Leu Phe Leu Thr Pro Ala Gly Leu Ser Ile Asn Asp Ile Pro Pro Asp
           210                 215                 220

Cys Ser Ser Leu Leu Ala Gly Phe Cys Ser Leu Ala Asp Trp Leu Gly
225                 230                 235                 240

Ser Trp Thr Thr Thr Asn Thr Phe Leu Phe Asn Glu Asp Ala Pro Ser
               245                 250                 255

Asp Ile Asn Ala Leu Arg Thr Tyr Phe Gln Asp Arg Gln Gln Asp Ala
               260                 265                 270

Ser Arg Val Leu Glu Leu Ser Gly Leu Val Ser Asn Lys Arg Cys Tyr
               275                 280                 285

Glu Gly Val His Ala Leu Leu Asp Asn Gly Tyr Gln Pro Arg Gln Leu
           290                 295                 300

Gln Val Leu Val Asp Ala Leu Pro Val Ala Pro Gly Leu Thr Val Ile
305                 310                 315                 320

Glu Ala Pro Thr Gly Ser Gly Lys Thr Glu Thr Ala Leu Ala Tyr Ala
               325                 330                 335

Trp Lys Leu Ile Asp Gln Gln Ile Ala Asp Ser Val Ile Phe Ala Leu
               340                 345                 350

Pro Thr Gln Ala Thr Ala Asn Ala Met Leu Thr Arg Met Glu Ala Ser
           355                 360                 365

Ala Ser His Leu Phe Ser Ser Pro Asn Leu Ile Leu Ala His Gly Asn
370                 375                 380

Ser Arg Phe Asn His Leu Phe Gln Ser Ile Lys Ser Arg Ala Ile Thr
385                 390                 395                 400

Glu Gln Gly Gln Glu Glu Ala Trp Val Gln Cys Cys Gln Trp Leu Ser
               405                 410                 415

Gln Ser Asn Lys Lys Val Phe Leu Gly Gln Ile Gly Val Cys Thr Ile
           420                 425                 430

Asp Gln Val Leu Ile Ser Val Leu Pro Val Lys His Arg Phe Ile Arg
           435                 440                 445

Gly Leu Gly Ile Gly Arg Ser Val Leu Ile Val Asp Glu Val His Ala
450                 455                 460

Tyr Asp Thr Tyr Met Asn Gly Leu Leu Glu Ala Val Leu Lys Ala Gln
465                 470                 475                 480

Ala Asp Val Gly Gly Ser Val Ile Leu Leu Ser Ala Thr Leu Pro Met
               485                 490                 495
```

```
Lys Gln Lys Gln Lys Leu Leu Asp Thr Tyr Gly Leu His Thr Asp Pro
            500                 505                 510

Val Glu Asn Asn Ser Ala Tyr Pro Leu Ile Asn Trp Arg Gly Val Asn
        515                 520                 525

Gly Ala Gln Arg Phe Asp Leu Leu Ala His Pro Glu Gln Leu Pro Pro
    530                 535                 540

Arg Phe Ser Ile Gln Pro Glu Pro Ile Cys Leu Ala Asp Met Leu Pro
545                 550                 555                 560

Asp Leu Thr Met Leu Glu Arg Met Ile Ala Ala Asn Ala Gly Ala
                565                 570                 575

Gln Val Cys Leu Ile Cys Asn Leu Val Asp Val Ala Gln Val Cys Tyr
                580                 585                 590

Gln Arg Leu Lys Glu Leu Asn Asn Thr Gln Val Asp Ile Asp Leu Phe
            595                 600                 605

His Ala Arg Phe Thr Leu Asn Asp Arg Arg Glu Lys Glu Asn Arg Val
        610                 615                 620

Ile Ser Asn Phe Gly Lys Asn Gly Lys Arg Asn Val Gly Arg Ile Leu
625                 630                 635                 640

Val Ala Thr Gln Val Val Glu Gln Ser Leu Asp Val Asp Phe Asp Trp
                645                 650                 655

Leu Ile Thr Gln His Cys Pro Ala Asp Leu Leu Phe Gln Arg Leu Gly
                660                 665                 670

Arg Leu His Arg His His Arg Lys Tyr Arg Pro Ala Gly Phe Glu Ile
            675                 680                 685

Pro Val Ala Thr Ile Leu Leu Pro Asp Gly Glu Gly Tyr Gly Arg His
        690                 695                 700

Glu His Ile Tyr Ser Asn Val Arg Val Met Trp Arg Thr Gln Gln His
705                 710                 715                 720

Ile Glu Glu Leu Asn Gly Ala Ser Leu Phe Phe Pro Asp Ala Tyr Arg
                725                 730                 735

Gln Trp Leu Asp Ser Ile Tyr Asp Asp Ala Glu Met Asp Glu Pro Glu
            740                 745                 750

Trp Val Gly Asn Gly Met Asp Lys Phe Glu Ser Ala Glu Cys Glu Lys
        755                 760                 765

Arg Phe Lys Ala Arg Lys Val Leu Gln Trp Ala Glu Glu Tyr Ser Leu
770                 775                 780

Gln Asp Asn Asp Glu Thr Ile Leu Ala Val Thr Arg Asp Gly Glu Met
785                 790                 795                 800

Ser Leu Pro Leu Leu Pro Tyr Val Gln Thr Ser Ser Gly Lys Gln Leu
                805                 810                 815

Leu Asp Gly Gln Val Tyr Glu Asp Leu Ser His Glu Gln Gln Tyr Glu
            820                 825                 830

Ala Leu Ala Leu Asn Arg Val Asn Val Pro Phe Thr Trp Lys Arg Ser
        835                 840                 845

Phe Ser Glu Val Val Asp Glu Asp Gly Leu Leu Trp Leu Glu Gly Lys
850                 855                 860

Gln Asn Leu Asp Gly Trp Val Trp Gln Gly Asn Ser Ile Val Ile Thr
865                 870                 875                 880

Tyr Thr Gly Asp Glu Gly Met Thr Arg Val Ile Pro Ala Asn Pro Lys
                885                 890                 895

Lys Arg Thr Ala Asp Gly Ser Glu Phe Glu Ser Ala Ser Pro Lys Lys
            900                 905                 910

Lys Arg Lys Val
```

-continued

915

<210> SEQ ID NO 67
<211> LENGTH: 2751
<212> TYPE: DNA
<213> ORGANISM: Artificial Sequence
<220> FEATURE:
<223> OTHER INFORMATION: Synthesized nucleotide derived from E. coli

<400> SEQUENCE: 67

| | | | | | |
|---|---|---|---|---|---|
| atgccaaaga | agaagagaaa | ggtggaggag | cccttcaagt | acatctgcca | ctattgggc | 60 |
| aagagctcca | agagcctgac | aaagggcaac | gatatccacc | tgctgatcta | ccactgcctg | 120 |
| gacgtggcag | cagtggcaga | ttgttggtgg | gaccagtccg | tggtgctgca | gaataccttt | 180 |
| tgtcggaacg | agatgctgtc | taagcagaga | gtgaaggcct | ggctgctgtt | ctttatcgcc | 240 |
| ctggctgata | tcggcaagtt | cgacatccgg | tttcagtata | agtccgccga | gtcttggctg | 300 |
| aagctgaatc | cagccacacc | ctctctgaac | ggccctagca | cccagatgtg | cagaaagttc | 360 |
| aatcacggcg | ccgccggcct | gtactggttt | aaccaggact | ctctgagcga | gcagagcctg | 420 |
| ggcgatttct | tttccttctt | tgacgcagca | cctcaccct | acgagtcctg | gttcccttgg | 480 |
| gtggaggcag | tgaccggaca | ccacggcttt | atcctgcatt | ctcaggacca | ggataagagc | 540 |
| cggtgggaga | tgccagccag | cctggcctcc | tacgccgcac | aggataagca | ggccagagag | 600 |
| gagtggatca | gcgtgctgga | ggccctgttc | ctgaccccag | caggactgtc | catcaatgat | 660 |
| atcccacctg | actgctctag | cctgctggcc | ggcttttgtt | ccctggccga | ctggctgggc | 720 |
| tcttggacca | caaccaatac | attcctgttt | aacgaggatg | caccaagcga | catcaacgcc | 780 |
| ctgaggacct | acttccagga | tcggcagcag | gacgcctcca | gagtgctgga | gctgtccggc | 840 |
| ctggtgtcta | taagaggtg | ctacgaggga | gtgcacgccc | tgctggataa | cggctatcag | 900 |
| ccaaggcagc | tgcaggtgct | ggtggacgcc | ctgcctgtgg | caccaggact | gacagtgatc | 960 |
| gaggcaccta | ccggcagcgg | caagacagag | accgccctgg | cctatgcctg | gaagctgatc | 1020 |
| gatcagcaga | tcgccgactc | cgtgatcttc | gccctgccaa | cacaggccac | cgccaatgca | 1080 |
| atgctgaccc | ggatggaggc | ctccgcctct | cacctgtttt | cctctcccaa | cctgatcctg | 1140 |
| gcccacggca | acagcaggtt | caatcacctg | tttcagtcta | tcaagagccg | cgccatcaca | 1200 |
| gagcagggac | aggaggaggc | ctgggtgcag | tgctgtcagt | ggctgagcca | gtccaataag | 1260 |
| aaggtgttcc | tgggccagat | cggcgtgtgc | accatcgatc | aggtgctgat | ctctgtgctg | 1320 |
| cctgtgaagc | acaggtttat | caggggactg | ggaatcggca | gaagcgtgct | gatcgtggat | 1380 |
| gaggtgcacg | cctacgacac | atatatgaac | ggcctgctgg | aggccgtgct | gaaggcacag | 1440 |
| gcagacgtgg | gcggctccgt | gatcctgctg | tctgccaccc | tgccaatgaa | gcagaagcag | 1500 |
| aagctgctgg | atacatacgg | cctgcacacc | gaccccgtgg | agaacaattc | cgcctatcct | 1560 |
| ctgatcaatt | ggaggggagt | gaacggagca | cagcggttcg | acctgctggc | ccaccctgag | 1620 |
| cagctgccac | caaggttttc | tatccagccc | gagcctatct | gcctggccga | tatgctgcca | 1680 |
| gacctgacca | tgctggagag | gatgatcgct | gccgccaatg | caggagcaca | ggtgtgcctg | 1740 |
| atctgtaacc | tggtggatgt | ggcccaggtg | tgctaccaga | ggctgaagga | gctgaacaat | 1800 |
| acacaggtgg | acatcgatct | gttccacgcc | cggtttaccc | tgaatgaccg | gagagagaag | 1860 |
| gagaacagag | tgatctctaa | cttcggcaag | aatggcaaga | gaaacgtggg | cagaatcctg | 1920 |
| gtggccacac | aggtggtgga | gcagagcctg | gacgtggatt | cgactggct | gatcacccag | 1980 |
| cactgccccg | ccgatctgct | gtttcagcgg | ctgggcagac | tgcacaggca | ccaccgcaag | 2040 |

```
tatcggcctg ccggctttga gatcccagtg gccacaatcc tgctgcctga cggagaggga    2100
tacggcaggc acgagcacat ctatagcaat gtgcgcgtga tgtggcggac ccagcagcac    2160
atcgaggagc tgaacggcgc ctctctgttc tttccagatg cctaccgcca gtggctggac    2220
agcatctatg acgatgccga gatggatgag cccgagtggg tgggcaatgg catggacaag    2280
ttcgagtccg ccgagtgtga gaagcggttc aaggccagga aggtgctgca gtgggccgag    2340
gagtactccc tgcaggataa cgacgagaca atcctggccg tgaccagaga tggcgagatg    2400
tctctgcccc tgctgcctta tgtgcagaca agctccggca agcagctgct ggatggccag    2460
gtgtacgagg acctgagcca cgagcagcag tatgaggccc tggccctgaa cagggtgaat    2520
gtgcccttca cctggaagcg gagcttcagc gaagtggtgg atgaggacgg cctgctgtgg    2580
ctggagggca agcagaatct ggatggctgg gtgtggcagg gcaactccat cgtgatcaca    2640
tacaccggcg acgagggcat gaccagagtg atcccagcca accccaagaa gagaaccgcc    2700
gacggcagcg agttcgagtc cgctagccca aagaagaaga gaaaggtgta a            2751
```

<210> SEQ ID NO 68
<211> LENGTH: 227
<212> TYPE: PRT
<213> ORGANISM: Artificial Sequence
<220> FEATURE:
<223> OTHER INFORMATION: Synthesized polypeptide derived from E. coli

<400> SEQUENCE: 68

```
Met Pro Lys Lys Arg Lys Val Glu Tyr Leu Ser Lys Val Ile Ile
1               5                   10                  15

Ala Arg Ala Trp Ser Arg Asp Leu Tyr Gln Leu Ala Gln Gly Leu Trp
            20                  25                  30

His Leu Phe Pro Asn Arg Pro Asp Ala Ala Arg Asp Phe Leu Phe His
        35                  40                  45

Val Glu Lys Arg Asn Thr Pro Glu Gly Cys His Val Leu Leu Gln Ser
    50                  55                  60

Ala Gln Met Pro Val Ser Thr Ala Val Ala Thr Val Ile Lys Thr Lys
65                  70                  75                  80

Gln Val Glu Phe Gln Leu Gln Val Gly Val Pro Leu Tyr Phe Arg Leu
                85                  90                  95

Arg Ala Asn Pro Ile Lys Thr Ile Leu Asp Asn Gln Lys Arg Leu Asp
            100                 105                 110

Ser Lys Gly Asn Ile Lys Arg Cys Arg Val Pro Leu Ile Lys Glu Ala
        115                 120                 125

Glu Gln Ile Ala Trp Leu Gln Arg Lys Leu Gly Asn Ala Ala Arg Val
    130                 135                 140

Glu Asp Val His Pro Ile Ser Glu Arg Pro Gln Tyr Phe Ser Gly Asp
145                 150                 155                 160

Gly Lys Ser Gly Lys Ile Gln Thr Val Cys Phe Glu Gly Val Leu Thr
                165                 170                 175

Ile Asn Asp Ala Pro Ala Leu Ile Asp Leu Val Gln Gln Gly Ile Gly
            180                 185                 190

Pro Ala Lys Ser Met Gly Cys Gly Leu Leu Ser Leu Ala Pro Leu Lys
        195                 200                 205

Arg Thr Ala Asp Gly Ser Glu Phe Glu Ser Ser Arg Pro Lys Lys Lys
    210                 215                 220

Arg Lys Val
225
```

<210> SEQ ID NO 69
<211> LENGTH: 684
<212> TYPE: DNA
<213> ORGANISM: Artificial Sequence
<220> FEATURE:
<223> OTHER INFORMATION: Synthesized nucleotide derived from E. coli

<400> SEQUENCE: 69

```
atgccaaaga agaagagaaa ggtggaatac ctgagcaaag tgatcatcgc aagggcatgg      60
tccagggacc tgtatcagct ggctcagggc ctgtggcacc tgttccctaa tagaccagat     120
gccgccaggg acttcctgtt tcacgtggag aagaggaaca cacccgaggg ctgtcacgtg     180
ctgctgcagt ccgcccagat gcccgtgagc accgcagtgg ccacagtgat caagaccaag     240
caggtggagt tccagctgca agtgggcgtg ccactgtact ttaggctgcg cgccaatccc     300
atcaagacca tcctggataa ccagaagcgc ctggactcta agggcaatat caagcggtgc     360
agagtgcctc tgatcaagga ggccgagcag atcgcctggc tgcagagaaa gctgggcaac     420
gccgccaggg tggaggatgt gcaccctatc agcgagcggc acagtatttt cagcggcgac     480
ggcaagtccg gcaagatcca gaccgtgtgc tttgagggcg tgctgaccat caacgatgcc     540
ccagccctga tcgacctggt gcagcaggga atcggacctg ctaagtcaat gggatgtggg     600
ctgctgtcac tggcacctct gaagcggact gctgatggca gtgaatttga gtcctctaga     660
ccaaagaaga agagaaaggt gtaa                                             684
```

<210> SEQ ID NO 70
<211> LENGTH: 90
<212> TYPE: RNA
<213> ORGANISM: Artificial Sequence
<220> FEATURE:
<223> OTHER INFORMATION: Synthesized nucleotide
<220> FEATURE:
<221> NAME/KEY: misc_feature
<222> LOCATION: (30)..(61)
<223> OTHER INFORMATION: n is a, c, g, or u

<400> SEQUENCE: 70

```
guguuccccg cgccagcggg gauaaaccgn nnnnnnnnn nnnnnnnnnn nnnnnnnnnn      60
nguguucccc gcgccagcgg ggauaaaccg                                      90
```

<210> SEQ ID NO 71
<211> LENGTH: 29
<212> TYPE: RNA
<213> ORGANISM: Escherichia coli

<400> SEQUENCE: 71

```
guguuccccg cgccagcggg gauaaaccg                                       29
```

<210> SEQ ID NO 72
<211> LENGTH: 29
<212> TYPE: RNA
<213> ORGANISM: Escherichia coli

<400> SEQUENCE: 72

```
gaguuccccg cgccagcggg gauaaaccg                                       29
```

<210> SEQ ID NO 73
<211> LENGTH: 29
<212> TYPE: RNA
<213> ORGANISM: Escherichia coli

```
<400> SEQUENCE: 73
gaguuccccg cguuagcggg gauaaaccg                                29

<210> SEQ ID NO 74
<211> LENGTH: 29
<212> TYPE: RNA
<213> ORGANISM: Escherichia coli

<400> SEQUENCE: 74
gaguuccccg cgccagcagg gauaaaccg                                29

<210> SEQ ID NO 75
<211> LENGTH: 29
<212> TYPE: RNA
<213> ORGANISM: Escherichia coli

<400> SEQUENCE: 75
guguuccccg caucagcggg gauaaaccg                                29

<210> SEQ ID NO 76
<211> LENGTH: 32
<212> TYPE: DNA
<213> ORGANISM: Homo sapiens

<400> SEQUENCE: 76
gccacggagc gagacatctc ggcccgaatg ct                            32

<210> SEQ ID NO 77
<211> LENGTH: 32
<212> TYPE: DNA
<213> ORGANISM: Homo sapiens

<400> SEQUENCE: 77
ccagcgacgc agtgccaggt tagagagagg ga                            32

<210> SEQ ID NO 78
<211> LENGTH: 32
<212> TYPE: DNA
<213> ORGANISM: Homo sapiens

<400> SEQUENCE: 78
aatgcccgcc agcgcgacgc ctccacttat at                            32

<210> SEQ ID NO 79
<211> LENGTH: 32
<212> TYPE: DNA
<213> ORGANISM: Homo sapiens

<400> SEQUENCE: 79
ctatccagcg tgagtctctc ctaccctccc gc                            32

<210> SEQ ID NO 80
<211> LENGTH: 32
<212> TYPE: DNA
<213> ORGANISM: Homo sapiens

<400> SEQUENCE: 80
ctgtcagctt caggaatgcc cgccagcgcg ac                            32

<210> SEQ ID NO 81
<211> LENGTH: 32
<212> TYPE: DNA
<213> ORGANISM: Homo sapiens
```

```
<400> SEQUENCE: 81
tctcgctccg tggccttagc tgtgctcgcg ct                                32

<210> SEQ ID NO 82
<211> LENGTH: 32
<212> TYPE: DNA
<213> ORGANISM: Homo sapiens

<400> SEQUENCE: 82
acatctcggc ccgaatgctg tcagcttcag ga                                32

<210> SEQ ID NO 83
<211> LENGTH: 32
<212> TYPE: DNA
<213> ORGANISM: Homo sapiens

<400> SEQUENCE: 83
gctatccagc gtgagtctct cctaccctcc cg                                32

<210> SEQ ID NO 84
<211> LENGTH: 32
<212> TYPE: DNA
<213> ORGANISM: Homo sapiens

<400> SEQUENCE: 84
ctgtgctcgc gctactctct ctttctggcc tg                                32

<210> SEQ ID NO 85
<211> LENGTH: 32
<212> TYPE: DNA
<213> ORGANISM: Homo sapiens

<400> SEQUENCE: 85
cgcgacgcct ccacttatat taaacgcgtg cc                                32

<210> SEQ ID NO 86
<211> LENGTH: 32
<212> TYPE: DNA
<213> ORGANISM: Homo sapiens

<400> SEQUENCE: 86
cctccactta tattaaacgc gtgcccagcc aa                                32

<210> SEQ ID NO 87
<211> LENGTH: 32
<212> TYPE: DNA
<213> ORGANISM: Homo sapiens

<400> SEQUENCE: 87
gcgtgcccag ccaatcagga caaggcccgc ag                                32

<210> SEQ ID NO 88
<211> LENGTH: 32
<212> TYPE: DNA
<213> ORGANISM: Homo sapiens

<400> SEQUENCE: 88
cgcgtgccca gccaatcagg acaaggcccg ca                                32

<210> SEQ ID NO 89
<211> LENGTH: 32
<212> TYPE: DNA
```

<213> ORGANISM: Homo sapiens

<400> SEQUENCE: 89
acgcgtgccc agccaatcag gacaaggccc gc                                     32

<210> SEQ ID NO 90
<211> LENGTH: 32
<212> TYPE: DNA
<213> ORGANISM: Homo sapiens

<400> SEQUENCE: 90
ccacaaaaaa ctgagaatta attgctttca gg                                     32

<210> SEQ ID NO 91
<211> LENGTH: 32
<212> TYPE: DNA
<213> ORGANISM: Homo sapiens

<400> SEQUENCE: 91
ctgacagtag accccagtac atgcttccta aa                                     32

<210> SEQ ID NO 92
<211> LENGTH: 32
<212> TYPE: DNA
<213> ORGANISM: Homo sapiens

<400> SEQUENCE: 92
ctgtcctggc catactctct tgaatgccca tg                                     32

<210> SEQ ID NO 93
<211> LENGTH: 32
<212> TYPE: DNA
<213> ORGANISM: Homo sapiens

<400> SEQUENCE: 93
aatgagatgg ctgaatttgt cgtagttaat ga                                     32

<210> SEQ ID NO 94
<211> LENGTH: 32
<212> TYPE: DNA
<213> ORGANISM: Homo sapiens

<400> SEQUENCE: 94
tcttggtgag aatcatattc tgtagtacaa gg                                     32

<210> SEQ ID NO 95
<211> LENGTH: 32
<212> TYPE: DNA
<213> ORGANISM: Homo sapiens

<400> SEQUENCE: 95
ggcaatgcaa atgtagagtt ttttgctcac tc                                     32

<210> SEQ ID NO 96
<211> LENGTH: 24
<212> TYPE: DNA
<213> ORGANISM: Homo sapiens

<400> SEQUENCE: 96
ctcctccgct catccttttc actg                                              24

<210> SEQ ID NO 97
<211> LENGTH: 23

```
<212> TYPE: DNA
<213> ORGANISM: Homo sapiens

<400> SEQUENCE: 97
ggttaagcca ctggacaaaa acg                                           23

<210> SEQ ID NO 98
<211> LENGTH: 30
<212> TYPE: DNA
<213> ORGANISM: Homo sapiens

<400> SEQUENCE: 98
gcaaatgctt actgaaacct tccatgcatc                                    30

<210> SEQ ID NO 99
<211> LENGTH: 30
<212> TYPE: DNA
<213> ORGANISM: Homo sapiens

<400> SEQUENCE: 99
cctaccatag ctgatgggta aaatgtaaac                                    30

<210> SEQ ID NO 100
<211> LENGTH: 25
<212> TYPE: DNA
<213> ORGANISM: Homo sapiens

<400> SEQUENCE: 100
cctcaggtgc tcccacaagg ttatc                                         25

<210> SEQ ID NO 101
<211> LENGTH: 30
<212> TYPE: DNA
<213> ORGANISM: Homo sapiens

<400> SEQUENCE: 101
ttcctaatta cagccaaatc cctagctgta                                    30

<210> SEQ ID NO 102
<211> LENGTH: 20
<212> TYPE: DNA
<213> ORGANISM: Homo sapiens

<400> SEQUENCE: 102
acaaagctca ggtcggattg                                               20

<210> SEQ ID NO 103
<211> LENGTH: 21
<212> TYPE: DNA
<213> ORGANISM: Homo sapiens

<400> SEQUENCE: 103
agttgctgct cttttccagg t                                             21

<210> SEQ ID NO 104
<211> LENGTH: 25
<212> TYPE: DNA
<213> ORGANISM: Homo sapiens

<400> SEQUENCE: 104
ggaccagcag tattggcatt ttttt                                         25

<210> SEQ ID NO 105
```

```
<211> LENGTH: 21
<212> TYPE: DNA
<213> ORGANISM: Homo sapiens

<400> SEQUENCE: 105
agttttggtg gctacgccat c                                              21

<210> SEQ ID NO 106
<211> LENGTH: 35
<212> TYPE: DNA
<213> ORGANISM: Homo sapiens

<400> SEQUENCE: 106
aagcttgtca gctagaggat gttataatgt cctac                               35

<210> SEQ ID NO 107
<211> LENGTH: 35
<212> TYPE: DNA
<213> ORGANISM: Homo sapiens

<400> SEQUENCE: 107
aaggtgaata tcttcaatat attttaactt caaca                               35

<210> SEQ ID NO 108
<211> LENGTH: 35
<212> TYPE: DNA
<213> ORGANISM: Artificial Sequence
<220> FEATURE:
<223> OTHER INFORMATION: Synthesized nucleotide
<220> FEATURE:
<221> NAME/KEY: misc_feature
<222> LOCATION: (4)..(35)
<223> OTHER INFORMATION: n is a, c, g, or t

<400> SEQUENCE: 108
atgnnnnnnn nnnnnnnnnn nnnnnnnnnn nnnnn                               35

<210> SEQ ID NO 109
<211> LENGTH: 35
<212> TYPE: DNA
<213> ORGANISM: Artificial Sequence
<220> FEATURE:
<223> OTHER INFORMATION: Synthesized nucleotide
<220> FEATURE:
<221> NAME/KEY: misc_feature
<222> LOCATION: (4)..(35)
<223> OTHER INFORMATION: n is a, c, g, or t

<400> SEQUENCE: 109
gagnnnnnnn nnnnnnnnnn nnnnnnnnnn nnnnn                               35

<210> SEQ ID NO 110
<211> LENGTH: 35
<212> TYPE: DNA
<213> ORGANISM: Artificial Sequence
<220> FEATURE:
<223> OTHER INFORMATION: Synthesized nucleotide
<220> FEATURE:
<221> NAME/KEY: misc_feature
<222> LOCATION: (4)..(35)
<223> OTHER INFORMATION: n is a, c, g, or t

<400> SEQUENCE: 110
tagnnnnnnn nnnnnnnnnn nnnnnnnnnn nnnnn                               35

<210> SEQ ID NO 111
<211> LENGTH: 35
```

```
<212> TYPE: DNA
<213> ORGANISM: Artificial Sequence
<220> FEATURE:
<223> OTHER INFORMATION: Synthesized nucleotide
<220> FEATURE:
<221> NAME/KEY: misc_feature
<222> LOCATION: (4)..(35)
<223> OTHER INFORMATION: n is a, c, g, or t

<400> SEQUENCE: 111
aaannnnnnn nnnnnnnnnn nnnnnnnnnn nnnnn                              35
```

METHOD FOR INDUCING DELETION IN GENOMIC DNA

SEQUENCE LISTING

The instant application contains a Sequence Listing which has been submitted electronically in ASCII format and is hereby incorporated by reference in its entirety. Said ASCII copy, created on Dec. 9, 2019, is named SIW-002US_Sequence_Listing.txt and is 55,267 bytes in size.

TECHNICAL FIELD

The present invention relates to a method for inducing a deletion in genomic DNA. More specifically, the present invention relates to a production method of genomic DNA in which a deletion of more than 100 bases of nucleotides is introduced into a target region, a production method of iPS cells in which genomic DNA is modified, and a kit for modifying a target region of genomic DNA. Priority is claimed on Japanese Patent Application No. 2018-231649, filed Dec. 11, 2018, and U.S. Provisional Patent Application No. U.S. 62/938,346 filed Nov. 21, 2019, the contents of which are incorporated herein by reference.

BACKGROUND ART

In recent years, a CRISPR-Cas9 system, which is one of Clustered Regularly Interspaced Short Palindromic Repeat (CRISPR) systems that are acquired immune systems for prokaryotes, is widely used for genome editing technologies such as gene disruption (knockout). This is a technique in which double-stranded DNA cleavage is induced at a desired site of genomic DNA by the above system, and thereafter a deletion or insertion is caused by the repair mechanism inherent in a host cell.

CRISPR systems include class 1 CRISPR systems that function by a plurality of factors forming a complex, and class 2 CRISPR systems that function by a single factor. The class 1 CRISPR systems include type I, type III, and type IV CRISPR systems. Furthermore, the class 2 CRISPR systems include type II, type V, and type VI CRISPR systems. The CRISPR-Cas9 system belonging to the type II of the class 2 among them became the standard for genome editing technologies in just one year after its appearance due to its simplicity of being able to induce DNA cleavage at a desired site with only Cas9 protein and one kind of RNA (single-guide RNA: sgRNA that is RNA having a tracrRNA sequence and a crRNA sequence) (refer to, for example, Non Patent Document 1).

On the other hand, the class 1 CRISPR systems are complicated. For example, it has been reported that in a CRISPR-Cas3 system belonging to the type I of the class 1, DNA cleavage activity is exhibited in vitro by Cas3 protein forming a complex with a CRISPR associated complex for anti-viral defense (hereinafter, sometimes also referred to as a "type I Cascade complex"), which consists of Cse1 protein (sometimes also referred to as CasA, Cas8e, or Cas8), Cse2 protein (CasB, Cas11), Cas7 (CasC) protein, Cas5 (CasD) protein, and Cas6 (CasE) protein, and crRNA (Non Patent Document 2). Accordingly, development of the class 1 CRISPR systems as a genome editing tool tended to be delayed due to its complexity of necessarily expressing many kinds of protein.

Meanwhile, HEK 293T cells, which are a cell line derived from human embryonic kidneys, are known be cells having a characteristic of an extremely high gene introduction efficiency. Therefore, the HEK 293T cells are also frequently used in evaluation systems of genome editing efficiency when using the CRISPR-Cas system, and it has been reported several times that a sufficiently practical (high level) genome editing efficiency can be obtained by the CRISPR-Cas9 system.

Meanwhile, there has been recent progress in research on pluripotent stem cells such as induced pluripotent stem cells (iPS cells) and embryonic stem cells (ES cells), and it has become possible for a wide variety of cells to be induced to differentiate from iPS cells and ES cells, increasing a possibility of medical applications. In particular, with respect to disorders caused by gene mutations or polymorphisms in genomic DNA, there are great expectations for a new therapeutics in which genome editing that can remove the cause is performed at the stage of pluripotent stem cells, and cells induced to differentiate from the edited pluripotent stem cells are used as a cell preparation.

However, it is generally known that pluripotent stem cells such as iPS cells and ES cells, stem cells such as mesenchymal stem cells and hematopoietic stem cells, and primary cultured cells have an extremely low gene introduction efficiency. Furthermore, it is known that pluripotent stem cells such as iPS cells and ES cells are susceptible to transcriptional expression inhibition, and even in a case of using a CMV promoter derived from virus or a strong CAG promoter, an expression level of protein is lower than that in general cell lines derived from tumors. It is known that as a result, genome editing efficiency by the CRISPR-Cas9 system is also extremely low in pluripotent stem cells.

For example, Non Patent Document 3 discloses that unlike HEK 293T cells, in iPS cells, an expression level of foreign genes is higher in a case of using an EF1α promoter than a case of using a CAG promoter, but even in a case of using the EF1α promoter, an activity level of a foreign gene product (blood-clotting factor VIII) is only about ⅛ to ⅕ of that in HEK 293T cells into which the same construct has been introduced (Non Patent Document 3, FIG. 2, and the like).

Furthermore, Non Patent Document 4 discloses that genome editing efficiency when using the CRISPR-Cas9 system was 80% or more in HEK 293T cells, whereas it was only about 40% in iPS cells (Non Patent Document 4, FIG. 1, and the like).

Furthermore, Non Patent Document 5 discloses that when HEK 293T cells and iPS cells were analyzed by comparing an incidence rate of non-homologous end joining (NHEJ) in the CRISPR-Cas9 system, an incidence rate of NHEJ in the HEK 293T cells was 10% to 25%, whereas an incidence rate of NHEJ in the iPS cells was 2% to 4% (Non Patent Document 5, FIG. 2, and the like).

Since genome editing efficiency when using the CRISPR-Cas9 system is extremely low in stem cells such as iPS cells as described above, it has been thought that it is not easy to apply genome editing technologies to therapy of human genetic disorders. Furthermore, in the CRISPR-Cas9 system, only a small deletion of a few nucleotides to tens of nucleotides can be introduced in general, and this has also been a factor in narrowing the above therapeutic usage applications.

CITATION LIST

Non Patent Documents

[Non Patent Document 1]
Mohanraju P., et al., Diverse evolutionary roots and mechanistic variations of the CRISPR-Cas systems, Science, 353 (6299), aad5147, 2016.
[Non Patent Document 2]
Westra E R et al., CRISPR Immunity Relies on the Consecutive Binding and Degradation of Negatively Supercoiled Invader DNA by Cascade and Cas3, Mol Cell, 46 (5), 595-605, 2012.
[Non Patent Document 3]
Matsui H. et al., Delivery of full-length factor VIII using a piggy Bac transposon vector to correct a mouse model of hemophilia A, PLOS One., 9 (8), e104957, 2014.
[Non Patent Document 4]
Ishida K., et al., Site-specific randomization of the endogenous genome by a regulatable CRISPR-Cas9 piggyBac system in human cells, Sci Rep., 8 (1), 310, 2018.
[Non Patent Document 5]
Mali P., et al., RNA-guided human genome engineering via Cas9, Science., 339 (6121), 823-826, 2013.

SUMMARY OF INVENTION

Technical Problem

In many human genetic disorders, an extremely high therapeutic effect can be expected by knocking out a specific gene or deleting a specific region in a gene over a wide range. However, in the CRISPR-Cas9 system, only a deletion of a few bases to tens of bases of nucleotides can be introduced in general even when a single gRNA is used, and therefore this system was not suitable for inducing gene knockout or wide-range deletions in a gene. The reason for this is because AUG after a deletion site functions as a start codon to express a truncated protein, and this may partially compensate for a function of a full-length protein. Accordingly, a method for introducing a large deletion into a target site on a genome is being examined by introducing a small deletion into a plurality of sites on a genome using a plurality of gRNAs and selecting cells having genomic DNA in which a site between small deletions has been further deleted. However, deletions are required to occur at all of the plurality of sites, and therefore this method cannot be said to be realistic for stem cells (particularly pluripotent stem cells) having an extremely low deletion introduction efficiency.

In view of these circumstances, an object of the present invention is to provide a technique of introducing a deletion of more than 100 bases of nucleotides into a target region of genomic DNA in general cells including stem cells.

Solution to Problem

The present invention includes the following aspects.
[1] A production method of genomic DNA in which a deletion of more than 100 bases of nucleotides is introduced into a target region of the genomic DNA, the method including a contact step of bringing a type I CRISPR associated complex for anti-viral defense (type I Cascade complex), CRISPR RNA (crRNA), and Cas3 protein into contact with the genomic DNA.
[2] The production method according to [1], in which the contact step is performed in a eukaryotic cell.

[3] The production method according to [2], in which the eukaryotic cell is a stem cell.
[4] The production method according to [2] or [3], in which the type I Cascade complex consists of Cse1 protein, Cse2 protein, Cas7 protein, Cas5 protein, and Cas6 protein, the method further includes a step of introducing the Cse1 protein, the Cse2 protein, the Cas7 protein, the Cas5 protein, the Cas6 protein, and the Cas3 protein into the eukaryotic cell in the form of an expression vector prior to the contact step, and the expression vector is for expressing two to four proteins selected from the group consisting of the Cse1 protein, the Cse2 protein, the Cas7 protein, the Cas5 protein, the Cas6 protein, and the Cas3 protein by one promoter.
[5] The production method according to [2] or [3], in which the type I Cascade complex consists of Cse1 protein, Cse2 protein, Cas7 protein, Cas5 protein, and Cas6 protein, and the method further includes a step of introducing the Cse1 protein, the Cse2 protein, the Cas7 protein, the Cas5 protein, the Cas6 protein, the Cas3 protein, and the crRNA into the eukaryotic cell in the form of RNA prior to the contact step.
[6] The production method according to any one of [2] to [5], in which the target region is a β2-microglobulin (B2M) gene or a regulatory region thereof, or vicinities thereof: a Human Leukocyte Antigen (HLA) gene or a regulatory region thereof, or vicinities thereof; or a dystrophin (DMD) gene or a regulatory region thereof, or vicinities thereof.
[7] A production method of a stem cell in which genomic DNA is modified, the method including a contact step of bringing a type I Cascade complex, crRNA, and Cas3 protein into contact with the genomic DNA of the stem cell.
[8] A kit for modifying a target region of genomic DNA, the kit including: a type I Cascade complex, constituent proteins of the type I Cascade complex, mRNAs encoding the constituent proteins of the type I Cascade complex, or expression vectors for the constituent proteins of the type I Cascade complex; crRNA or an expression vector for the crRNA; and Cas3 protein, mRNA encoding the Cas3 protein, or an expression vector for the Cas3 protein.

It can also be said that the present invention includes the following aspects.
[P1] A method for introducing a deletion of more than 100 bases of nucleotides into a target region of genomic DNA, the method including a contact step of bringing a type I CRISPR associated complex for anti-viral defense (type I Cascade complex), CRISPR RNA (crRNA) that can hybridize to the target region, and Cas3 protein into contact with the genomic DNA.
[P2] The method according to [P1], in which the contact step is performed in a eukaryotic cell.
[P3] The method according to [P1] or [P2], in which the target region is a β2-microglobulin (B2M) gene or a regulatory region thereof, a Human Leukocyte Antigen (HLA) gene or a regulatory region thereof, or a dystrophin (DMD) gene or a regulatory region thereof.
[P4] A genomic DNA-modified cell produced by the method according to [P2] or [P3].
[P5] A kit for modifying a target region of genomic DNA, the kit including: a type I Cascade complex, constituent proteins of the type I Cascade complex, mRNAs encoding the constituent proteins of the type I Cascade complex, or expression vectors for the constituent proteins of the type I Cascade complex; crRNA that can hybridize to the target region of the genomic DNA, or an expression vector for the crRNA; and Cas3 protein, mRNA encoding the Cas3 protein, or an expression vector for the Cas3 protein.

Advantageous Effects of Invention

According to the present invention, it is possible to provide a technique of efficiently introducing a deletion of more than 100 bases of nucleotides into a target region of genomic DNA in cells including stem cells (particularly preferably pluripotent stem cells).

BRIEF DESCRIPTION OF DRAWINGS

FIG. 7(a) is a photograph showing results obtained when an amplified product obtained by PCR was analyzed by agarose gel electrophoresis in Experimental Example 2. FIG. 7(b) is a schematic diagram showing results obtained when the PCR product shown in the photograph of FIG. 7(a) was analyzed in more details by Sanger sequencing.

FIG. 29(a) is a schematic diagram showing a construct of mRNA that expresses each of Cas7, Cas5, and Cse1 as individual proteins from a single mRNA. FIG. 29(b) is a schematic diagram showing a construct of mRNA that expresses each of Cse2, Cas6, and Cas3 as individual proteins from a single mRNA.

FIG. 43 is a diagram showing results of aligning analyzed base sequences relative to a base sequence of human DMD in Experimental Example 18.

DESCRIPTION OF EMBODIMENTS

Figure 1:
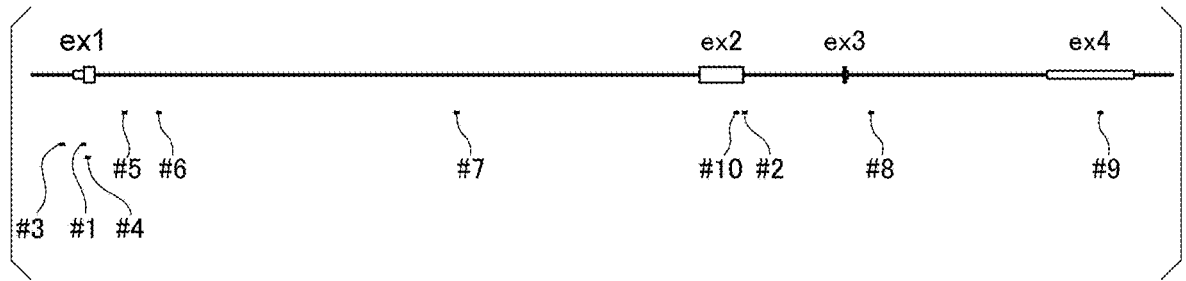
FIG. 1 is a schematic diagram showing a structure of a B2M locus.

[Method for Introducing Deletion of More than 100 Bases of Nucleotides into Target Region]

In one embodiment, the present invention provides a method for introducing a deletion of more than 100 bases of nucleotides into a target region of genomic DNA, the method including a contact step of bringing a type I Cascade complex, crRNA, and Cas3 protein into contact with the genomic DNA. It can also be said that the method of the present embodiment is a production method of genomic DNA from which more than 100 bases of nucleotides are deleted.

As will be described later in Examples, according to the method of the present embodiment, it may be possible to more efficiently introduce a nucleotide deletion into a target region of genomic DNA than a case of using a CRISPR-Cas9 system.

In the method of the present embodiment, a target sequence refers to a base sequence of a single-stranded DNA which forms a complementary strand with DNA to which crRNA hybridizes. Furthermore, in the method of the present embodiment, the target region of genomic DNA means a region (double-stranded DNA region) on the genomic DNA into which a deletion is to be introduced, and it specifically means a double-stranded DNA region in the vicinity of the target sequence. More specifically, a spacer sequence of crRNA binds complementarily to an antisense strand of the target sequence. Accordingly, a spacer base sequence of crRNA and a base sequence of a sense strand of the target sequence are highly homologous, and the spacer base sequence of crRNA and a base sequence of the antisense strand of the target sequence are generally complementary.

The vicinity of the target sequence may be, for example, a double-stranded DNA region with, as a starting point, a nucleotide separated from the 5'-side or 3'-side of the target sequence by about 1 to 5,000 bases, preferably separated from the 5'-side or 3'-side by about 1 to 1,000 bases, more preferably separated from the 5'-side by about 1 to 1,000 bases, and even more preferably separated from the 5'-side by about 10 to 500 bases. Furthermore, an end point of the target sequence may be a base separated from the above starting point by a length of a nucleotide deletion to be described later. According to the method of the present embodiment, it is possible to introduce a deletion of more than 100 bases of nucleotides into the vicinity of the target sequence.

A length of nucleotides that can be deleted is more than 100 bases, and nucleotides with about 10,000 bases in length can also be deleted. Furthermore, it is also possible to delete nucleotides with 10,000 bases or more in length.

The method of the present embodiment can be performed in vitro, can be performed in eukaryotic cells, or can be performed in vivo (in a living body). Examples of eukaryotic cells include yeast cells, insect cells, animal cells, and the like. Animal cells may be human cells or non-human animal cells. Non-human animals are not particularly limited, and examples thereof include mice, rats, rabbits, pigs, sheep, goats, cows, monkeys, and the like. Furthermore, animal cells may be stem cells. Examples of stem cells include pluripotent stem cells, adult stem cells, and the like, where pluripotent stem cells are particularly preferable. Examples of pluripotent stem cells include embryonic stem cells (ES cells), induced pluripotent stem cells (iPS cells), embryonal carcinoma cells (EC cells), EG cells, which are pluripotent stem cells derived from primordial germ cells, ntES cells, which are ES cells derived from somatic cells, and the like. Adult stem cells are also called tissue stem cells and somatic stem cells. Examples of adult stem cells include hematopoietic stem cells, mesenchymal stem cells, neural stem cells, muscle stem cells (satellite cells), skin stem cells, and the like.

Of the above examples, in the present invention, stem cells can be preferably used, pluripotent stem cells are more preferable, embryonic stem cells and induced pluripotent stem cells are even more preferable, and induced pluripotent stem cells are most preferable. The reason for this is because in these cells, it is difficult to introduce a large deletion into a desired site of genomic DNA by using the prior art. The type of cell is preferably human cells.

In a case where the method of the present embodiment is performed in a cell, the method of the present embodiment can be a production method of a genomic DNA-modified cell in which a deletion of more than 100 bases of nucleotides is introduced into a target region of the genomic DNA.

As described above, the class 1 CRISPR systems include type I, type III, and type IV CRISPR systems, but in the method of the present embodiment, it is preferable to use the type I CRISPR system among the class 1 CRISPR systems.

The type I CRISPR system functions with a Cascade complex, crRNA, and Cas3 protein unlike the type II CRISPR system that functions only with Cas9 protein and gRNA (sgRNA or a complex of crRNA and tracrRNA).

In the class 1 CRISPR systems, pre-crRNA in which a plurality of sequences each consisting of a repeated sequence and a spacer sequence is consecutive is transcribed after a leader sequence. Thereafter, RNA cleavage is induced by the 3'-side of a stem loop in the repeated sequence by the action of RNA nuclease such as Cas6, resulting in mature crRNA. That is, mature crRNA generally has a part of a repeated sequence (a base sequence called a 5'-handle sequence with about 5 to 10 bases), a spacer sequence, and a repeated sequence from the 5'-side to the 3'-side.

crRNA in the method of the present embodiment is RNA consisting of a first repeated sequence, a spacer sequence, and a second repeated sequence. In the present specification, RNA consisting of a first repeated sequence, a spacer sequence that binds to a complementary strand of a target sequence, and a second repeated sequence may be referred to as pre-crRNA. Furthermore, crRNA may have a base sequence in which a plurality of sequence portions each consisting of a repeated sequence and a spacer sequence is consecutive. Furthermore, crRNA in the method of the present embodiment may further have a leader sequence on the 5'-side of the crRNA. That is, crRNA in the method of the present embodiment may be RNA consisting of a leader sequence, a first repeated sequence, a spacer sequence that binds to a complementary strand of a target sequence, and a second repeated sequence.

In the method of the present embodiment, crRNA capable of hybridizing to a target region is preferably pre-crRNA in which mature crRNA can hybridize to a target region. That is, crRNA in the method of the present embodiment is preferably pre-crRNA.

In the method of the present embodiment, crRNA may be RNA having a first repeated sequence, a spacer sequence that binds to a complementary strand of a target sequence, and a second repeated sequence in this order, or may be RNA further having a leader sequence before the first repeated sequence.

Alternatively, crRNA may be RNA having a first repeated sequence, a first spacer sequence that binds to a complementary strand of a target sequence, a second repeated sequence, a second spacer sequence, and a third repeated sequence in this order, or may be RNA further having a third spacer sequence and a fourth repeated sequence after the third repeated sequence.

In order to carry out the method of the present embodiment, crRNA is preferably pre-crRNA having a repeated sequence on the 5'-side of a spacer sequence.

Furthermore, a leader sequence may be a leader sequence present in the 2,899,000th to 2,906,000th regions (sometimes referred to as a "Locus B" in the present specification) in a base sequence (NCBI accession number: U00096.2) of genomic DNA of *Escherichia coli*. A base sequence of the leader sequence derived from the Locus B is set forth in SEQ ID NO: 58.

Alternatively, a leader sequence may be a leader sequence present in the 2,875,000th to 2,886,000th regions (sometimes referred to as a "Locus A" in the present specification) in a base sequence (NCBI accession number: U00096.2) of genomic DNA of *Escherichia coli*. A base sequence of the leader sequence derived from the Locus A is set forth in SEQ ID NO: 57.

As will be described later in Examples, the inventors of the present invention have clarified that the leader sequence derived from the Locus A can be used as a leader sequence of crRNA of the type I CRISPR system.

crRNA may have a structure in which spacer sequences are in tandem arrays with a repeated sequence therebetween. As will be described later in Examples, the inventors of the present invention have clarified that by using such crRNA, genome editing can be induced for a plurality of target sequences at once by using only one kind of crRNA molecule. It is difficult to apply such a method of inducing DNA cleavage at a plurality of sites at once using crRNA to the CRISPR-Cas9 system.

Furthermore, crRNA may be deficient in 5 bases of 1st to 5th bases from the 5'-side of a first repeated sequence, may be deficient in 5 bases of 1st to 11th bases from the 5'-side of a first repeated sequence, or may be deficient in 5 bases of 1st to 15th bases from the 5'-side of a first repeated sequence.

As will be described later in Examples, the inventors of the present invention have clarified that genome editing can be induced with high efficiency by the type I CRISPR system using such crRNA having a truncated first repeated sequence. When preparing RNA to be introduced into cells or living bodies, as a length of RNA becomes shorter, a synthesis cost is reduced more, and therefore use of shorter crRNA is a great advantage.

In the method of the present embodiment, a plurality of kinds of crRNA may be used in combination. As will be described later in Examples, the inventors of the present invention have clarified that genomic DNA in a large region of 340 kb or more can be deleted by using two kinds of crRNA designed to face each other.

Type I CRISPR systems have subtypes of types I-A, I-B, I-C, I-U, I-D, I-E, and I-F. All these CRISPR systems function in the same manner, but the type I-E CRISPR system can be preferably used among them. Typical examples of the type I-E CRISPR system include a CRISPR system derived from *Escherichia coli*, but they are not limited to the CRISPR system derived from *Escherichia coli*, and CRISPR systems derived from other organism species can also be used in the same manner. As will be described later in Examples, the inventors of the present invention have clarified that the type I-E CRISPR system also functions in human cells including human iPS cells.

The type I CRISPR system is composed of a type I Cascade complex, crRNA, and Cas3 protein. The Cascade complex of the type I-E CRISPR system is composed of Cse1 protein, Cse2 protein, Cas7 protein, Cas5 protein, and Cas6 protein. In the present specification, these five kinds of proteins may be referred to as constituent proteins of the type I Cascade complex. Examples of NCBI accession numbers of the Cse1 protein belonging to the type I-E derived from *Escherichia coli* include NP 417240.1 and the like. Examples of NCBI accession numbers of the Cse2 protein include NP_417239.1 and the like. Examples of NCBI accession numbers of the Cas7 protein include NP_417238.1 and the like. Examples of NCBI accession numbers of the Cas5 protein include NP_417237.2 and the like. Examples of NCBI accession numbers of the Cas6 protein include NP_417236.1 and the like. Furthermore, examples of NCBI accession numbers of the Cas3 protein include NP_417241.1 and the like.

Each of the constituent proteins of the Cascade complex may have a mutation in an amino acid sequence described in the above accession numbers as long as the method of the present embodiment can be carried out. The mutation may be a substitution, deletion, addition, or the like of one or several amino acids. When the term one or several is referred to, it may be, for example, 1 to 30, 1 to 20, 1 to 10, or 1 to 5.

Alternatively, each of the constituent proteins of the Cascade complex may have a mutation as long as the method of the present embodiment can be carried out, and it may have a sequence identity of 70% or more, preferably 80% or more, more preferably 90% or more, and even more preferably 95% or more, with respect to the amino acid sequence described in the above accession numbers.

For the constituent proteins of the Cascade complex and the Cas3 protein, methods of obtaining them are not limited. Those cloned from *Escherichia coli* based on base sequence information published by the above accession numbers may be used, a commercially available plasmid containing the type I CRISPR system may be obtained and used, DNA encoding CRISPR-Cas may be obtained by PCR using this plasmid as a template, or they may be artificially produced using a known artificial gene synthesis technique.

In a case where the method of the present embodiment is carried out in eukaryotic cells, it is preferable to add a nuclear localization signal (NLS) to each of the constituent proteins of the Cascade complex and the Cas3 protein. An NLS may be added to the N-terminus of each of the proteins, may be added to the C-terminus thereof, or may be added both the N-terminus and the C-terminus thereof. The number of NLSs to be added may be one, two or more, or three or more. Furthermore, in expectation of optimizing a level of protein translation, a codon of a gene encoding each of the proteins may be modified according to frequency of use of codons of eukaryotic species for which the method of the present embodiment is performed.

The type I Cascade complex forms a complex (hereinafter, sometimes referred to as a "type I Cascade-crRNA complex") with crRNA. Subsequently, the type I Cascade-crRNA complex binds to double-stranded DNA containing a PAM sequence and a target sequence. The type I Cascade-crRNA complex, in which the PAM sequence is found, partially unwinds the double strand of DNA to form a structure called an R-loop. At this time, the type I Cascade-crRNA complex itself also undergoes a structural change and binds to the Cas3 protein. The Cas3 protein has DNA nickase activity and DNA helicase activity.

As will be described later in Examples, the inventors of the present invention have clarified that the Cas3 protein bound to the type I Cascade-crRNA complex introduces a deletion of more than 100 bases of nucleotides into the 5'-side of a crRNA target sequence. It is unexpected that the Cas3 protein, which has only nick-inducing activity and helicase activity, introduces a deletion of nucleotides as if it induced double-stranded DNA cleavage. Furthermore, regarding the reason why a deletion length exceeds 100 bases, the molecular mechanism is also unclear.

crRNA can hybridize to a sequence complementary to a target base sequence. The target sequence is adjacent to a short sequence (a protospacer adjacent motif: PAM) recognized by the CRISPR system. A sequence and a length of the PAM vary depending on the type of nuclease used, but the PAM is typically a base sequence with 2 to 5 bases which is adjacent to the target sequence. For example, "ATG," "AAG," "AGG," "GAG," "TAG," and the like are known as PAM sequences of the type I-E CRISPR system derived from *Escherichia coli*. As will be described later in Examples, the inventors of the present invention have newly found that "AAA" can be used as a PAM sequence of the type I CRISPR system. Accordingly, in the present invention, "ATG," "AAG," "AGG," "GAG," "TAG," or "AAA" can be used as the PAM sequence.

A target sequence of the type I-E CRISPR system of the class 1 can be designed as a consecutive base sequence with 15 to 30 bases which is adjacent to a PAM sequence, in a sense strand or antisense strand of a target gene. Furthermore, a base, which is not recognized by crRNA and does not contribute to sequence specificity, is present for every 6 bases. For example, when an arbitrary base that does not contribute to sequence recognition of crRNA is X, and a base of a target sequence is N (A, T, G, or C), a PAM sequence and the target sequence can be

```
                                           (SEQ ID NO: 25)
5'-AAGNNNNNXNNNNNXNNNNNXNNNNNXNNNNNXNN-3', (SEQ ID NO: 26)
5'-AGGNNNNNXNNNNNXNNNNNXNNNNNXNNNNNXNN-3', (SEQ ID NO: 108)
5'-ATGNNNNNXNNNNNXNNNNNXNNNNNXNNNNNXNN-3', (SEQ ID NO: 109)
5'-GAGNNNNNXNNNNNXNNNNNXNNNNNXNNNNNXNN-3', (SEQ ID NO: 110)
5'-TAGNNNNNXNNNNNXNNNNNXNNNNNXNNNNNXNN-3', (SEQ ID NO: 111)
5'-AAANNNNNXNNNNNXNNNNNXNNNNNXNNNNNXNN-3',
``` and the like. In the base sequence portion represented by N above, cleavage can occur even when a base sequence of a spacer sequence of crRNA and the target sequence do not match 100%, and therefore the target sequence may have a mutation of 1 to 3 bases in the base sequence represented by N. Examples of mutations include substitutions, deletions, and additions. Furthermore, because the base represented by X above may be an arbitrary base, the base sequence of crRNA can further have a mutation of 5 bases at maximum. The target sequence is not particularly limited as long as it is a base sequence adjacent to the above-mentioned PAM sequence, and it can be appropriately selected depending on intended purposes.

The contact step of bringing the type I Cascade complex, crRNA, and Cas3 protein into contact with genomic DNA can be performed by causing the type I Cascade complex, crRNA, and Cas3 protein to coexist in a cell. For this purpose, for example, it is sufficient for the following (1), (2), and (3) to be introduced into a cell: (1) a type I Cascade complex, constituent proteins of the type I Cascade complex, mRNAs encoding the constituent proteins of the type I Cascade complex, or expression vectors for the constituent proteins of the type I Cascade complex; (2) crRNA or an expression vector for the crRNA; and (3) Cas3 protein, mRNA encoding the Cas3 protein, or an expression vector for the Cas3 protein. Hereinafter, the CRISPR system consisting of the type I Cascade complex, crRNA, and Cas3 protein may be sometimes referred to as a "type I CRISPR system." crRNA is preferably pre-crRNA, and it may be pre-crRNA having a leader sequence.

Introduction of proteins, mRNAs, and expression vectors into a cell may be carried out by a lipofection method, or may be carried out by an electroporation method. Alternatively, it is also possible to use other introduction methods (a virus vector method, a sonoporation method, a lipid nanoparticle method, a virus-like particle method, and the like). However, as shown in Examples, the inventors of the present invention have found that in a case of introducing proteins, mRNAs, and expression vectors into cells with low gene introduction efficiency such as iPS cells, introduction efficiency, and genome editing efficiency via Cas3 are improved when using the electroporation method than the lipofection method. Accordingly, the electroporation method can be preferably used in an embodiment in which control cells are stem cells (particularly pluripotent stem cells).

The constituent proteins of the Cascade complex, and mRNA encoding Cas3 can be synthesized by in vitro transcription (IVT) reaction. At this time, as a nucleotide to be used, a naturally occurring nucleotide may be used, a chemically modified nucleotide may be used to impart nuclease resistance or modify chemical properties, or both of these nucleotides may be mixed and used. Furthermore, mRNA may be provided with a 5' Cap structure or a 5' Cap-like structure. Furthermore, an untranslated region on the 5'-side or 3'-side of mRNA may be provided with a sequence that enhances RNA stability (for example, a 3' UTR sequence of hemoglobin) or a sequence that enhances translation efficiency (for example, WPRE).

crRNA may be synthesized by in vitro transcription (IVT) reaction or may be prepared by chemical synthesis. As a method of chemically synthesizing RNA, it is possible to preferably use a general method of synthesizing nucleic acid, such as a method using nucleoside phosphoramidite and a solid-phase carrier. In the synthesis of crRNA, by introducing a chemical modification as well as natural bases, it is also possible to adjust nuclease resistance, regulation of hybridization ability, cell cytotoxicity, intracellular half-life, intracellular localization, ease of incorporation into cells, molecular size, and the like.

Examples of expression vectors include DNA vectors for expressing mRNA, artificial chromosome vectors, vectors that can replicate in eukaryotic cells, vectors maintained to some extent in cells as an episome, vectors incorporated into a host cell genome, and the like. Virus vectors, transposon vectors, plasmid vectors, and the like are exemplary examples.

Examples of DNA vectors include plasmid DNA vectors, cosmid vectors, fosmid vectors, minicircle vectors, episomal DNA vectors, and the like.

Examples of artificial chromosome vectors include Bacterial Artificial Chromosome (BAC) vectors, Human artificial chromosome (HAC) vectors, Yeast artificial chromosome (YAC) vectors, and the like.

Examples of virus vectors include adenovirus vectors, retrovirus vectors, lentivirus vectors, Sendai virus vectors, adeno-associated virus vectors, and the like.

Examples of transposon vectors include piggyBac vectors, piggyBat vectors, Sleeping Beauty vectors, TolII vectors, LINE vectors, and the like.

The vector may contain a selectable marker. The "selectable marker" refers to a genetic element that provides a selectable phenotype to cells into which a selectable marker has been introduced. Examples thereof include drug-resistant genes whose gene product imparts resistance to drugs that inhibit proliferation of cells or kill cells, genes encoding fluorescent proteins, and the like.

Examples of drug-resistant genes include a puromycin-resistant gene, a neomycin-resistant gene, a hygromycin-resistant gene, a blasticidin-resistant gene, a hisD gene, a Gpt gene, a Ble gene, and the like. Example of medications useful for selecting the presence of drug-resistant genes include puromycin for the puromycin-resistant gene, G418 for the neomycin-resistant gene, hygromycin for the hygromycin-resistant gene, blasticidin for the blasticidin gene, histidinol for the hisD, xanthine for the Gpt, and bleomycin for the Ble. Examples of fluorescent proteins include green fluorescent protein (GFP) or a derivative thereof, mCherry, tdTomato, RFP, BFP, and the like.

As will be described later in Examples, the inventors of the present invention have clarified that in a case of introducing an expression vector into cells with low gene introduction efficiency such as pluripotent stem cells, genome editing efficiency can be improved by loading a drug-resistant gene into the expression vector, performing drug selection in a short period of time after the introduction of the expression vector, and concentrating cells into which the expression vector has been incorporated.

The expression vector may be a combination of individual expression vectors each capable of expressing each of factors of Cse1 protein, Cse2 protein, Cas7 protein, Cas5 protein, Cas6 protein, Cas3 protein, and crRNA: one expression vector may be prepared to be able to express a plurality of these factors: or one expression vector may be prepared to be able to express all of these factors.

In a case where one expression vector expresses a plurality of these factors, each of the factors may be linked by a 2A sequence that induces ribosomal skipping, an Internal Ribosome Entry Site (IRES) sequence having a ribosome binding site, or the like. Examples of 2A sequences include a P2A sequence derived from Porcine teschovirus, a T2A sequence derived from *Thosea asigna*, a F2A sequence derived from foot-and-mouth disease virus, an E2A sequence derived from equine rhinitis A virus, and the like, and any 2A sequence may be used. The 2A sequence is also referred to as a self-cleaving peptide sequence. The IRES sequence may be a sequence derived from a virus such as Encephalomyocarditis virus and Foot-and-mouth disease virus, or may be a sequence derived from mRNA in a cell. Accordingly, two or more proteins can be individually expressed from a single mRNA.

[Forms of Constituent Proteins of Type I Cascade Complex, Cas3 Protein, and crRNA which are to be Introduced into Cells]

As will be described later in Examples, the inventors of the present invention have clarified that in a case where three kinds of the following expression vectors (1), (2), and (3) were introduced, genome editing can be induced with high efficiency in HEK 293T cells, whereas genome editing efficiency is extremely low in iPS cells, (1) a single expression vector in which a Cse1 gene, a Cse2 gene, a Cas7 gene, a Cas5 gene, and a Cas6 gene are driven by one promoter: (2) an expression vector expressing Cas3 protein; and (3) an expression vector of crRNA (pre-crRNA).

Furthermore, the inventors of the present invention have clarified that in a case where two kinds of the following expression vectors (1) and (2) were introduced, genome editing can be induced with high efficiency in HEK 293T cells, whereas genome editing efficiency is extremely low in iPS cells, (1) a single expression vector in which a Cse1 gene, a Cse2 gene, a Cas7 gene, a Cas5 gene, a Cas6 gene, and a Cas3 gene are driven by one promoter; and (2) an expression vector of crRNA (pre-crRNA).

Furthermore, the inventors of the present invention have clarified that in a case where seven kinds of expression vectors, in which transcription of each of a Cse1 gene, a Cse2 gene, a Cas7 gene, a Cas5 gene, a Cas6 gene, a Cas3 gene, and a crRNA gene (whose transcript is pre-crRNA) is driven by different promoters, were introduced, genome editing can be induced with high efficiency in HEK 293T cells, whereas induction of genome editing can hardly be detected in iPS cells.

On the other hand, the inventors of the present invention have clarified that in a case where three kinds of the following expression vectors (1) and (2) were introduced, genome editing can be efficiently induced also in iPS cells, (1) two kinds of expression vectors in which three genes among a Cse1 gene, a Cse2 gene, a Cas7 gene, a Cas5 gene, a Cas6 gene, and a Cas3 gene are driven at a time by one promoter; and (2) a crRNA expression vector. The genome editing efficiency reached about four times at maximum compared to a case in which above-mentioned expression form was adopted. Such results were unexpected results that were difficult to predict.

Accordingly, regarding the aspect in which the constituent proteins of the type I Cascade complex are introduced into stem cells in the form of an expression vector, an aspect in which each gene of two to four constituent proteins is expressed by one promoter is preferable, and an aspect in which each gene of three constituent proteins is expressed by one promoter is more preferable.

Furthermore, the inventors of the present invention have clarified that in a case where three kinds of the following RNAs (1) and (2) were introduced, genome editing can be performed with high efficiency also in iPS cells, (1) two kinds of mRNAs each individually expressing three constituent proteins among Cse1 protein, Cse2 protein, Cas7 protein, Cas5 protein, Cas6 protein, and Cas3 protein; and (2) crRNA.

Accordingly, regarding the aspect in which the constituent proteins of the type I Cascade complex are introduced into stem cells in the form of mRNA, it is preferable to use mRNA that polycistronically encodes two to four constituent proteins, and it is more preferable to use mRNA that polycistronically encodes the three constituent proteins.

The inventors of the present invention have further clarified that in an aspect in which genome editing is performed by introducing two kinds of the following expression vectors (1) and (2), genome editing efficiency in iPS cells is significantly different between a case in which transcription directions of the two promoters are in the same direction (Uni-directional promoter), and a case in which the directions are in opposite directions (Bi-directional promoter), (1) a single expression vector which has two promoters and in which three genes among a Cse1 gene, a Cse2 gene, a Cas7 gene, a Cas5 gene, a Cas6 gene, and a Cas3 gene are driven at a time by one promoter; and (2) a crRNA expression vector. Furthermore, it has been clarified that genome editing efficiency is the highest in a case where the two promoters are in opposite directions. Such results were unexpected results that were difficult to predict. The genome editing efficiency obtained in the aspect in which three genes were expressed at a time by the above-described Uni-directional promoter was almost the same as the genome editing efficiency obtained in the aspect in which three genes were expressed at a time by one promoter using two kinds of expression vectors.

The above results indicate that genome editing efficiency significantly changes depending on aspects of expressing each of factors of the type I CRISPR system.

Accordingly, regarding the aspect in which the constituent proteins of the type I Cascade complex are introduced into stem cells (particularly pluripotent stem cells) in the form of an expression vector, an expression cassette aspect in which three genes are expressed at a time by one promoter (two promoters in total) is particularly preferable, where the two expression cassettes may be on the same expression vector, or may be on different expression vectors. An aspect in which two expression cassettes loaded with three genes are disposed in opposite directions on the same expression vector (Bi-directional promoter) is most preferable.

A promoter expressing Cse1 protein, Cse2 protein, Cas7 protein, Cas5 protein, Cas6 protein, and Cas3 protein may be a stable expression type promoter such as a CAG promoter or an EF1a promoter, or may be an expression-inducible type promoter.

As the expression-inducible type promoter, it is possible to use, for example, a promoter capable of inducing expression upon addition or removal of an expression-regulating substance into or from a medium, irradiation with light, change in temperature, and the like. The expression-inducible type promoter may be a promoter inducing expression of fusion protein upon addition of an expression-regulating substance into a medium, or may be a promoter inducing expression of fusion protein upon removal of an expression-regulating substance from a medium. More specific examples of expression-inducible type promoter include, but are not limited to, doxycycline-inducible type promoters (TetO promoters).

As will be described later in Examples, the inventors of the present invention have produced a piggyBac vector in which expression of the constituent proteins of the type I Cascade complex and Cas3 protein is induced in a doxycycline-induced manner. Furthermore, this vector was introduced into HEK 293T cells to obtain a stable expression line.

Such a vector can be suitably used especially in a case of inducing genome editing by the type I CRISPR system in a cell model.

[Target Region]

The target region of genomic DNA which is a target into which a deletion of nucleotides is introduced may be a gene, a regulatory region thereof, and the like. Examples of gene regulatory regions include a promoter sequence, an enhancer sequence, and the like. For example, the gene may be a gene that is involved in a genetic disorder and can be a target of gene therapy, may be a gene with a mutation, may be a gene not encoding protein (a gene encoding non-coding RNA, for example, a gene encoding miRNA), may be a region related to chromosome replication or distribution, may be a gene involved in infection with a pathogen such as bacteria or viruses, or may be a gene involved in immune rejection of cells.

Specific examples of target regions include a β2-microglobulin (B2M) gene or a regulatory region thereof, or their vicinities: a Human Leukocyte Antigen (HLA) gene or a regulatory region thereof, or their vicinities: a dystrophin (DMD) gene or a regulatory region thereof, or their vicinities; and the like. When the term vicinity is referred to, it means a region within 5 to 10 kb, and more preferably a region within 1 kb.

The HLA gene refers to an HLA-A gene, an HLA-B gene, an HLA-C gene, an HLA-E gene, an HLA-F gene, an HLA-G gene, an HLA-DRA gene, an HLA-DRB gene, an HLA-DPA gene, an HLA-DPB gene, an HLA-DQA gene, an HLA-DQB gene, and the like. It is known that each of the HLA genes has sequence diversity. For example, for the HLA-A gene, there are multiple HLA types such as HLA-A2 and HLA-A27 according to their difference in amino acid sequence and base sequence (ebi.ac.uk/ipd/imgt/hla/). The HLA gene is also called an MHC gene.

For example, in a case where a target region is a B2M gene or a regulatory region thereof, or their vicinities: or an HLA gene or a regulatory region thereof, or their vicinities, and a deletion of an exon region, a promoter region, and the like, which are important for expression of B2M protein or HLA protein, is induced, expression of class I HLA protein on a cell surface can be attenuated or lost, and thereby HLA-mediated antigenicity of cells can be reduced. In a case where such cells are transplanted into a host, immunorejection from the host can be avoided or reduced.

Accordingly, even in a case of allogeneic transplantation, it is possible to produce cells with reduced immunorejection mediated by HLA antigens. This method is a technique that is not limited to iPS cells but can be widely applied to allogeneic cell transplantation using the following other cell types and is extremely highly versatile and applicable, the other cell types being: ES cells, hematopoietic stem cells, T cells, NK cells, megakaryocytes, bone marrow cells, umbilical cord blood cells, muscle cells, muscle stem cells, chondrocytes, osteoblasts, cardiomyocytes, vascular endothelial cells, nerve cells, glial cells, microglial cells, neural stem cells, skin cells, fibroblasts, retinal cells, corneal cells, photoreceptor cells, liver cells, pancreatic islet cells, β cells, mesenchymal stem cells, and the like. Accordingly, a range of recipient selections for allogeneic transplantation can be expanded, and cost of cell production in cell therapy and regenerative medicine can be dramatically reduced.

Furthermore, for example, in a case of cells in which a target region is a DMD gene or a regulatory region thereof, or their vicinities, and a reading frame of dystrophin (DMD) protein is misaligned in patients with Duchenne muscular dystrophy, by inducing a deletion of a specific single or plural exons, the reading frame of the DMD protein can be restored, and thereby expression of the DMD protein can be restored. Although the DMD protein expressed in this case is not full length but is a protein in which a part of amino acids is deleted, it can function as a DMD protein. Therefore, cells that have restored expression of the DMD protein can be used in cell transplantation therapy for patients with muscular dystrophy. Furthermore, the type I CRISPR system with a DMD gene as a target gene can also be used in gene therapy for patients with muscular dystrophy.

For these reasons, the target region in the present embodiment may be a B2M gene, a DMD gene, an HLA gene, or their regulatory regions: it is preferably a B2M gene, a DMD gene, an HLA-A gene, an HLA-B gene, an HLA-C gene, an HLA-E gene, an HLA-F gene, an HLA-G gene, a CIITA gene, an HLA-DRA gene, an HLA-DRB gene, an HLA-DPA gene, an HLA-DPB gene, an HLA-DQA gene, an HLA-DQB gene, or their regulatory regions; and it is more preferably a B2M gene, a DMD gene, an HLA-A gene, an HLA-B gene, an HLA-C gene, a CIITA gene, an HLA-DRA gene, an HLA-DRB gene, an HLA-DPA gene, an HLA-DPB gene, an HLA-DQA gene, an HLA-DQB gene, or their regulatory regions.

The method of the present embodiment may further include a step of confirming a deletion of nucleotides in a target region of genomic DNA, a step of selecting and recovering cells in which the deletion of nucleotides has been introduced into the target region of the genomic DNA, and the like.

The confirmation of a deletion of nucleotides in a target region of genomic DNA is performed by, for example, amplifying the front and the rear of a target sequence of crRNA by PCR, and analyzing a size of the amplified DNA using agarose electrophoresis, TapeStation of Agilent Technologies, Inc., or the like. In a case where PCR is performed on bulk cells, and when a deletion of nucleotides in the target region is present in some cells, amplified DNA fragments that are smaller than the original size of the amplified DNA fragments appear.

Alternatively, a base sequence may be determined by the Sanger sequencing method by amplifying a region including the front and the rear of a target sequence of crRNA by PCR. In a case where the sequencing is performed on bulk cells, and when a deletion of nucleotides in the target region is present in some cells, a waveform in which a plurality of base sequences is mixed is detected in chromatogram data of base sequences after the deleted portion. In some cases, it is also possible to separate mixed sequence waveforms using a TIDE method (tide.nki.nl/) or an ICE method (ice.synthego.com/#/). Alternatively, a sequence derived from a single DNA can be analyzed by the Sanger sequencing by cloning PCR-amplified DNA into plasmid DNA or the like, and recovering the plasmid DNA clone from *Escherichia coli* or the like.

Alternatively, a deleted region can be identified by amplifying a region including the front and the rear of a target sequence of crRNA by PCR, performing single molecule long-chain sequencing such as a MiniON sequencer of Oxford Nanopore Technologies or a sequencer of Pacific Biosciences, and mapping with respect to a reference base sequence before and after the target sequence using software such as LAST (last.cbrc.jp/) or minimap2 (github.com/lh3/minimap2).

Furthermore, in a case where a target region is a gene encoding a cell membrane protein or a regulatory region thereof, the cell membrane protein is lost as a result of introducing a deletion of nucleotides into the target region. In this case, it is possible to detect cells in which a deletion of nucleotides has been introduced into the target gene by using an antibody that recognizes the cell membrane protein, a protein that binds to the cell membrane protein, or a substrate. Furthermore, it is possible to concentrate or recover cells in which a deletion of nucleotides has been introduced into the target region by sorting cells that have become negative for the cell membrane protein with a cell sorter, MACS, or the like.

[Genetically Modified Cell]

In one embodiment, the present invention provides a genomic DNA-modified cell, in which a deletion of more than 100 bases of nucleotides is introduced into a target region of genomic DNA, by the above-described method. The cell in which genomic DNA has been modified by the method of the present embodiment may be a cell collected from a living body. Furthermore, the genetically modified cell of the present embodiment can be used for cell transplantation for the purpose of gene therapy, that is, it may be a cell for cell transplantation. In the genetically modified cell of the present embodiment, examples of target regions include a B2M gene or a regulatory region thereof, an HLA gene or a regulatory region thereof, a DMD gene or a regulatory region thereof, and the like.

As described above, in a case where the target region is a B2M gene or a regulatory region thereof, or an HLA gene or a regulatory region thereof, antigenicity the genetically modified cell of the present embodiment is reduced. Therefore, in a case where such cell is transplanted into a host, immunorejection from the host can be avoided or reduced.

Furthermore, in a case where the target region is a DMD gene, and a reading frame of DMD protein is misaligned in patients with muscular dystrophy, by inducing exon skipping of a properly designed target exon, the reading frame of the DMD protein can be restored, and thereby expression of dystrophin protein can be restored in the genetically modified cell of the present embodiment. Therefore, the genetically modified cell of the present embodiment can be used in cell transplantation therapy for patients with muscular dystrophy.

In the genetically modified cell of the present embodiment, a length of deleted nucleotides is more than 100 bases, and it can be about 10,000 bases. Furthermore, nucleotides with 10,000 bases or more in length may be deleted.

As will be described later in Examples (Experimental Example 5, FIG. 12) and the like, the genetically modified cell of the present embodiment retains a target sequence of crRNA of the type I CRISPR system in some cases.

It is difficult to produce a genetically modified cell, in which a deletion of more than 100 bases of nucleotides has been introduced into a target gene, by other means. Furthermore, the genetically modified cell of the present embodiment is characterized in that a deletion of more than 100 bases of nucleotides is introduced into a target gene. Furthermore, in some cases, the genetically modified cell of the present embodiment has an expression vector or protein of the type I CRISPR system, and the like inside the cell. However, it is difficult to specify whether or not a cell is a genetically modified cell of the present embodiment according to these characteristics, and it is practical to specify a cell by a production method.

[Kit for Modifying Target Region of Genomic DNA]

In one embodiment, the present invention provides a kit for modifying a target region of genomic DNA, the kit including: a type I Cascade complex, constituent proteins of the type I Cascade complex, mRNAs encoding the constituent proteins of the type I Cascade complex, or expression vectors for the constituent proteins of the type I Cascade complex; crRNA that can hybridize to the target region of the genomic DNA, or an expression vector for the crRNA; and Cas3 protein, mRNA encoding the Cas3 protein, or an expression vector for the Cas3 protein. When the phrase "modifying a target region of genomic DNA" is referred to, it means a deletion of more than 100 bases of nucleotides is introduced into the target region of the genomic DNA.

With the kit of the present embodiment, it is possible to preferably carry out the above-described method for introducing a deletion of more than 100 bases of nucleotides into a target region of genomic DNA. Furthermore, with the kit of the present embodiment, the above-described genomic DNA-modified cell can be easily produced.

In the kit of the present embodiment, the type I Cascade complex, the constituent proteins of the type I Cascade complex, the crRNA that can hybridize to a target gene, the Cas3 protein, and the expression vector are the same as those described above.

EXAMPLES

Next, the present invention will be described in more detail with reference to examples, but the present invention is not limited to the following examples.

Experimental Example 1

(Disruption 1 of B2M Gene by Type I CRISPR System)

A β2-microglobulin (B2M) gene on a genome of an HEK 293T cell derived from human embryonic kidney was disrupted (knocked out) using the type I CRISPR system.

HLA is classified into class I and class II. Class I HLA proteins (HLA-A, HLA-B, HLA-C, HLA-E, HLA-F, HLA-G, and the like) are expressed in most types of cells in a body. The class I HLA protein has a function of forming a heterodimer with B2M to be expressed on a cell surface, and presenting a peptide with respect to CD8-positive cytotoxic T cells to induce activation. That is, in order for the human class I HLA protein to be presented on the cell surface, it is required to form a heterodimer with B2M protein. When the B2M gene was disrupted using the type I CRISPR system according to the present experiment, HLA protein on the cell surface is lost.

FIG. 1 is a schematic diagram showing a structure of a B2M locus. In FIG. 1, each of "ex1," "ex2," "ex3," and "ex4" represents a rough position of each of exons 1, 2, 3, and 4 of the B2M gene, and each of #1 to #10 indicates a position of a target sequence of crRNA. Each of base sequences of target sequences represented by #1 to #10 is set forth in each of SEQ ID NOs: 1 to 10.

Subsequently, an expression vector for crRNAs (where each thereof is sometimes referred to as "crRNA #1" to "crRNA #10" hereinafter) each of which is for recruiting the type I CRISPR system to each of target sequences of the above #1 to #10.

Figure 2:
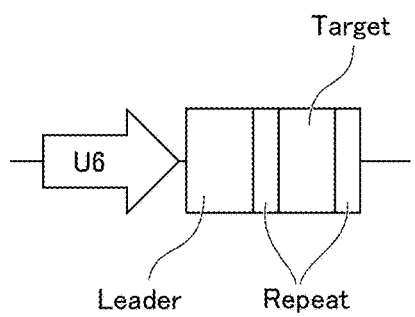
FIG. 2 is a schematic diagram showing a structure of an expression vector for pre-crRNA produced in Experimental Example 1.
Figure 3:
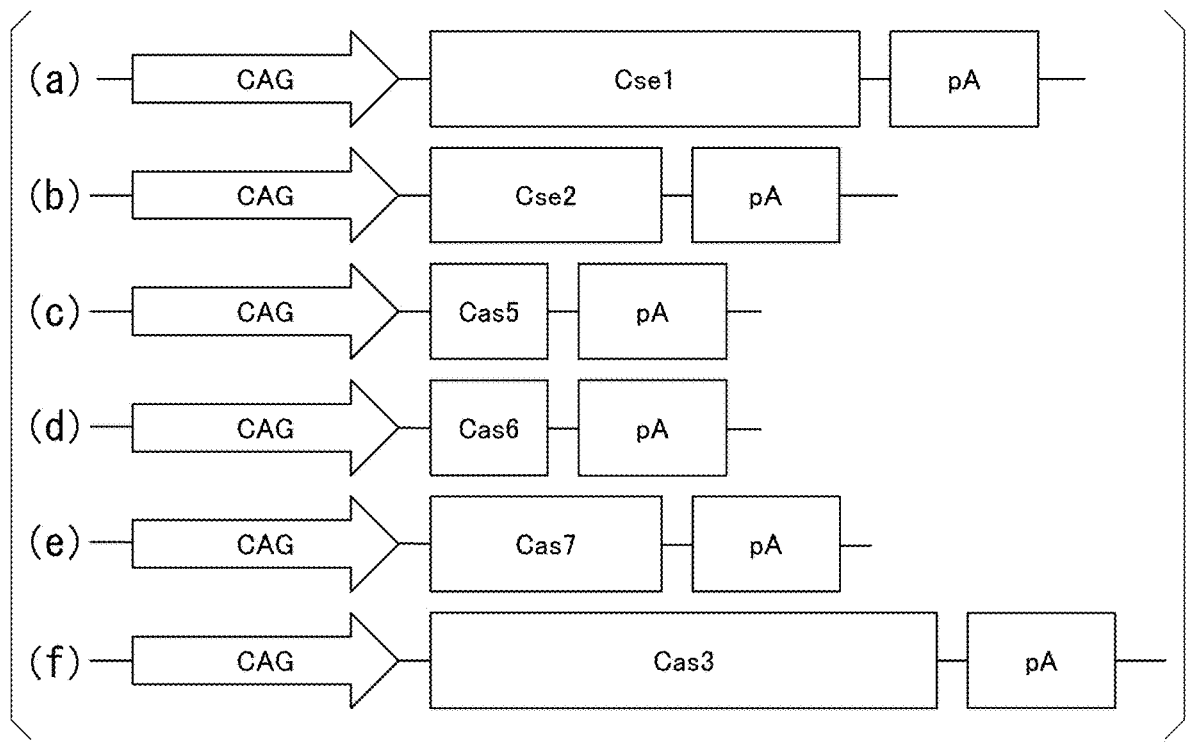
FIGS. 3(a) to 3(f) are schematic diagrams each showing a structure of a piggyBac transposon vector produced in Experimental Example 1.

FIG. 2 is a schematic diagram showing a structure of an expression vector for crRNA. In FIG. 2, "U6" represents a U6 promoter, "Leader" represents a leader sequence of crRNA of *Escherichia coli*, "Repeat" represents a repeated sequence of crRNA, and "Target" represents a target sequence of crRNA. The target sequence is also called a spacer sequence. Furthermore, as a termination signal (transcription termination signal) of the U6 promoter, a base sequence represented by "TTTTTT" (where T means thymidine) was provided to the 3'-end of the repeated sequence on the downstream side. It can be said that this crRNA is pre-crRNA.

Furthermore, expression vectors for the constituent proteins of the type I Cascade complex and for Cas3 protein were produced. FIGS. 3(a) to 3(f) are schematic diagrams each showing a structure of a piggyBac transposon vector produced.

In FIGS. 3(a) to 3(f), "Cse1" represents a Cse1 gene derived from *Escherichia coli*, "Cse2" represents a Cse2 gene derived from *Escherichia coli*, "Cas5" represents a Cas5 gene derived from *Escherichia coli*, "Cas6" represents a Cas6 gene derived from *Escherichia coli*, "Cas7" represents a Cas7 gene derived from *Escherichia coli*, "Cas3" represents a Cas3 gene derived from *Escherichia coli*, "pA" represents a poly A addition signal sequence, and "CAG" represents a CAG promoter.

For the Cse1, Cse2, Cas5, Cas6, Cas7, and Cas3 genes, genes in which base sequences were optimized according to the human codon usage frequency were used. Furthermore, a base sequence encoding a peptide sequence serving as a nuclear localization signal was added to each of the 5'-side and the 3'-side of each of the genes. An amino acid sequence of the Cse1 protein in which a nuclear localization signal has been added to the 3'-side and the 5'-side is set forth in SEQ ID NO: 27, an amino acid sequence of the Cse2 protein in which a nuclear localization signal has been added to the 3'-side and the 5'-side is set forth in SEQ ID NO: 28, an amino acid sequence of the Cas5 protein in which a nuclear localization signal has been added to the 3'-side and the 5'-side is set forth in SEQ ID NO: 29, an amino acid sequence of the Cas6 protein in which a nuclear localization signal has been added to the 3'-side and the 5'-side is set forth in SEQ ID NO: 30, an amino acid sequence of the Cas7 protein in which a nuclear localization signal has been added to the 3'-side and the 5'-side is set forth in SEQ ID NO: 31, and an amino acid sequence of the Cas3 protein in which a nuclear localization signal has been added to the 3'-side and the 5'-side is set forth in SEQ ID NO: 32.

The day before gene introduction, HEK 293T cells were seeded in a 24-well plate at 150,000 cells/well. Subsequently, per well, 350 ng of each of the above-mentioned expression vectors for the constituent proteins of the type I Cascade complex and for Cas3 protein, and 350 ng of a crRNA expression vector were introduced into the HEK 293T cells using a gene transfection reagent (Lipofectamine™ 2000, Thermo Fisher Scientific™).

The gene-introduced cells were maintained and cultured for 1 week or longer. Thereafter, the cells were stimulated with interferon (IFN)-γ at a final concentration of 50 ng/ml from 2 days before immunostaining to induce expression of HLA protein on the cell surface. Subsequently, immunostaining was performed using an anti-human HLA-A2 antibody, and expression of HLA protein was examined. Specifically, the HEK 293T cells were reacted with a mouse anti-human HLA-A2 antibody (#740082, BD Biosciences) labeled with a BV421 fluorescent dye. Thereafter, a proportion of HLA-A2-negative cells was calculated by flow cytometry.

Figure 4:
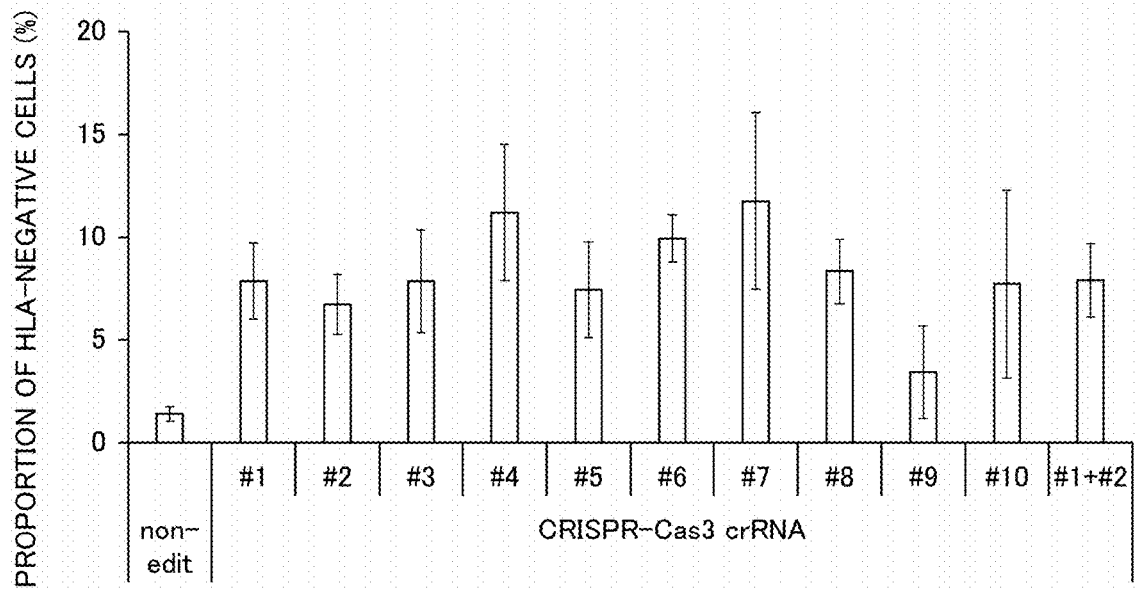
FIG. 4 is a graph showing a proportion of HLA-A2-negative cells calculated in Experimental Example 1.

FIG. 4 is a graph showing a calculated proportion of HLA-A2-negative cells. In FIG. 4, "non-edit" represents the result of a negative control without addition of an expression vector of crRNA, "CRISPR-Cas3 crRNA" represents the result of adding an expression vector of crRNA, "#1" to "#10" each represent the result of co-introducing an expression vector of crRNA for recruiting the type I CRISPR system to each of target sequences of the above #1 to #10, and "#1+ #2" represents the result of co-introducing an expression vector of crRNA for recruiting the type I CRISPR system to the target sequence of the above #1, and an expression vector of crRNA for recruiting the type I CRISPR system to the target sequence of the above #2.

As a result, HLA-A2-negative cells could be observed regardless of which crRNA was used. From these results, it was clarified that the type I CRISPR system can disrupt the B2M gene of human cells and cause the expression of HLA protein on the cell surface to be lost.

Experimental Example 2

(Disruption 2 of B2M Gene by Type I CRISPR System)

A B2M gene on the genome of human iPS cells was disrupted using the type I CRISPR system.

Figure 5:
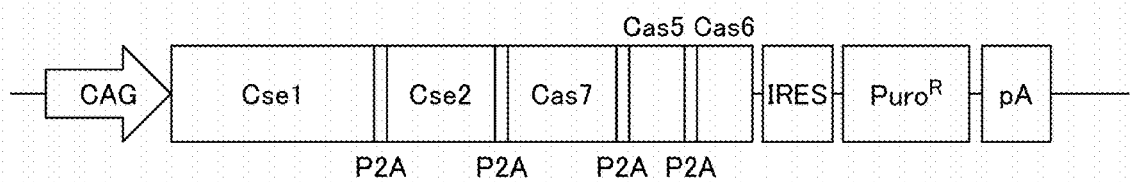
FIG. 5 is a schematic diagram showing a structure of a piggy Bac transposon vector used to express constituent proteins of a type I Cascade complex in Experimental Example 2.

FIG. 5 is a schematic diagram showing a structure of a piggy Bac transposon vector used to express the constituent proteins of the type I Cascade complex in the present experimental example. In FIG. 5, "Cse1" represents a Cse1 gene derived from *Escherichia coli*, "Cse2" represents a Cse2 gene derived from *Escherichia coli*, "Cas7" represents a Cas7 gene derived from *Escherichia coli*, "Cas5" represents a Cas5 gene derived from *Escherichia coli*, "Cas6" represents a Cas6 gene derived from *Escherichia coli*, "P2A" represents a P2A sequence derived from Porcine teschovirus that induces ribosomal skipping, "IRES" represents Internal Ribosome Entry Site, "Puro$^R$" represents a puromycin-resistant gene, "pA" represents a poly A addition signal sequence, and "CAG" represents a CAG promoter.

For the Cse1, Cse2, Cas7, Cas5, and Cas6 genes, genes in which base sequences were optimized according to the human codon usage frequency were used. Furthermore, a base sequence encoding a peptide sequence serving as a nuclear localization signal was added to the 3'-side of each of the genes. In the present experimental example, it was expected that gene disruption efficiency would be reduced when compared to Experimental Example 1 because only one nuclear localization signal was added to each of the constituent proteins of the type I Cascade complex.

In this expression vector, each of the constituent proteins of the type I Cascade complex is expressed as an individual protein from a single mRNA by being linked with a P2A sequence.

The day before gene introduction, iPS cells were seeded in a 12-well plate at 250,000 cells/well. Subsequently, per well, 600 ng of the above-mentioned expression vectors for the constituent proteins of the type I Cascade complex, 200 ng of the expression vector for Cas3 protein which was the same as that in Experimental Example 1, and 200 ng of a crRNA expression vector were introduced using a gene transfection reagent (Lipofectamine™ Stem, Thermo Fisher Scientific™). The crRNA expression vector used was 200 ng per well in a case where a single vector was introduced, and was 100 ng per well in a case where two kinds of vectors were co-introduced.

For the gene-introduced iPS cells, puromycin at a final concentration of 1 μg/mL was added after 24 hours, and the gene-introduced cells were selected for one day. Subsequently, the cells were maintained and cultured for 1 week or longer. Thereafter, the cells were stimulated with IFN-γ at a final concentration of 50 ng/ml from 2 days before immunostaining to induce expression of HLA protein. Subsequently, immunostaining was performed using an anti-human HLA-A2 antibody, and expression of HLA protein was examined. Specifically, the iPS cells were reacted with a mouse anti-human HLA-A2 antibody (#740082, BD Biosciences) labeled with a BV421 fluorescent dye. Thereafter, HLA-A2-negative cells were recovered by sorting using a flow cytometer.

Subsequently, the sorted HLA-A2-negative cells were proliferated and cultured. Thereafter, immunostaining was performed in the same manner again, and the HLA-A2-negative cell group was sorted. Thereafter, clones were established.

Figure 6:
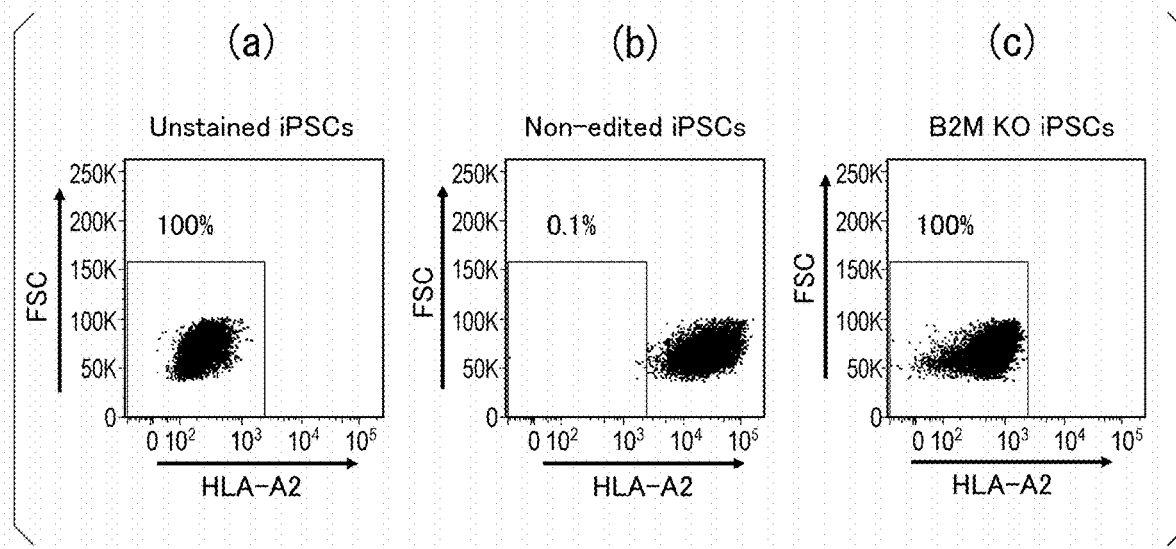
FIGS. 6(a) to 6(c) are graphs each showing results obtained when iPS cell clones established in Experimental Example 2 were immunostained and analyzed by flow cytometry.

FIGS. 6(a) to 6(c) are graphs each showing results obtained when established iPS cell clones were immunostained again and analyzed by flow cytometry. In FIGS. 6(a) to 6(c), a horizontal axis represents an expression level of HLA-A2, and a vertical axis represents an intensity of forward scattered light. Furthermore, "Unstained iPSCs" is a graph showing the analysis results of iPS cells not stained with an anti-human HLA-A2 antibody, "Non-edited iPSCs" shows the analysis results of wild-type iPS cells subjected to immunostaining, and "B2M KO iPSC clone" is a graph showing the results of immunostaining the iPS cell clones established in the present experimental example.

The iPS cell clones established in the present experimental example were negative for HLA-A2 in all cells, and it was clarified that the B2M gene can be disrupted also in iPS cells by the type I CRISPR system.

Furthermore, genomic DNA was purified from the iPS cell clones with the results shown in FIG. 6(c) to perform PCR and Sanger sequencing, and genotyping of B2M loci was performed. First, genomic DNA was purified from the iPS cell clones using a commercially available kit (MonoFas Genomic DNA Cultured Cells Extraction Kit VI, GL Sciences Inc.). Subsequently, PCR was performed with Prime-STAR® GXL DNA Polymerase (Takara Bio Inc.) using a sense strand primer (SEQ ID NO: 11) and an antisense strand primer (SEQ ID NO: 12).

FIG. 7(a) is a photograph showing results obtained when an amplified product obtained by the above-described PCR was analyzed by agarose gel electrophoresis. In FIG. 7(a), "1 kb ladder" represents a 1 kb DNA marker (WATSON Co., Ltd.) for molecular weight reference, "WT" represents the result of PCR performed using non-edited genomic DNA derived from iPS cells as a template, and "B2M KO clone" represents the result of PCR performed using the genomic DNA derived from the iPS cell clones with the results shown in FIG. 6(c) as a template.

As a result, it was clarified that in the B2M gene-disrupted iPS cell clone, a large deletion occurred in both alleles at the B2M locus.

Furthermore, FIG. 7(b) is a schematic diagram showing results obtained when the PCR product shown in the photograph of FIG. 7(a) was analyzed in more details by Sanger sequencing. In FIG. 7(b), "PCR primer" represents an approximate position of a PCR primer, which was used in the PCR reaction with the results shown in FIG. 7(a), at the B2M locus, "crRNA," "#1," and "#2" each represent an approximate position, at the B2M locus, of target sequences of two kinds of crRNAs used for the B2M gene disruption, "ex1," "ex2," "ex3," and "ex4" each represent an approximate position of each of exons 1, 2, 3, and 4 of the B2M genes, and "allele 1" and "allele 2" each represent an allele of the iPS cell clones. Furthermore, broken lines each represent an approximate position of a genomic DNA deletion region and a deleted base length in each of the alleles.

As a result, it was clarified that in the B2M gene-disrupted iPS cell clone, a deletion of less than 2 kb occurred on the 5' upstream side of the target sequence "#2" in one of the alleles. It was clarified that also in the other allele, a large deletion of less than 10 kb occurred on the 5' upstream side of the target sequence "#2".

Experimental Example 3

(Disruption 3 of B2M Gene by Type I CRISPR System)

A B2M gene on the genome of HEK 293T cells derived from human embryonic kidney was disrupted using the type I CRISPR system. In the present experimental example, mRNA of the constituent proteins of the type I Cascade complex and mRNA of Cas3 protein were used instead of the expression vectors for the constituent proteins of the type I Cascade complex and the expression vector for Cas3 protein.

First, mRNAs encoding Cse1, Cse2, Cas5, Cas6, Cas7, and Cas3 proteins, all derived from *Escherichia coli*, were synthesized in vitro using a commercially available kit (MEGAscript™ T7 Transcription Kit, Thermo Fisher Scientific™). In mRNA synthesis, in addition to ATP, UTP, and CTP, Anti Reverse Cap Analog (ARCA: 3'-O-Me-m7G(5') ppp(5')G, TriLink BioTechnologies), which is a 5' cap analog, and GTP were mixed at a ratio of 4:1 and used. Furthermore, a T7 promoter sequence and a sequence of 5' UTR which perform transcription in vitro, a sequence of SEQ ID NO: 33 as a Kozak sequence, and a sequence of SEQ ID NO: 34 as a sequence of 3' UTR and poly A signal were used. The sequence of 3' UTR is based on a UTR sequence of an α-globin (Hba-a1) gene.

Furthermore, crRNA consisting of base sequences each set forth in SEQ ID NOs: 13 and 14 was synthesized in vitro using a commercially available kit (MEGAshortscript™ T7 Transcription Kit, Thermo Fisher Scientific™). The synthesized crRNA had a leader sequence of crRNA of *Escherichia coli*, a repeated sequence, a target sequence for the B2M gene, and a repeated sequence in this order.

The day before gene introduction, HEK 293T cells were seeded in a 12-well plate at 300,000 cells/well. Subsequently, 500 ng of each of the mRNAs encoding Cse1, Cse2, Cas5, Cas6, Cas7, and Cas3 proteins and the crRNA were introduced into the HEK 293T cells using a gene transfection reagent (Lipofectamine™ MessengerMAX™, Thermo Fisher Scientific™).

The gene-introduced cells were maintained and cultured for 1 week or longer. Thereafter, the cells were stimulated with IFN-γ at a final concentration of 50 ng/ml from 2 days before immunostaining to induce expression of HLA protein. Subsequently, immunostaining was performed using an anti-human HLA-A2 antibody, and expression of HLA protein was examined. Specifically, the HEK 293T cells were reacted with a mouse anti-human HLA-A2 antibody (#740082, BD Biosciences) labeled with a BV421 fluorescent dye. Thereafter, a proportion of HLA-A2-negative cells was calculated by flow cytometry.

FIGS. 8(a) to 8(e) are graphs showing results of flow cytometry analysis. In FIGS. 8(a) to 8(e), a horizontal axis represents an expression level of HLA-A2, and a vertical axis represents an intensity of forward scattered light. Furthermore, "Unstained" shows the analysis results of HEK 293T cells not stained with an anti-human HLA-A2 antibody, "Non-edited" shows the analysis results of wild-type HEK 293T cells subjected to immunostaining, "crRNA #1" shows the results of introducing crRNA of SEQ ID NO: 13, "crRNA #2" shows the results of introducing crRNA of SEQ ID NO: 14, and "crRNA #1+ #2" shows the results of co-introducing the crRNA of SEQ ID NO: 13 and the crRNA of SEQ ID NO: 14.

Figure 8:
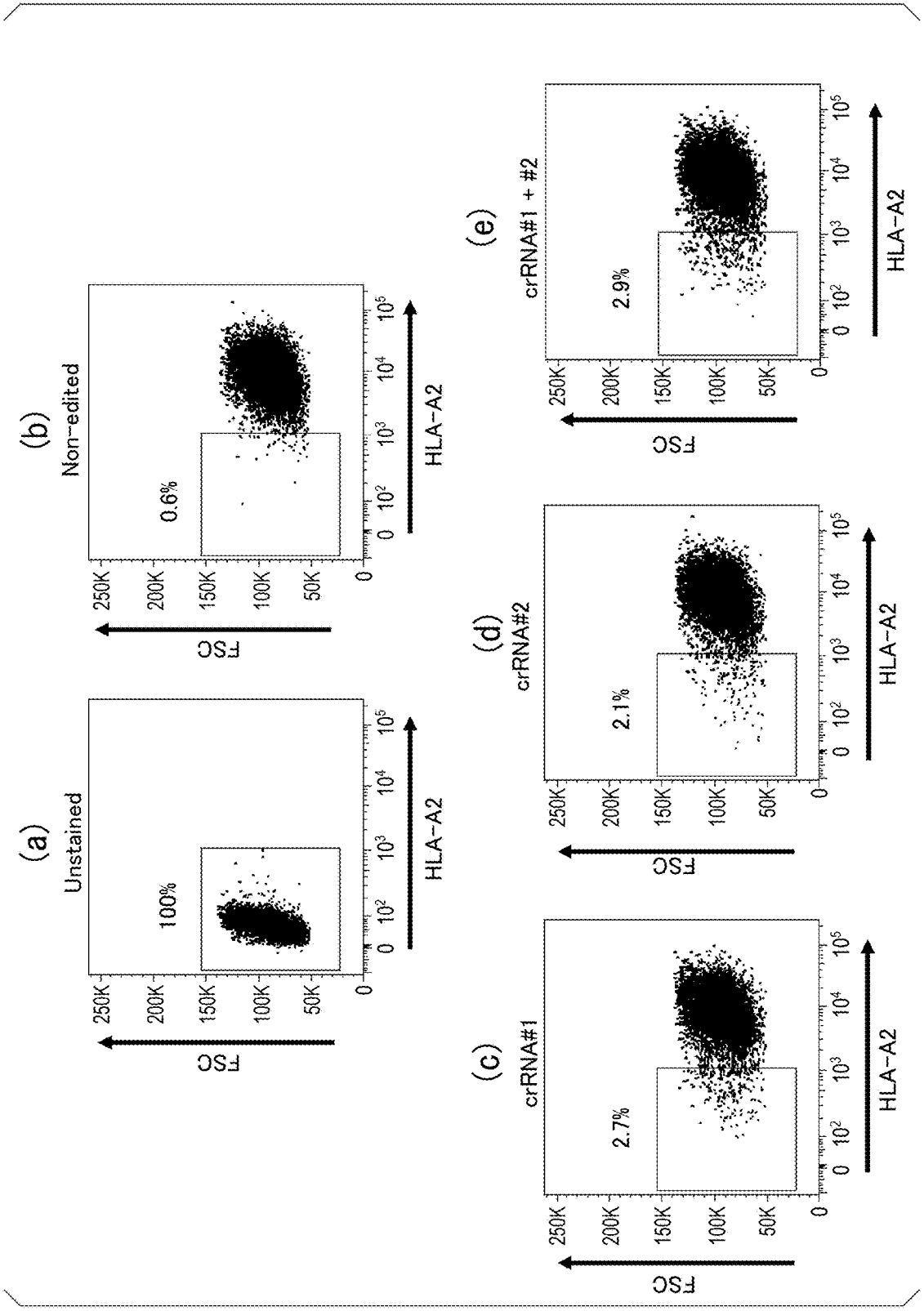
FIGS. 8(a) to 8(e) are graphs each showing results of flow cytometry analysis in Experimental Example 3.

As a result, appearance of HLA-A2-negative cells was confirmed in FIGS. 8(c) to 8(e). Based on these results, it was clarified that the B2M gene can be disrupted even in a case where mRNA and crRNA synthesized in vitro are introduced into cells as an expression method of the type I CRISPR system.

Experimental Example 4

(Production of Expression Vector for Type I CRISPR System)

In order to further improve genome deletion efficiency in human cells by the type I CRISPR system, expression vectors were examined. Specifically, first, expression plasmid DNA vectors having structures shown in FIGS. 9(a) to 9(d) were produced.

In FIGS. 9(a) to 9(d), "Cse1" represents a Cse1 gene derived from *Escherichia coli*, "Cse2" represents a Cse2 gene derived from *Escherichia coli*, "Cas3" represents a Cas3 gene derived from *Escherichia coli*, "Cas5" represents a Cas5 gene derived from *Escherichia coli*, "Cas6" represents a Cas6 gene derived from *Escherichia coli*, "Cas7" represents a Cas7 gene derived from *Escherichia coli*, "P2A" represents a P2A sequence, "T2A" represents a T2A sequence, "IRES" represents Internal Ribosome Entry Site, "pA" represents a poly A addition signal sequence, "EF1a" represents an EF1a promoter, "EGFP" represents an EGFP fluorescent protein gene, "mCherry" represents an mCherry fluorescent protein gene, "Puro$^R$" represents a puromycin-resistant gene, and "Hgr$^R$" represents a hygromycin-resistant gene.

Furthermore, for the Cse1, Cse2, Cas5, Cas6, Cas7, and Cas3 genes, genes in which base sequences were optimized according to the human codon usage frequency were used. Furthermore, a base sequence encoding a peptide sequence serving as a nuclear localization signal (NLS) was added to each of the 3'-side and the 5'-side of each of the genes.

In these expression vectors, each of the genes is expressed as an individual protein from a single mRNA by being linked with a Porcine teschovirus-derived P2A sequence or *Thosea asigna*-derived T2A sequence which induces ribosomal skipping.

The expression plasmid DNA vectors having the structures shown in FIGS. 9(a) to 9(d) can also be used as piggyBac transposon vectors because the above-mentioned construct is sandwiched between the 5' TR sequence and the 3' TR sequence which are derived from piggyBac.

When these vectors are co-expressed together with piggyBac transposase, the region sandwiched between the "3' TR" and the "5' TR" is excised by the transposase and integrated into a "TATA" base sequence site in a host cell genome, and thereby a stable expression cell line is established.

Furthermore, cells into which the transposon vector has been introduced can be selected by drug selection using puromycin or hygromycin, or by sorting using fluorescence of EGFP or mCherry fluorescent proteins.

Experimental Example 5

(Disruption 4 of B2M Gene by Type I CRISPR System)

B2M genes on the genomes of HEK 293T cells derived from human embryonic kidney and iPS cells were disrupted using the expression vector of the type I CRISPR system which was produced in Experimental Example 4. Furthermore, the expression vectors produced in Experimental Example 1 and Experimental Example 2 were also used for comparison.

<<Examination Using HEK 293T Cell>>

First, an examination using HEK 293T cells was conducted. The day before gene introduction, HEK 293T cells were seeded in a 24-well plate at 150,000 cells/well. Subsequently, 1,600 ng of the above-described expression vector of the type I CRISPR system and 800 ng of the expression vector of crRNA #1 which was produced in Experimental Example 1 were introduced into the HEK 293T cells using a gene transfection reagent (Lipofectamine™ 2000, Thermo Fisher Scientific™).

In a case of gene introduction with a plurality of expression vectors as expression vectors of the type I CRISPR system at the same time, an amount of each vector was evenly allocated so that a total mass was 1,600 ng according to the number of vectors to be introduced.

The gene-introduced cells were maintained and cultured for 1 week or longer. Thereafter, the cells were stimulated with IFN-γ at a final concentration of 50 ng/ml from 2 days before immunostaining to induce expression of HLA protein. Subsequently, immunostaining was performed using an anti-human HLA-A2 antibody, and expression of HLA protein was examined. Specifically, the HEK 293T cells were reacted with a mouse anti-human HLA-A2 antibody (#740082, BD Biosciences) labeled with a BV421 fluorescent dye. Thereafter, a proportion of HLA-A2-negative cells was calculated by flow cytometry.

FIGS. 10(a) to 10(h) are graphs showing results of flow cytometry analysis. In FIGS. 10(a) to 10(h), a horizontal axis represents an expression level of HLA-A2, and a vertical axis represents an intensity of forward scattered light. Furthermore, "Unstained" shows the analysis results of HEK 293T cells not stained with an anti-human HLA-A2 antibody, "Non-edited" shows the analysis results of wild-type HEK 293T cells subjected to immunostaining, "pTL-Cascade+Cas3" shows the results of co-introducing the vector shown in FIG. 5 and the vector shown in FIG. 3(f), "Individual" shows the results of co-introduction of a total of 6 kinds of the expression vectors of the type I CRISPR system shown in FIGS. 3(a) to 3(f), "263-iCA+751-iCA" shows the results of co-introducing a vector having mCherry as a selection gene in the vector shown in FIG. 9(a), "263-iHA+751-iHA" shows the results of co-introducing a vector having a hygromycin-resistant gene as a selection gene in the vector shown in FIG. 9(a), "263-iPA+751-iPA" shows the results of co-introducing a vector having a puromycin-resistant gene as a selection gene in the vector shown in FIG. 9(a), and "All in one-SP" shows the results of co-introducing a vector having a puromycin-resistant gene as a selection gene in the vector shown in FIG. 9(b).

As a result, HLA-A2-negative cells could be observed regardless of which expression vector was used. It was clarified that the B2M gene can be disrupted more efficiently by using, among the vectors, the vector shown in FIG. 9(a) than the vectors shown in FIGS. 3(a) to 3(f) and the vector shown in FIG. 5.

Figure 9:
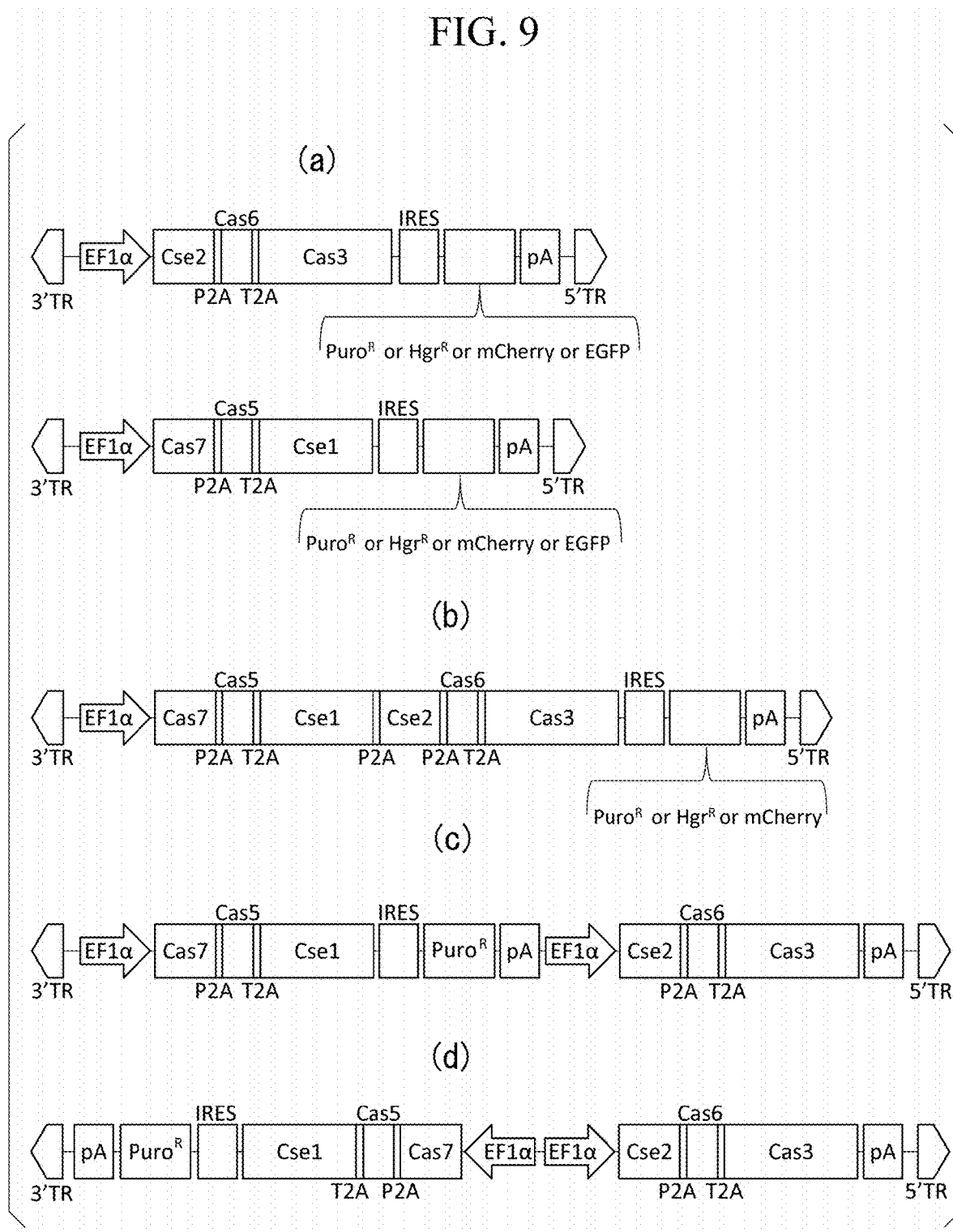
FIGS. 9(a) to 9(d) are schematic diagrams each showing a structure of an expression vector for a type I CRISPR system produced in Experimental Example 4.
Figure 10:
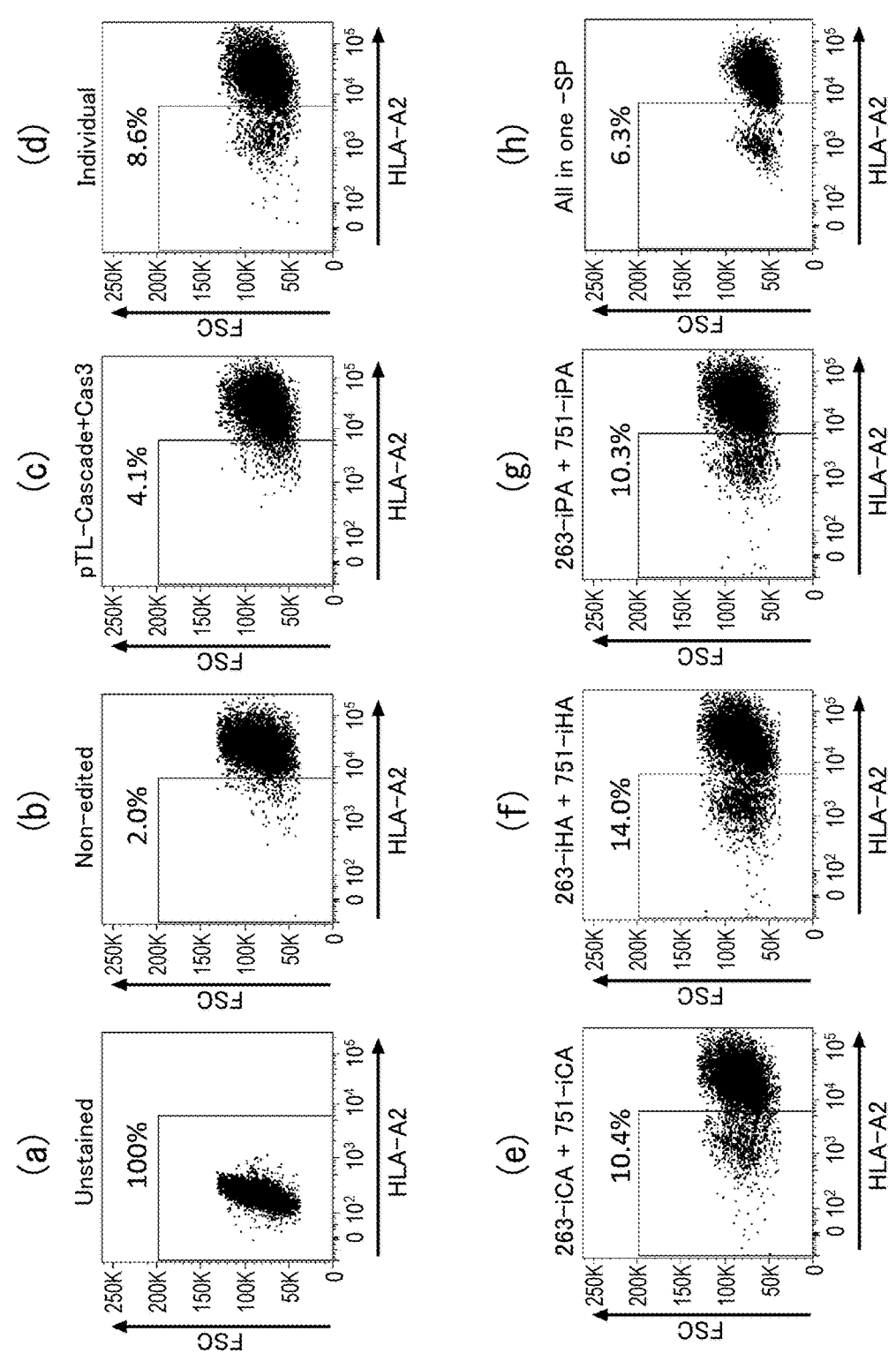
FIG. 10(a) to FIG. 10(h) are graphs each showing results of analysis of flow cytometry on HEK 293T cells in Experimental Example 5.
Figure 11:
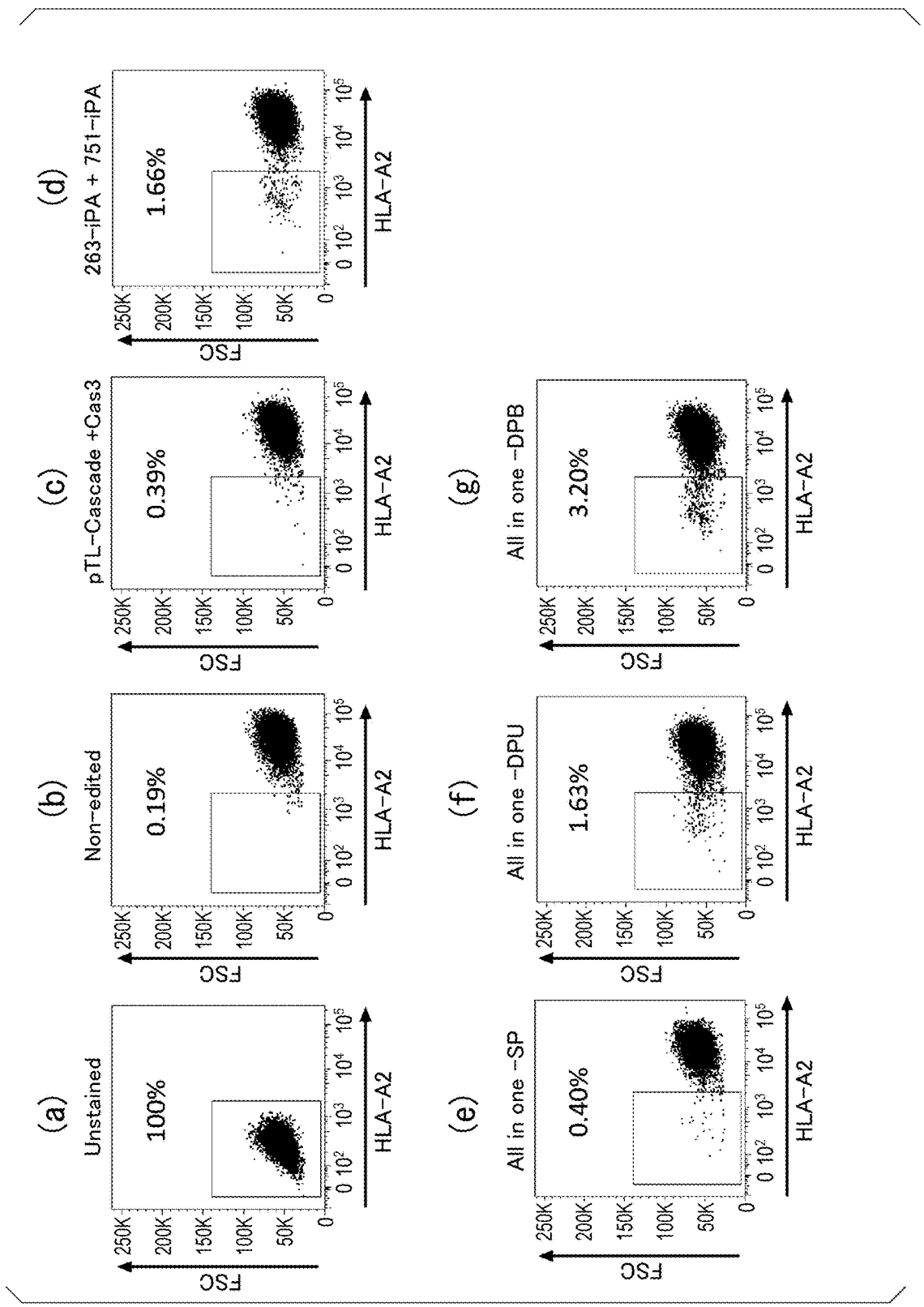
FIGS. 11(a) to 11(g) are graphs each showing results of analysis of flow cytometry on iPS cells in Experimental Example 5.

Furthermore, the vector shown in FIG. 9(b) was able to disrupt the B2M gene with higher efficiency than when the vector shown in FIG. 5 was used, but disruption efficiency for the B2M gene showed a lower value than that when 6 kinds of the vectors shown in FIGS. 3(a) to 3(f) were used at the same time.

<<Examination Using iPS Cell>>

Subsequently, an examination using iPS cells was conducted. The day before gene introduction, iPS cells were seeded in a 24-well plate at 30,000 cells/well. Subsequently, 600 ng of the above-described expression vector of the type I CRISPR system and 300 ng of the expression vector of crRNA #1 which was produced in Experimental Example 1 were introduced into the iPS cells using a gene transfection reagent (Lipofectamine™ Stem, Thermo Fisher Scientific™).

In a case of gene introduction with a plurality of expression vectors as expression vectors of the type I CRISPR system at the same time, an amount of each vector was evenly allocated so that a total mass was 600 ng according to the number of vectors to be introduced.

For the gene-introduced iPS cells, puromycin at a final concentration of 0.5 μg/mL was added after 24 hours, and the gene-introduced cells were selected for one day. Subsequently, the cells were maintained and cultured for 1 week or longer. Thereafter, the cells were stimulated with IFN-γ at a final concentration of 50 ng/ml from 2 days before immunostaining to induce expression of HLA protein. Subsequently, immunostaining was performed using an anti-human HLA-A2 antibody, and expression of HLA protein was examined. Specifically, the iPS cells were reacted with a mouse anti-human HLA-A2 antibody (#740082, BD Biosciences) labeled with a BV421 fluorescent dye. Thereafter, a proportion of HLA-A2-negative cells was calculated by flow cytometry.

FIGS. 11(a) to 11(g) are graphs showing results of flow cytometry analysis. In FIGS. 11(a) to 11(g), a horizontal axis represents an expression level of HLA-A2, and a vertical axis represents an intensity of forward scattered light. Furthermore, "Unstained" shows the analysis results of iPS cells not stained with an anti-human HLA-A2 antibody, "Non-edited" shows the analysis results of wild-type iPS cells subjected to immunostaining, "pTL-Cascade+Cas3" shows the results of co-introducing the vector shown in FIG. 5 and the vector shown in FIG. 3(f), "263-iPA+751-iPA" shows the results of co-introducing a vector having a puromycin-resistant gene as a selection gene in the vector shown in FIG. 9(a), "All in one-SP" shows the results of co-introducing a vector having a puromycin-resistant gene as a selection gene in the vector shown in FIG. 9(b), "All in one-DPU" (DPU: Dual Promoter, Uni-directional) shows the results of introducing the vector shown in FIG. 9(c), and "All in one-DPB" (DPB: Dual Promoter, Bi-directional) shows the results of introducing the vector shown in FIG. 9(d).

As a result, it was clarified that HLA-A2-negative cells could be observed regardless of which expression vector was used, but the B2M gene can be disrupted more efficiently by particularly using the vectors shown in FIGS. 9(a), 9(c), and 9(d) than the vector shown in FIG. 5 and the vector shown in FIG. 9(b).

Subsequently, the produced HLA-A2-negative iPS cells were recovered by sorting using a flow cytometer. Subsequently, genotyping of B2M loci was performed using the obtained bulk iPS cells.

Specifically, first, genomic DNA was purified from the bulk iPS cells using a commercially available kit (MonoFas Genomic DNA Cultured Cells Extraction Kit VI, GL Sciences Inc.). Subsequently, PCR was performed with Quick Taq™ HS DyeMix (TOYOBO CO., LTD.) using a sense strand primer (SEQ ID NO: 15) and an antisense strand primer (SEQ ID NO: 16).

The obtained PCR product was analyzed by agarose gel electrophoresis. As a result, a band, which was thought to be a band in which a deletion occurred by the type I CRISPR system and a molecular weight of the amplified product was reduced than that of the wild type, was separated and purified, and the deletion site was specified by the Sanger sequencing. In some cases, by TA cloning the obtained PCR product and using the obtained colonies, base sequence analysis was performed by Sanger sequence.

Figure 12:
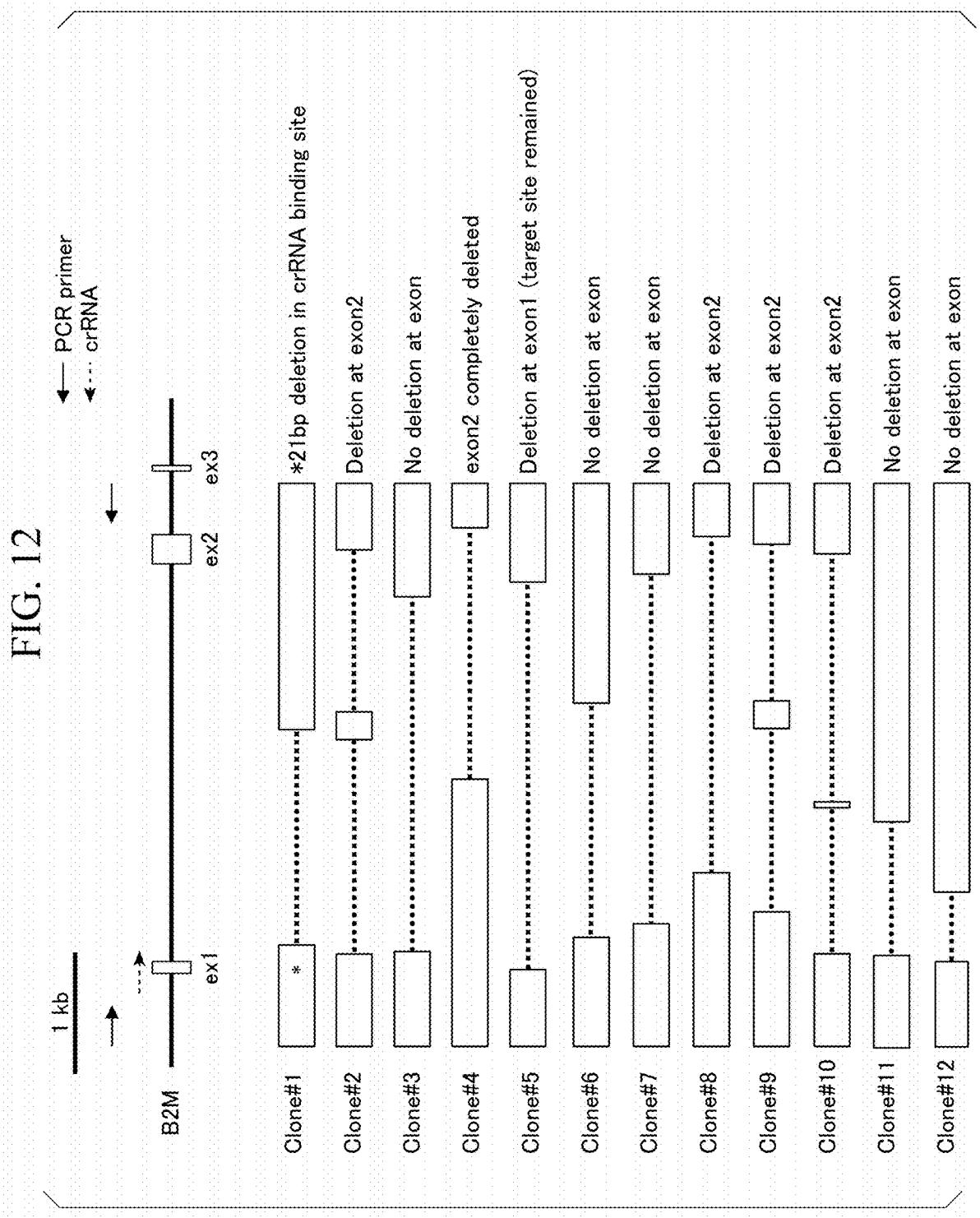
FIG. 12 is a schematic diagram showing results of analysis of a B2M locus of HLA-A2-negative iPS cells in Experimental Example 5.

FIG. 12 is a schematic diagram showing results of analysis of a B2M locus of bulk HLA-A2-negative iPS cells. In FIG. 12, "B2M" represents an approximate structure of the B2M locus, "ex1," "ex2," and "ex3" each represent the exon number of the B2M gene and its region, "PCR primer" represents an approximate position of a primer, which was used for PCR amplification, at the B2M locus, "crRNA" represents an approximate position of crRNA, which was used for gene disruption, at the B2M locus, and "Clone #1" to "Clone #12" each indicate an *Escherichia coli* clone obtained by TA cloning. FIG. 12 also shows genomic DNA deletion regions specified based on the results of Sanger sequencing of "Clone #1" to "Clone #12" with dotted lines or * marks.

As a result, in all the samples of Clone #1 to Clone #12, a large deletion of several hundred bp to several kb of nucleotides was confirmed in the 5'-side (PAM side) upstream direction with a binding site of crRNA as the basis. Furthermore, in Clone #1, a deletion of 21 bases of nucleotides was recognized in a target sequence of crRNA. Furthermore, a deletion was recognized in exon 2 for Clones #2, #4, #8, #9, and #10, and a complete deletion of exon 2 was recognized in Clone #4. Furthermore, in Clone #5, a deletion was recognized in exon 1. Furthermore, no deletion was recognized in exon for Clones #3, #6, #7, #11, and #12. Furthermore, it was clarified that a target sequence of crRNA was retained in 11 samples excluding "Clone #1" among the analyzed 12 samples.

Experimental Example 6

(DMD Exon Skipping Using Type I CRISPR System)

It was examined whether exon skipping could be induced for exon No. 45 of a dystrophin (DMD) gene using the type I CRISPR system.

Figure 13:
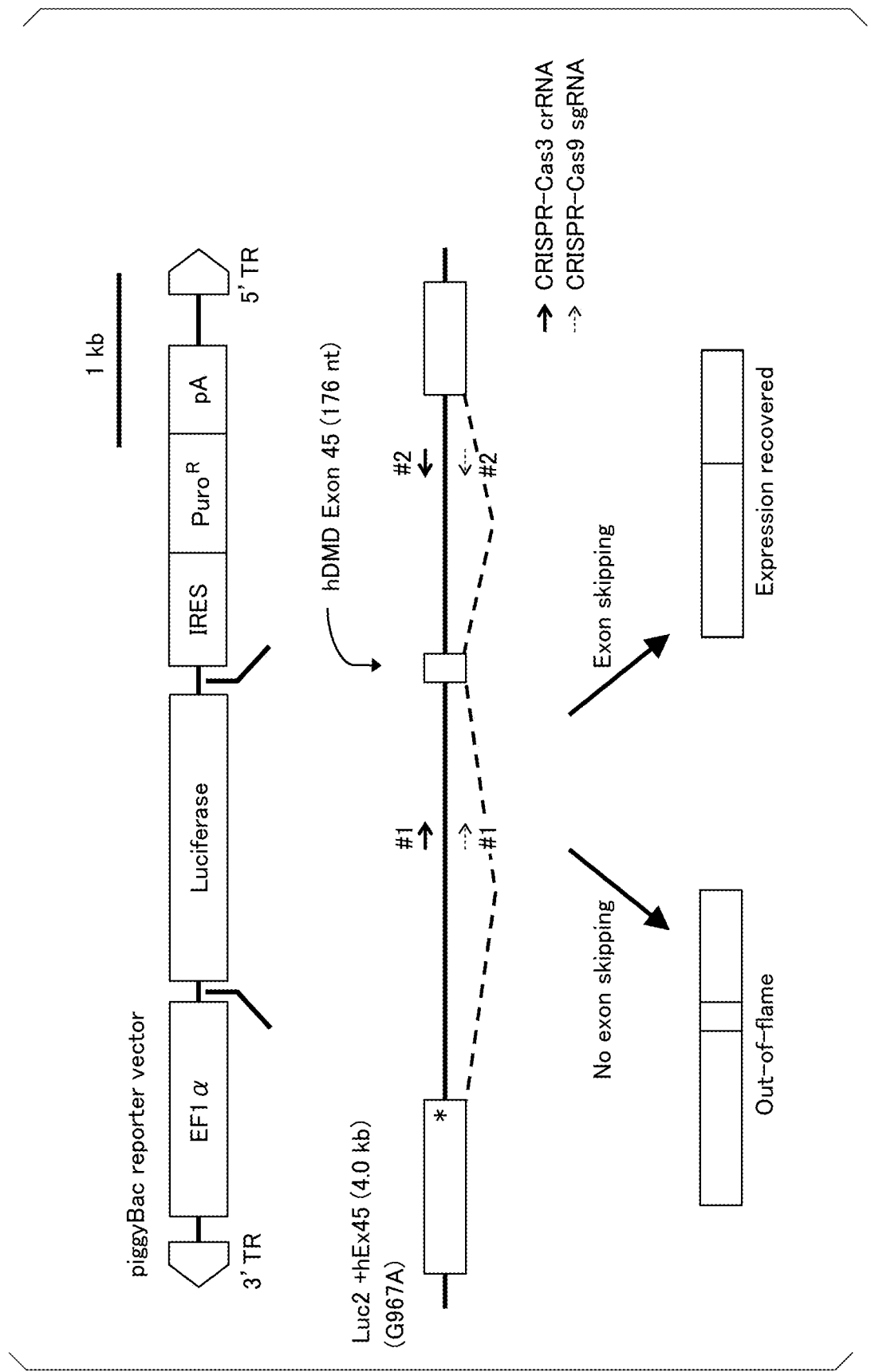
FIG. 13 is a schematic diagram showing a structure of a reporter vector used in an exon skipping model luciferase assay and used in Experimental Example 6.

Exon skipping was detected by an exon skipping model luciferase assay similar to that disclosed in PCT International Publication No. WO2018/179578. FIG. 13 is a schematic diagram showing a structure of a reporter vector used in an exon skipping model luciferase assay.

In FIG. 13, the square represents an exon portion, and the line represents an intron portion and an untranslated region. Furthermore, "EF1α" represents an EF1α promoter, "IRES" represents Internal Ribosome Entry Site, "Puro$^R$" represents a puromycin-resistant gene, "pA" represents a poly A addition signal sequence, "3' TR" represents a piggy Bac-derived 3' TR sequence, "5' TR" represents a piggy Bac-derived 5' TR sequence, and "#1" and "#2" each represent a position of a target sequence of crRNA or sgRNA.

In this reporter vector, a Luc2 (G967A) gene in which a pseudo-splicing donor sequence contained in a Firefly luciferase (Luc2) gene has been disrupted is divided into two, and a constructed construct (Luc2+hEx45) into which a DNA fragment of about 4 kb in the front and the rear of an exon 45 of a human dystrophin gene is inserted is inserted. The Firefly luciferase gene expressed from this reporter vector is an inactive type because the exon 45 of the DMD gene is inserted by splicing.

Meanwhile, when the exon 45 of the human DMD gene in the reporter vector is skipped (or deleted) by the type I CRISPR system, an active type Firefly luciferase is expressed.

Accordingly, by introducing this reporter vector into cells and measuring activity of Firefly luciferase, it is possible to measure activity of inducing exon skipping with respect to the exon 45 of the human DMD gene.

In the present experimental example, crRNA of the type I CRISPR system for a target sequence (SEQ ID NO: 17) in an intron 44 of the human DMD gene represented by "#1" in FIG. 13, and crRNA of the type I CRISPR system for a target sequence (SEQ ID NO: 18) in an intron 45 of the human DMD gene represented by "#2" in FIG. 13 were used.

Furthermore, for comparison, an experiment using Cas9 (SpCas9), which is a class 2 CRISPR system, was also performed at the same time. A plasmid DNA (piggy Bac) vector was used for Cas9 expression. As sgRNA of Cas9, sgRNAs for two kinds of target sequences overlapping with the above-described target sequence of crRNA of the type I CRISPR system were used.

Specifically, sgRNA of Cas9 for a target sequence (SEQ ID NO: 19) in the intron 44 of the human DMD gene represented by "#1" in FIG. 13, and sgRNA of Cas9 for a target sequence (SEQ ID NO: 20) in the intron 45 of the human DMD gene represented by "#2" in FIG. 13 were used. A plasmid DNA vector expressing these sgRNAs was produced and used under control of a U6 promoter.

<<Examination Using HEK 293T Cell>>

First, an examination using HEK 293T cells was conducted. In an examination using the type I CRISPR system, the above-mentioned reporter vector 100 ng, 20 ng of a phRL-TK vector expressing *Renilla reniformis* luciferase (*Renilla* Luc) as an internal standard, 200 ng of an expression vector of the type I CRISPR system, and 100 ng of a crRNA expression vector were introduced into HEK 293T cells derived from human embryonic kidney. The cells were seeded in a 96-well plate at 60,000 cells/100 µL/well.

In a case of gene introduction with a plurality of expression vectors as expression vectors of the type I CRISPR system at the same time, an amount of each vector was evenly allocated so that a total mass was 200 ng according to the number of vectors to be introduced. Furthermore, in a case where two kinds of crRNAs were co-introduced, 50 ng was used for each vector.

In an examination using Cas9, 100 ng of the above-mentioned reporter vector, 20 ng of a phRL-TK vector expressing *Renilla reniformis* luciferase (*Renilla* Luc) as an internal standard, 200 ng of a Cas9 expression vector, and 100 ng of an sgRNA expression vector were introduced into HEK 293T cells derived from human embryonic kidney. The cells were seeded in a 96-well plate at 60,000 cells/100 µL/well. Furthermore, in a case where two kinds of sgRNAs were co-introduced, 50 ng was used for each vector.

For gene introduction, a gene transfection reagent (Lipofectamine™ 2000, Thermo Fisher Scientific™) was used.

Subsequently, two days after the gene introduction, luciferase reporter activity was analyzed using a commercially available kit ("Dual-Glo® Luciferase Assay system" Cat. No. E2920, Promega Corporation).

Figure 14:
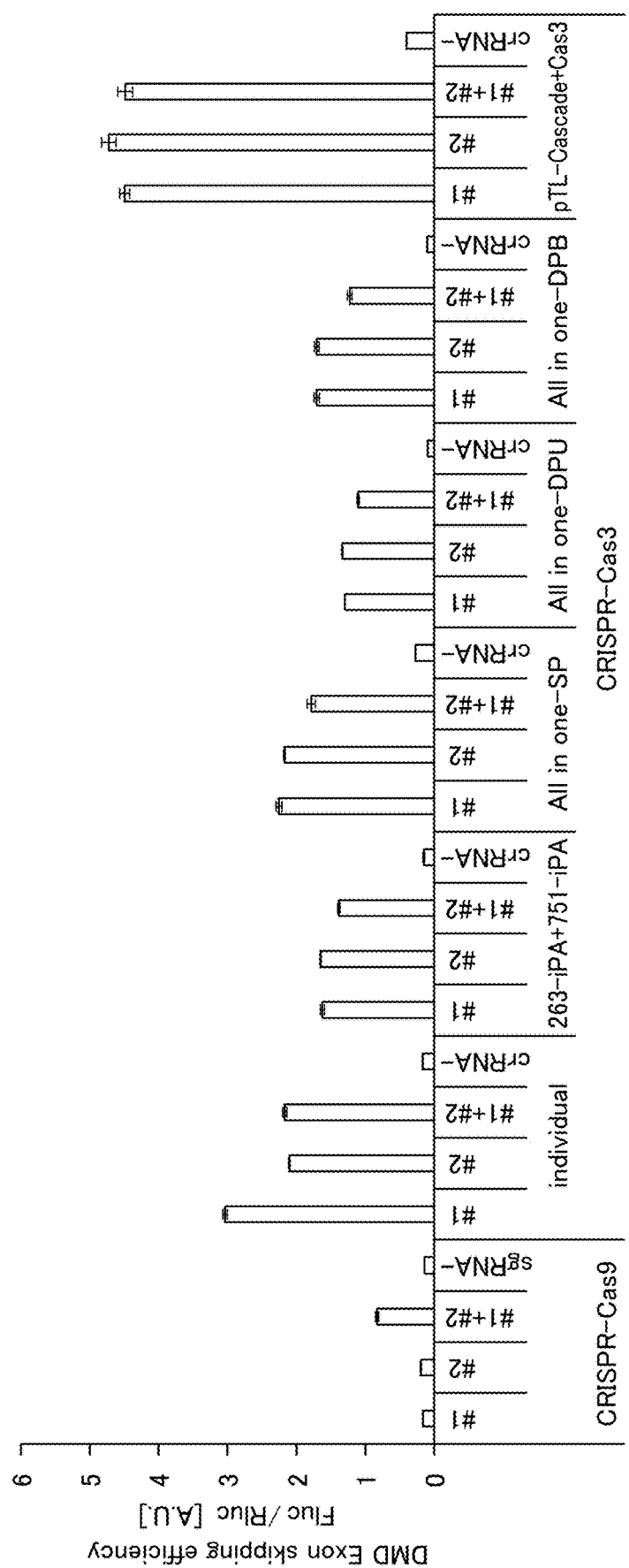
FIG. 14 is a graph showing results of HEK 293T cells for which an activity of Firefly luciferase was measured based on an activity of *Renilla reniformis* luciferase in Experimental Example 6.

FIG. 14 is a graph showing results of measuring an activity of Firefly luciferase based on an activity of *Renilla reniformis* luciferase. In FIG. 14, "Rluc" represents activity of *Renilla reniformis* luciferase, "Fluc" represents activity of Firefly luciferase, and "CRISPR-Cas9" represents the result of gene introduction of Cas9. Furthermore, in the results of gene introduction of Cas9, "#1" represents the results of co-introducing an expression vector for sgRNA having "#1" (SEQ ID NO: 19) in FIG. 13 as a target sequence, "#2" represents the results of co-introducing an expression vector for sgRNA having "#2" (SEQ ID NO: 20) in FIG. 13 as a target sequence, "#1+ #2" represents the results of co-introducing an expression vector for sgRNA having "#1" (SEQ ID NO: 19) and "#2" (SEQ ID NO: 20) in FIG. 13 as target sequences, and "sgRNA-" represents the results of a negative control to which the expression vector of sgRNA was not added.

Furthermore, in FIG. 14, "CRISPR-Cas3" represents the results of the type I CRISPR system. Furthermore, in the results of the type I CRISPR system, "individual" shows the results of co-introduction of a total of 6 kinds of the expression vectors of the type I CRISPR system shown in FIGS. 3(a) to 3 (f), "263-iPA+751-iPA" shows the results of co-introducing a vector having a puromycin-resistant gene as a selection gene in the vector shown in FIG. 9(a), "All in one-SP" shows the results of co-introducing a vector having a puromycin-resistant gene as a selection gene in the vector shown in FIG. 9(b), "All in one-DPU" represents the results of introducing the vector shown in FIG. 9(c), "All in one-DPB" represents the results of introducing the vector shown in FIG. 9(d), "pTL-Cascade+Cas3" represents the results of co-introducing the vector shown in FIG. 5 and the vector shown in FIG. 3(f), "#1" represents the results of co-introducing an expression vector for crRNA having "#1" (SEQ ID NO: 17) in FIG. 13 as a target sequence, "#2" represents the results of co-introducing an expression vector for crRNA having "#2" (SEQ ID NO: 18) in FIG. 13 as a target sequence, "#1+ #2" represents the results of co-introducing an expression vector for crRNA having "#1" (SEQ ID NO: 17) and "#2" (SEQ ID NO: 18) in FIG. 13 as target sequences, and "crRNA-" represents the results of a negative control to which the expression vector of crRNA was not added.

As a result, it was clarified that in HEK 293T cells, the type I CRISPR system exhibits higher exon skipping activity than CRISPR-Cas9 regardless of the type of expression vector used.

In the expression vector of the type I CRISPR system, it was recognized that exon skipping activity tended to be low for "263-iPA+751-iPA," "All in one-SP," "All in one-DPU," and "All in one-DPB" than "individual," but it was thought that an activity to delete a gene was excessively strong, which also deleted Luc2 cDNA.

It was also clarified that the type I CRISPR system exhibits higher exon skipping activity when using only one crRNA than when using CRISPR-Cas9 and two sgRNAs.

<<Examination Using iPS Cell>>

Subsequently, an examination using iPS cells was conducted. As the iPS cells, iPS cells, which were derived from patients with Duchenne muscular dystrophy and had a mutation that generates a stop codon in the exon 45 of the DMD gene, were used.

The day before gene introduction, iPS cells derived from the patients were seeded in a 48-well plate at 100,000 cells/well. Subsequently, in an examination using the type I CRISPR system, the above-mentioned reporter vector 100 ng, 20 ng of a phRL-TK vector expressing *Renilla reniformis* luciferase (*Renilla* Luc) as an internal standard, 200 ng of an expression vector of the type I CRISPR system, and 100 ng of a crRNA expression vector were introduced into the iPS cells.

In a case of gene introduction with a plurality of expression vectors as expression vectors of the type I CRISPR system at the same time, an amount of each vector was evenly allocated so that a total mass was 200 ng according to the number of vectors to be introduced. Furthermore, in a case where two kinds of crRNAs were co-introduced, 50 ng was used for each vector.

In an examination using Cas9, the above-mentioned reporter vector 100 ng, 20 ng of a phRL-TK vector expressing *Renilla reniformis* luciferase (*Renilla* Luc) as an internal standard, 200 ng of a Cas9 expression vector, and 100 ng of an sgRNA expression vector were introduced into the iPS cells. Furthermore, in a case where two kinds of sgRNAs were co-introduced, 50 ng was used for each vector.

For gene introduction, a gene transfection reagent (Lipofectamine™ Stem, Thermo Fisher Scientific™) was used.

Subsequently, two days after the gene introduction, luciferase reporter activity was analyzed using a commercially available kit ("Dual-Glo® Luciferase Assay system" Cat. No. E2920, Promega Corporation).

Figure 15:
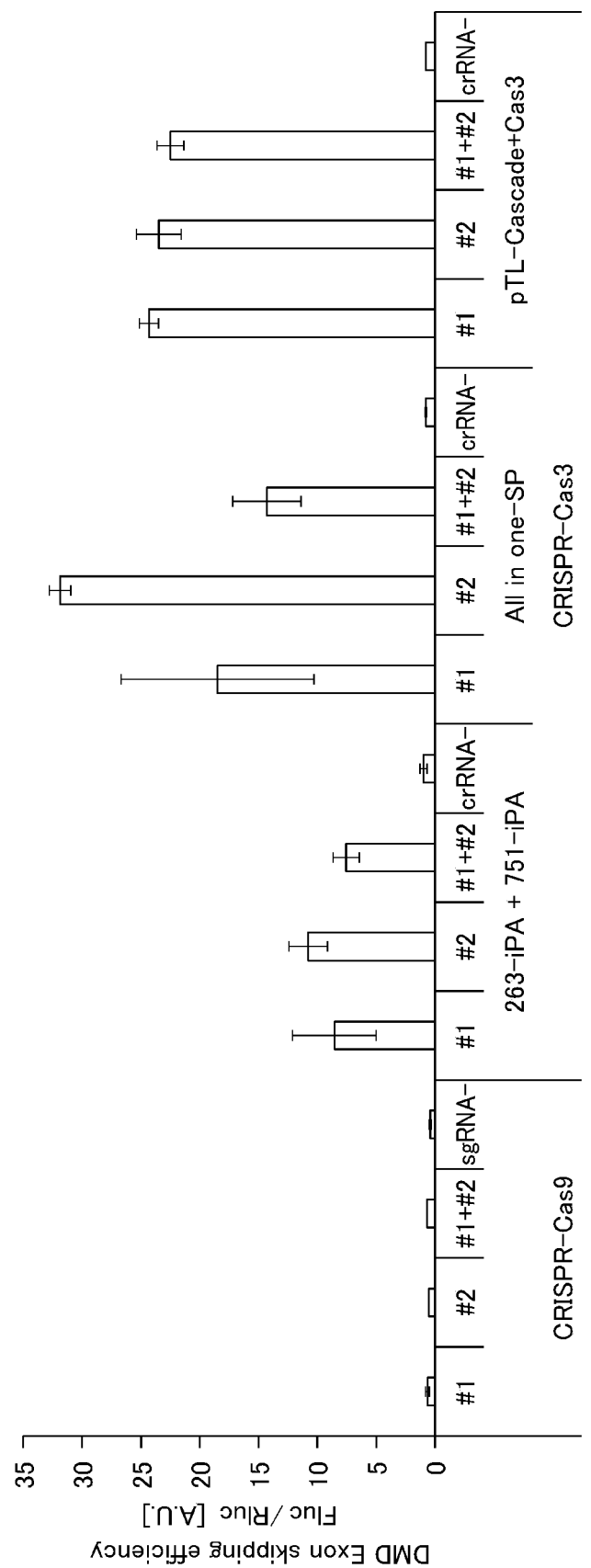
FIG. 15 is a graph showing results of iPS cells for which an activity of Firefly luciferase was measured based on an activity of *Renilla reniformis* luciferase in Experimental Example 6.

FIG. 15 is a graph showing results of measuring an activity of Firefly luciferase based on an activity of *Renilla reniformis* luciferase. In FIG. 15, "Rluc" represents activity of *Renilla reniformis* luciferase, "Fluc" represents activity of Firefly luciferase, and "CRISPR-Cas9" represents the result of gene introduction of Cas9. Furthermore, in the results of gene introduction of Cas9, "#1" represents the results of co-introducing an expression vector for sgRNA having "#1" (SEQ ID NO: 19) in FIG. 13 as a target sequence, "#2" represents the results of co-introducing an expression vector for sgRNA having "#2" (SEQ ID NO: 20) in FIG. 13 as a target sequence, "#1+ #2" represents the results of co-introducing an expression vector for sgRNA having "#1" (SEQ ID NO: 19) and "#2" (SEQ ID NO: 20) in FIG. 13 as target sequences, and "sgRNA-" represents the results of a negative control to which the expression vector of sgRNA was not added.

Furthermore, in FIG. 15, "CRISPR-Cas3" represents the results of the type I CRISPR system. Furthermore, in the results of the type I CRISPR system, "263-iPA+751-iPA" shows the results of co-introducing a vector having a puromycin-resistant gene as a selection gene in the vector shown in FIG. 9(a), "All in one-SP" shows the results of co-introducing a vector having a puromycin-resistant gene as a selection gene in the vector shown in FIG. 9(b), "pTL-Cascade+Cas3" represents the results of co-introducing the vector shown in FIG. 5 and the vector shown in FIG. 3(f), "#1" represents the results of co-introducing an expression vector for crRNA having "#1" (SEQ ID NO: 17) in FIG. 13 as a target sequence, "#2" represents the results of co-introducing an expression vector for crRNA having "#2" (SEQ ID NO: 18) in FIG. 13 as a target sequence, "#1+#2" represents the results of co-introducing an expression vector for crRNA having "#1" (SEQ ID NO: 17) and "#2" (SEQ ID NO: 18) in FIG. 13 as target sequences, and "crRNA-" represents the results of a negative control to which the expression vector of crRNA was not added.

As a result, it was clarified that even when iPS cells derived from patients with Duchenne muscular dystrophy were used, the type I CRISPR system showed higher exon skipping activity than CRISPR-Cas9.

Experimental Example 7

(Induction of DMD Exon Skipping in iPS Cells)

Exon skipping of the exon 45 of the DMD gene of iPS cells was attempted using the type I CRISPR system. As the iPS cells, iPS cells, which were derived from patients with Duchenne muscular dystrophy and had a mutation that generates a stop codon in the exon 45 of the DMD gene, were used.

The day before gene introduction, iPS cells derived from the patients were seeded in a 24-well plate at 300,000 cells/well. Subsequently, 300 ng each of expression vectors in the vector shown in FIG. 9(a) of the type I CRISPR system having mCherry or EGFP as a selection gene, and 400 ng of an expression vector for crRNA having "#1" (SEQ ID NO: 17) in FIG. 13 as a target sequence were introduced into the iPS cells.

Furthermore, an examination, in which 300 ng each of expression vectors in the vector shown in FIG. 9(a) of the type I CRISPR system having mCherry or EGFP as a selection gene, and 400 ng of an expression vector for crRNA having "#2" (SEQ ID NO: 18) in FIG. 13 as a target sequence were introduced into the iPS cells, was also conducted.

For gene introduction, a gene transfection reagent (Lipofectamine™ Stem, Thermo Fisher Scientific™) was used.

After culturing the gene-introduced cells for 2 days, cells positive for mCherry fluorescence or cells co-positive for mCherry and EGFP were sorted and recovered by flow cytometry, and the cells were proliferated and cultured. Subsequently, genomic DNA was purified from this cell population using a commercially available kit (MonoFas Genomic DNA Cultured Cells Extraction Kit VI, GL Sciences Inc.).

Subsequently, for cells subjected to gene introduction with the expression vector for crRNA which targets the base sequence of SEQ ID NO: 17, PCR was performed with Quick Taq™ HS DyeMix (TOYOBO CO., LTD.) using a sense strand primer (SEQ ID NO: 21) and an antisense strand primer (SEQ ID NO: 22).

Furthermore, for cells subjected to gene introduction with the expression vector for crRNA which targets the base sequence of SEQ ID NO: 18, PCR was performed with Quick Taq™ HS DyeMix (TOYOBO CO., LTD.) using a sense strand primer (SEQ ID NO: 23) and an antisense strand primer (SEQ ID NO: 24).

Figure 16:
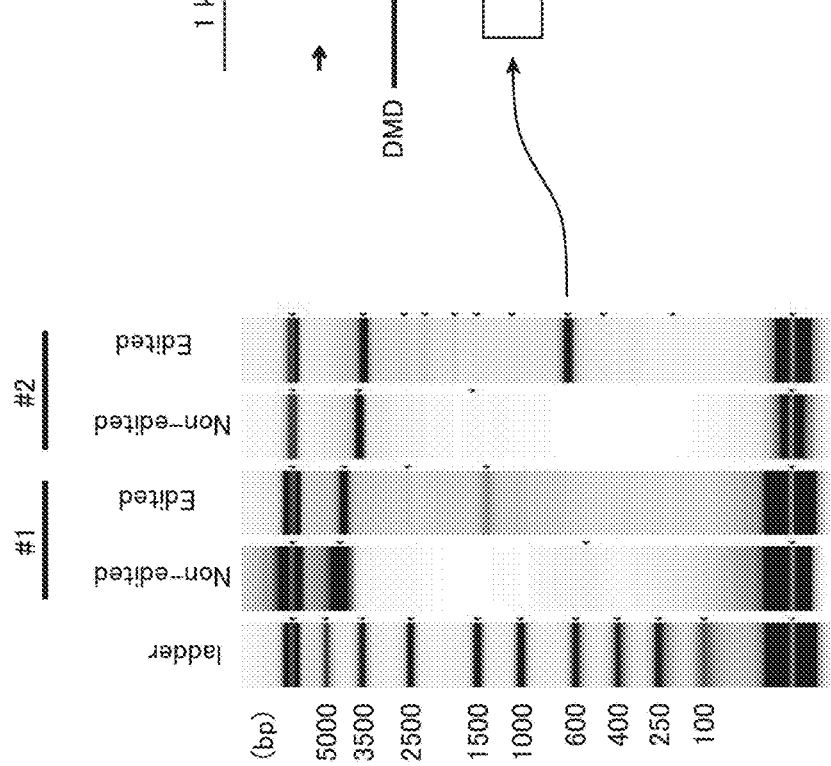
FIG. 16(a) is an image showing results of analyzing a PCR product in Experimental Example 7.
FIG. 16(b) is a schematic diagram showing results obtained when a band indicated by an arrow in FIG. 16(a) was analyzed in more details by Sanger sequencing.

FIG. 16(a) is an image showing the results of analyzing a PCR product obtained by the above-mentioned PCR with Agilent 2200 TapeStation (Agilent Technologies, Inc.). In FIG. 16(a), "ladder" represents a DNA marker (Agilent Technologies, Inc.) for molecular weight reference, "#1 Non-edited" represents the results of PCR performed using non-edited genomic DNA derived from iPS cells as a template and using primers of SEQ ID NOs: 21 and 22, and "#1 Edited" represents the results of PCR performed using genomic DNA of bulk iPS cells into which an expression vector of the type I CRISPR system and an expression vector for crRNA having SEQ ID NO: 17 as a target sequence were introduced as a template, and using primers of SEQ ID NOs: 21 and 22.

Furthermore, "#2 Non-edited" represents the results of PCR performed using non-edited genomic DNA derived from iPS cells as a template and using primers of SEQ ID NOs: 23 and 24, and "#2 Edited" represents the results of PCR performed using genomic DNA of bulk iPS cells into which an expression vector of the type I CRISPR system and an expression vector for crRNA having SEQ ID NO: 18 as a target sequence were introduced as a template, and using primers of SEQ ID NOs: 23 and 24.

Furthermore, FIG. 16(b) is a schematic diagram showing results obtained when a band indicated by an arrow in FIG. 16(a) was analyzed in more details by Sanger sequencing. In FIG. 16(b), "#1" and "#2" each indicate a position of a target sequence of crRNA. Furthermore, the broken line represents an approximate position of a genomic DNA deletion region.

As a result, it was confirmed that by using the type I CRISPR system, the exon 45 of the endogenous DMD gene in which the mutation causing the disorder was present could be deleted in the iPS cells derived from patients with Duchenne muscular dystrophy.

Experimental Example 8

(Confirmation of DMD Gene Repair Using Type I CRISPR System in iPS Cells)

The genome-edited bulk iPS cells obtained in Experimental Example 7 were seeded in a 96-well plate at 1 cell/well to obtain a cloned iPS cell line. Subsequently, genomic DNA was purified from the obtained cloned iPS cell line using a commercially available kit (MonoFas Genomic DNA Cultured Cells Extraction Kit VI, GL Sciences Inc.), and genotyping was performed using the obtained genomic DNA.

Figure 17:
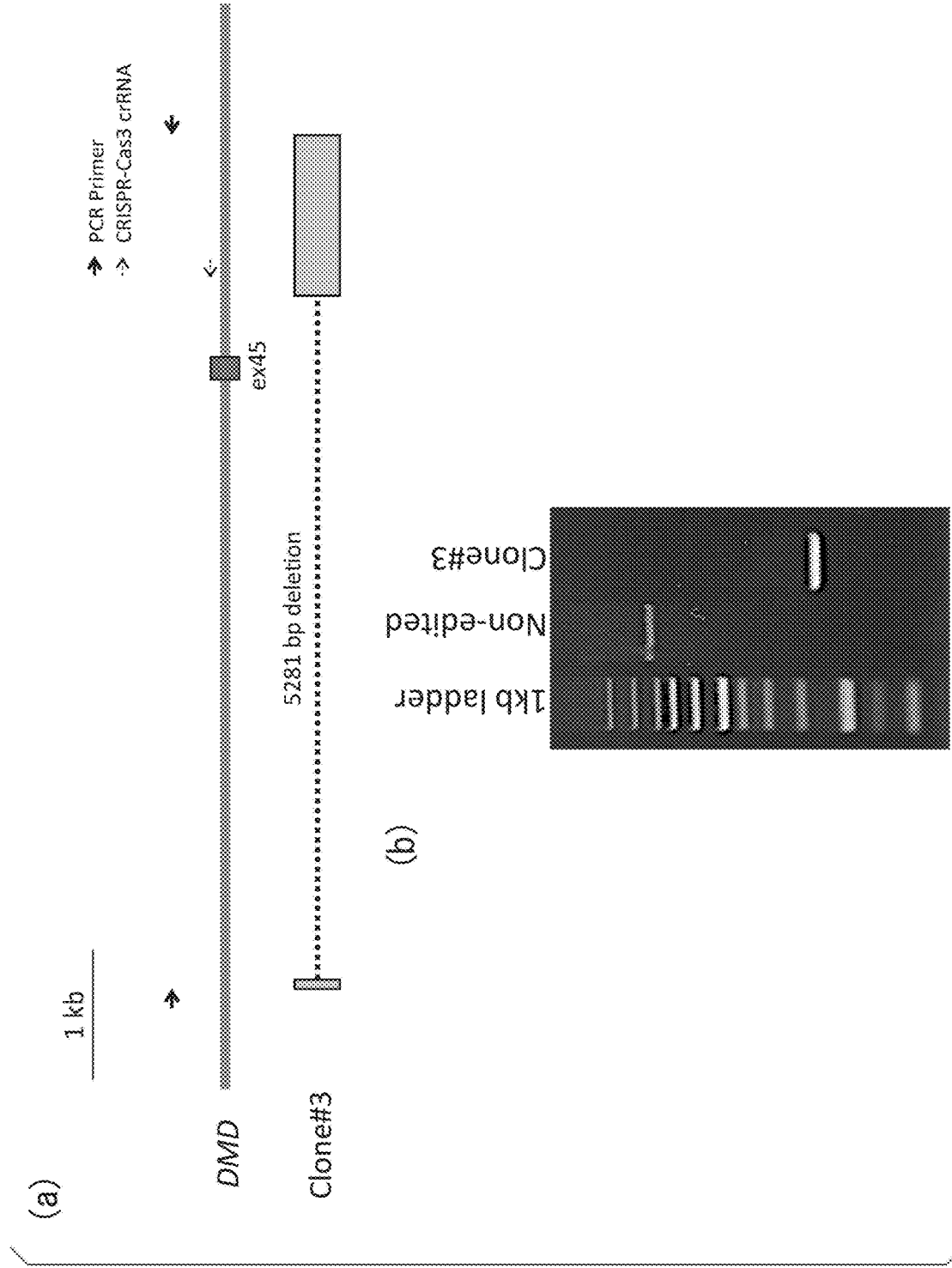
FIG. 17(a) is a schematic diagram showing an example of results of genotyping in Experimental Example 8.
FIG. 17(b) is a photograph showing the example of the results of genotyping in Experimental Example 8.

FIGS. 17(a) and 17(b) show a schematic diagram and a photograph which show an example of the results of genotyping. FIG. 17(a) is a schematic diagram showing a structure of a deficient site of a DMD locus in the cloned iPS cell line that succeeded in DMD exon skipping.

In FIG. 17(a), "DMD" represents an approximate structure around the exon 45 at the DMD locus, "ex45" represents the exon number of the DMD gene and its region, "PCR primer" represents an approximate position of a primer, which was used for amplification, at the DMD locus, "crRNA" represents an approximate position of a target sequence (SEQ ID NO: 18), which is in the intron 45 of crRNA of the type I CRISPR system, at the DMD locus, and "Clone #3" is the clone number of the acquired cloned iPS cells and represents a deficient region clarified from the results of the Sanger sequencing.

Furthermore, FIG. 17(b) is a photograph showing the results of analyzing a PCR product obtained in the present experiment by agarose gel electrophoresis. In FIG. 17(b), "1 kb ladder" represents a 1 kb DNA marker (WATSON Co., Ltd.) for molecular weight reference, "Non-edited" represents the results of PCR performed using non-edited genomic DNA derived from iPS cells as a template and using primers of SEQ ID NO: 100 and SEQ ID NO: 101 (amplification size 6.6 kb), and "Clone #3" represents the results of PCR performed using genomic DNA of the cloned iPS cell line that succeeded in DMD exon skipping as a template (amplification size 1.3 kb).

Table 1 below is a table summarizing a proportion of cloned iPS cell lines that succeeded in DMD exon skipping as a result of performing a genotyping experiment similar to that shown in FIGS. 17(a) and 17(b) on each of cloned iPS cell lines.

TABLE 1

| crRNA No. | Efficiency |
| --- | --- |
| crRNA #1 | 4/51 (7.8%) |
| crRNA #2 | 7/48 (14.6%) |

In Table 1, crRNA #1 represents the results for a cloned iPS cell line obtained by performing genome editing using crRNA having SEQ ID NO: 17 as a target sequence, and crRNA #2 represents the results for a cloned iPS cell line obtained by performing genome editing using crRNA with SEQ ID NO: 18 as a target sequence.

Furthermore, among the cloned iPS cell lines that succeeded in DMD exon skipping, each of lines, for which genome editing was performed using crRNA having SEQ ID NO: 17 or 18 as a target sequence, was selected, and induced to differentiate into skeletal muscle cells using a method disclosed in the document (Tanaka A., et al., Efficient and reproducible myogenic differentiation from human iPS cells: prospects for modeling Myoshi Myopathy in vitro, PLOS One., 8 (4), e61540, 2013). Subsequently, induction of exon skipping of dystrophin mRNA was confirmed, and restoration of dystrophin protein expression was confirmed.

Figure 18:
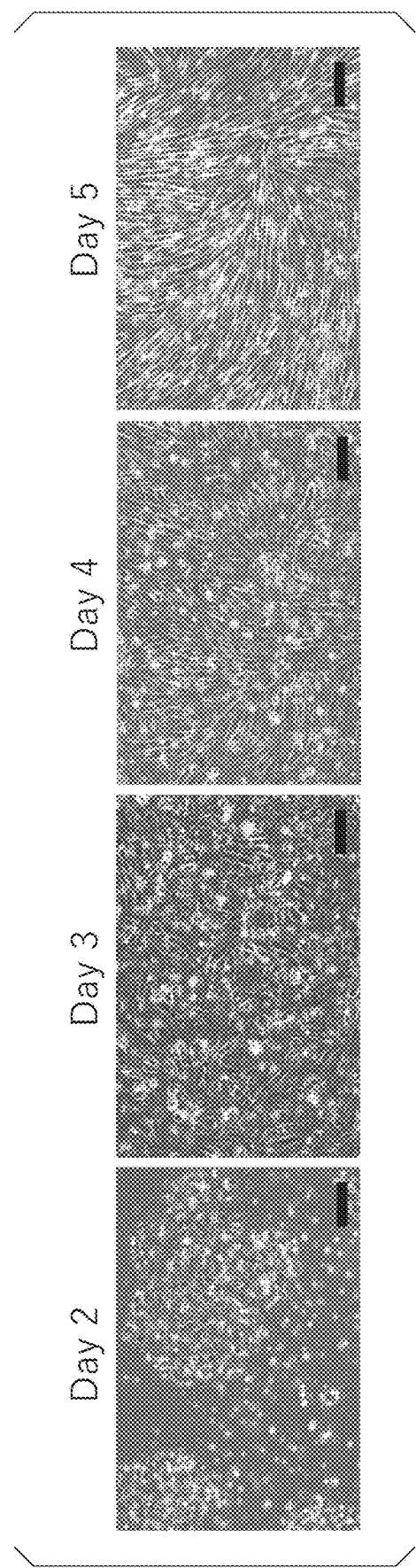
FIG. 18 shows photomicrographs in which shapes of cells of an iPS cell line that had been induced to differentiate into skeletal muscle cells (myoblast cells) were imaged in Experimental Example 8.

FIG. 18 shows photomicrographs in which shapes of cells of a cloned iPS cell line that had been induced to differentiate into skeletal muscle cells were imaged. The number of days shown in FIG. 18 is the number of days after the start of differentiation induction. Furthermore, the scale bar indicates 100 μm.

Subsequently, total RNA was purified from the iPS cell line that had been induced to differentiate into skeletal muscle cells using a commercially available kit (RNeasy Mini Kit, QIAGEN). Subsequently, a reverse transcription reaction of the purified total RNA was performed using a commercially available kit (ReverTra Ace (R) qPCR RT Kit, TOYOBO CO., LTD.) to synthesize cDNA. Subsequently, a PCR reaction was performed using the synthesized cDNA as a template and using primers of SEQ ID NO: 102 and SEQ ID NO: 103 to amplify cDNA of the dystrophin gene. Subsequently, the PCR product was analyzed with Agilent 2200 TapeStation (Agilent Technologies, Inc.).

Figure 19:
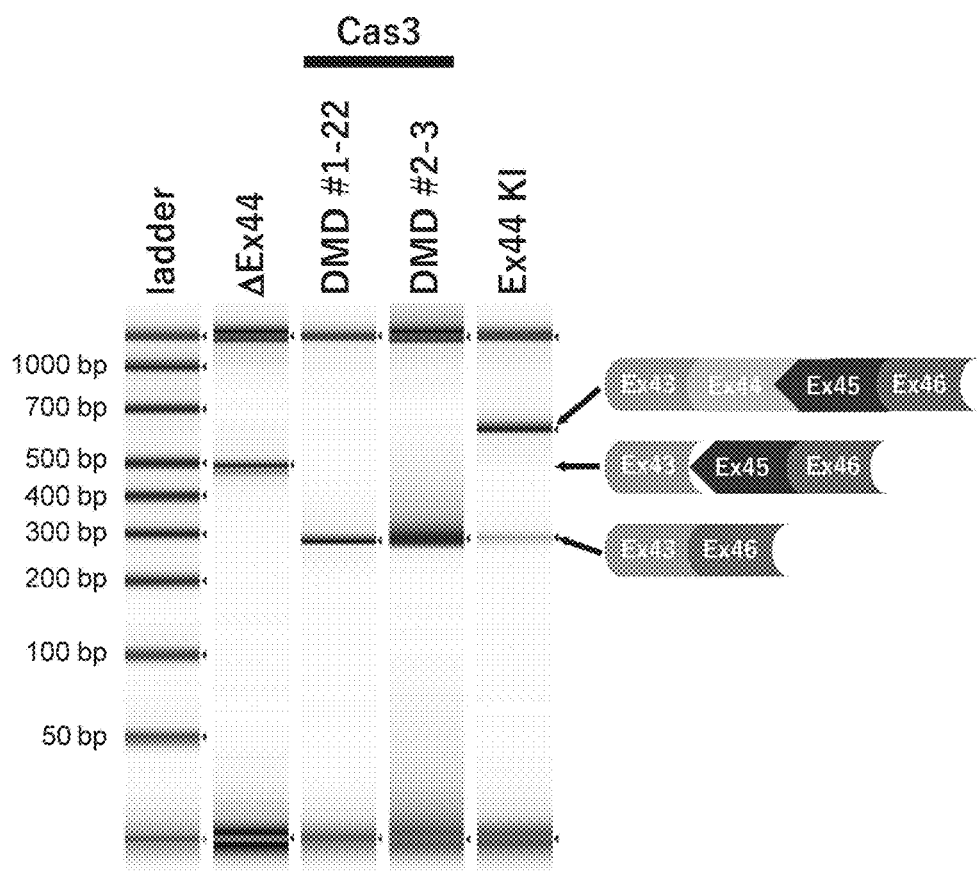
FIG. 19 shows an image showing results of electrophoresis analysis on a PCR product and a schematic diagram showing a structure of an amplified product in Experimental Example 8.

FIG. 19 shows an image showing results of analysis on the PCR product and a schematic diagram showing a structure of the amplified product. In FIG. 19, "ladder" represents a D1000 DNA marker (Agilent Technologies, Inc.) for molecular weight reference, and "ΔEx44" represents the results of PCR performed using cDNA acquired from non-edited iPS cells derived from patients with disorder as a template.

Furthermore, "Cas3 DMD #1-22" represents the results of PCR performed using, as a template, cDNA acquired from a cloned iPS cell line (#1-22) into which an expression vector of the type I CRISPR system and crRNA having SEQ ID NO: 17 as a target sequence were introduced and in which exon skipping was induced.

Furthermore, "Cas3 DMD #2-3" represents the results of PCR performed using, as a template, cDNA acquired from a cloned iPS cell line (#2-3) into which an expression vector of the type I CRISPR system and crRNA having SEQ ID NO: 18 as a target sequence were introduced and in which exon skipping was induced.

Furthermore, "Ex44 KI" represents the results of PCR performed using, as a template, cDNA acquired by inducing an iPS cell line to be differentiate into skeletal muscle cells by the same method described above, the iPS cell line (cells acquired by Li H. L., et al., Precise correction of the Dystrophin gene in Duchenne muscular dystrophy patient induced pluripotent stem cells by TALEN and CRISPR-Cas9, Stem Cell Reports, 4 (1), 143-154, 2015) being obtained by knock-in of a DMD exon 44 using the CRISPR-Cas9 system from iPS cells derived from patients with disorder similar to those in Experimental Example 7.

Subsequently, a cell lysate, which was obtained by lysing the iPS cell line that had been induced to differentiate into skeletal muscle cells in a commercially available cell lysate (RIPA Lysis and Extraction Buffer, Thermo Fisher Scientific™), was analyzed using a Simple Western™ assay (ProteinSimple, Inc.), and expression of the dystrophin protein was confirmed.

Specifically, a rabbit anti-dystrophin antibody (#ab15277, Abcam plc.) was used as a primary antibody, and a horseradish peroxidase (HRP)-labeled anti-rabbit antibody (#042-206, ProteinSimple, Inc.) was used as a secondary antibody.

Furthermore, an expression level of a myosin heavy chain was analyzed at the same time as a control of a protein load level. Specifically, a mouse anti-myosin heavy chain antibody (#MAB4470, R & D Systems) was used as a primary antibody, and an HRP-labeled anti-mouse antibody (#042-205, ProteinSimple, Inc.) was used as a secondary antibody.

Figure 20:
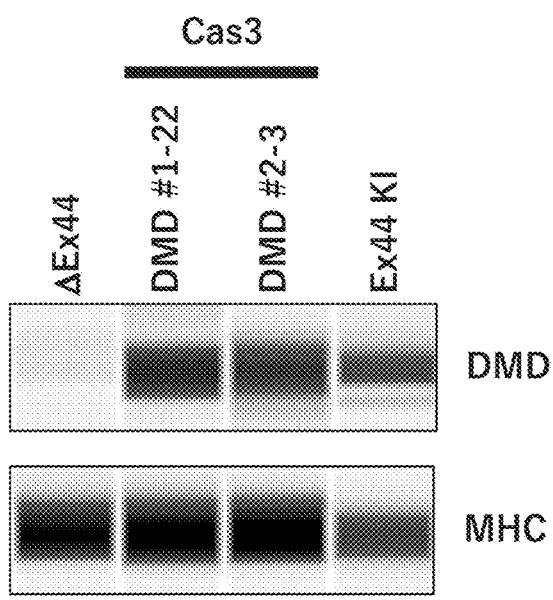
FIG. 20 is an image showing experimental results of protein electrophoresis by a Simple Western™ assay in Experimental Example 8.

FIG. 20 is an image showing experimental results of protein electrophoresis by a Simple Western™ assay. In FIG. 20, "ΔEx44" represents the results of analyzing a cell lysate acquired from non-edited iPS cells derived from patients with disorder. Furthermore, "Cas3 DMD #1-22" represents the results of analyzing a cell lysate acquired from a cloned iPS cell line into which an expression vector of the type I CRISPR system and crRNA having SEQ ID NO: 17 as a target sequence were introduced and in which exon skipping was induced. Furthermore, "Cas3 DMD #2-3" represents the results of analyzing a cell lysate acquired from a cloned iPS cell line into which an expression vector of the type I CRISPR system and crRNA having SEQ ID NO: 18 as a target sequence were introduced and in which exon skipping was induced.

Furthermore, "Ex44 KI" represents the results of analyzing a cell lysate acquired by inducing an iPS cell line to be differentiate into skeletal muscle cells by the same method described above, the iPS cell line (cells acquired by Li H. L., et al., Precise correction of the Dystrophin gene in Duchenne muscular dystrophy patient induced pluripotent stem cells by TALEN and CRISPR-Cas9, Stem Cell Reports, 4 (1), 143-154, 2015) being obtained by knock-in of a DMD exon 44 using the CRISPR-Cas9 system from iPS cells derived from patients with disorder similar to those in Experimental Example 7.

Furthermore, "DMD" represents the results of analyzing expression of the dystrophin protein, and "MHC" represents the results of analyzing expression of the myosin heavy chain protein.

As a result, it was clarified that expression of the dystrophin protein can be restored in the skeletal muscle cells obtained from differentiation induction by causing the exon number 45 of the endogenous DMD gene, in which the mutation causing the disorder was present, to be deficient in the iPS cells derived from patients with Duchenne muscular dystrophy by using the type I CRISPR system.

Experimental Example 9

(Comparison Experiment of Gene Disruption Efficiency Between Type I CRISPR System and Type II CRISPR-Cas9 System)

Gene disruption of the B2M gene was performed in HEK 293T cells using the type I CRISPR system or the type II CRISPR-Cas9 system, and gene disruption efficiencies of each of the system were compared.

Figure 21:
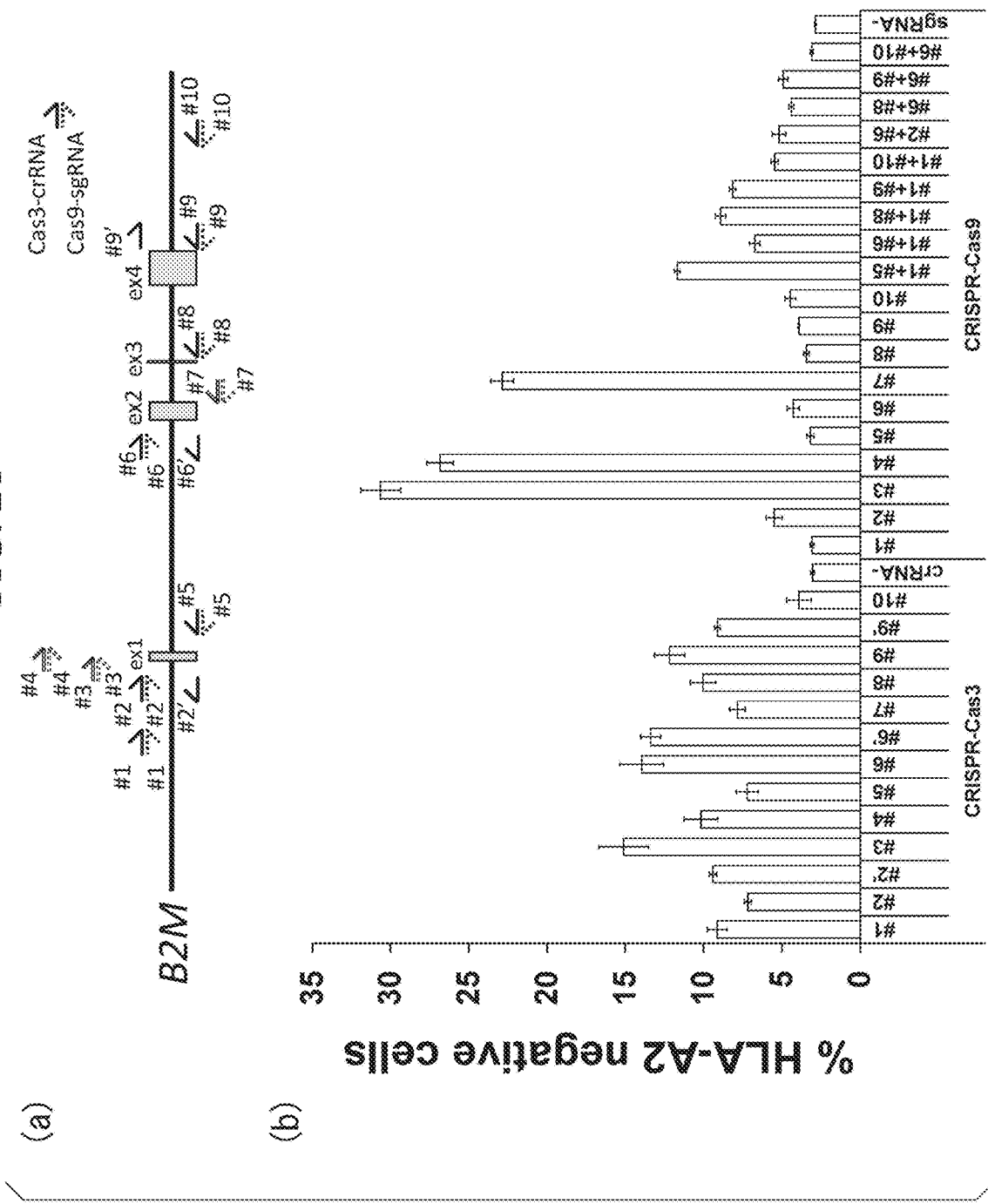
FIG. 21(a) is a schematic diagram showing a rough structure of a B2M locus.
FIG. 21(b) is a graph showing a proportion of HLA-A2-negative cells calculated in Experimental Example 9.

FIG. 21(a) is a schematic diagram showing a rough structure of a B2M locus. In FIG. 21(a), "ex1," "ex2," "ex3," and "ex4" each represent the exon number of the B2M gene and its region, and "#1" to "#10," "#2'," "#6'," and "#9" each indicate a position on the B2M gene of a target sequence for the type I CRISPR system or a target sequence for the CRISPR-Cas9 system. "Cas3-crRNA" indicates that it is a target sequence for the type I CRISPR system, and "Cas9-sgRNA" indicates that it is a target sequence for the CRISPR-Cas9 system.

Furthermore, in "#3," "#4," and "#7," a target sequence was present in a coding region (exon) of the B2M gene, and in the subsequent cases, a target sequence was present outside the coding region of the B2M gene. Furthermore, "Cas3-crRNA" is indicated by a solid line arrow, and "Cas9-sgRNA" is indicated by a broken line arrow.

As target sequences for the type I CRISPR system, 13 kinds of target sequences of #1 (SEQ ID NO: 35), #2 (SEQ ID NO: 3), #2' (SEQ ID NO: 36), #3 (SEQ ID NO: 1), #4 (SEQ ID NO: 4), #5 (SEQ ID NO: 5), #6 (SEQ ID NO: 37), #6' (SEQ ID NO: 38), #7 (SEQ ID NO: 2), #8 (SEQ ID NO: 8), #9 (SEQ ID NO: 39), #9' (SEQ ID NO: 40), and #10 (SEQ ID NO: 41) were used.

Furthermore, as target sequences for the CRISPR-Cas9 system, 10 kinds of target sequences of #1 (SEQ ID NO: 42), #2 (SEQ ID NO: 43), #3 (SEQ ID NO: 44), #4 (SEQ ID NO: 45), #5 (SEQ ID NO: 46), #6 (SEQ ID NO: 47), #7 (SEQ ID NO: 48), #8 (SEQ ID NO: 49), #9 (SEQ ID NO: 50), and #10 (SEQ ID NO: 51) were used.

For the type I CRISPR system, a DNA fragment encoding the designed crRNA was incorporated into a vector having the structure shown in FIG. 2 and used in the subsequent experiment.

The day before gene introduction, HEK 293T cells were seeded in a 24-well plate at 150,000 cells/well. Subsequently, per well, 1,000 ng of the above-described crRNA expression vector or sgRNA expression vector (500 ng for each of the vectors in a case of using two kinds of sgRNAs), and 1,000 ng of the CRISPR-Cas3 system expression vector or Cas9 expression vector shown in FIG. 9(d) were introduced into the HEK 293T cells using a gene transfection reagent (Lipofectamine™ 2000, Thermo Fisher Scientific™).

The gene-introduced cells were maintained and cultured for 1 week or longer. Thereafter, the cells were stimulated with interferon (IFN)-γ at a final concentration of 50 ng/ml from 2 days before immunostaining to induce expression of HLA protein on the cell surface.

Subsequently, immunostaining was performed using an anti-human HLA-A2 antibody, and expression of HLA protein on the cell surface was examined. Specifically, the HEK 293T cells were reacted with a mouse anti-human HLA-A2 antibody (#740082, BD Biosciences) labeled with a BV421 fluorescent dye. Thereafter, a proportion of HLA-A2-negative cells was calculated by flow cytometry.

FIG. 21(b) is a graph showing a calculated proportion of HLA-A2-negative cells. In FIG. 21(b), "CRISPR-Cas3" indicates the results of using the type I CRISPR system, "#1" to "#10," "#2,'" "#6,'" and "#9'" each indicate the results of co-introducing the above-described expression vector for crRNA, and "crRNA-" indicates the results obtained when none of the crRNAs was introduced.

Furthermore, "CRISPR-Cas9" indicates the results of using the CRISPR-Cas9 system, "#1" to "#10" each indicate the results of co-introducing the above-described expression vector for sgRNA, "#1+ #5" indicates the results of co-introducing an expression vector for sgRNA having "#1" as a target sequence and an expression vector for sgRNA having "#5" as a target sequence, and "#1+ #6" indicates the results of co-introducing an expression vector for sgRNA having "#1" as a target sequence and an expression vector for sgRNA having "#6" as a target sequence. The same applies to the rest. Furthermore, "sgRNA-" indicates the results obtained when none of the sgRNAs was introduced.

As a result, it was clarified that in a case where the target sequence was designed within the coding region of the B2M gene, the CRISPR-Cas9 system showed higher gene disruption efficiency than the type I CRISPR system, whereas in a case where the target sequence was designed in the intron region, regulatory region, or gene vicinity (upstream or downstream) region which are outside the coding region (exon) of the B2M gene, the type I CRISPR system shows higher gene disruption efficiency than the CRISPR-Cas9 system. Furthermore, it was clarified that the type I CRISPR system showed B2M gene disruption efficiency equal to or higher than that of the CRISPR-Cas9 system when comparing a case in which the B2M gene was disrupted by the type I CRISPR system using one kind of crRNA having a target sequence being outside the coding region of the B2M gene, and a case in which the B2M gene was disrupted by the CRISPR-Cas9 system using two kinds of sgRNAs having a target sequence being outside the coding region of the B2M gene at the same time.

Based the above description, it was suggested that the type I CRISPR system can obtain higher genome editing efficiency than the CRISPR-Cas9 system in a case where a region to be edited (target region) is far from a binding site of guide RNA.

Experimental Example 10

(Experiment of HLA Gene Disruption in iPS Cells by Type I CRISPR System Using Multiplex crRNA Expression Vector)

In a crRNA expression vector of the type I CRISPR system, it was examined whether using only one kind of RNA molecule enabled genome editing on a plurality of target sequences by linking the plurality of target sequences with a repeated sequence therebetween.

Figure 22:
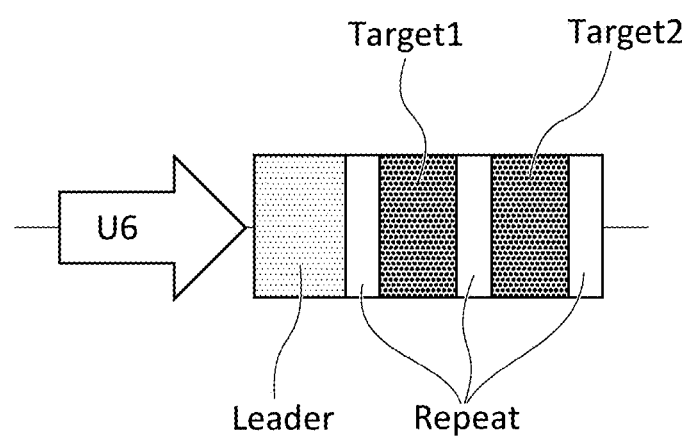
FIG. 22 is a schematic diagram showing a structure of an expression vector for pre-crRNA produced in Experimental Example 10.

FIG. 22 is a schematic diagram showing a structure of an expression vector for pre-crRNA produced in the present experimental example. In FIG. 22, "U6" represents a U6 promoter, "Leader" represents an *Escherichia coli*-derived leader sequence of crRNA of the type I CRISPR system, "Repeat" represents a repeated sequence of crRNA, and "Target 1" and "Target 2" each represent a target sequence of crRNA. Furthermore, as a termination signal of the U6 promoter, "TTTTTT" (where T means thymidine) was provided to the 3'-end of the repeated sequence of crRNA on the most downstream side.

In the present experimental example, a base sequence targeting HLA-A24 (SEQ ID NO: 52) was incorporated into "Target1," and a base sequence targeting HLA-B7 (SEQ ID NO: 53) was incorporated into "Target2."

The day before gene introduction, iPS cells were seeded in a 12-well plate at 300,000 cells/well. Subsequently, per well, 500 ng of the above-described crRNA expression vector, or 500 ng of an expression vector in which a base sequence targeting HLA-A24 (SEQ ID NO: 52) or a base sequence targeting HLA-B7 (SEQ ID NO: 53) or a base sequence targeting the B2M gene (SEQ ID NO: 1) was incorporated into a vector having the structure shown in FIG. 2, and 500 ng of the expression vector of the type I CRISPR system shown in FIG. 9(d) were introduced into the iPS cells using a gene transfection reagent (Lipofectamine™ Stem, Thermo Fisher Scientific™).

For the gene-introduced iPS cells, puromycin at a final concentration of 0.5 μg/mL was added after 24 hours and incubated for one day, and the gene-introduced cells were selected. Subsequently, the cells were maintained and cultured for 1 week or longer. Thereafter, the cells were stimulated with IFN-γ at a final concentration of 50 ng/mL from 2 days before immunostaining to induce expression of HLA protein.

Subsequently, immunostaining was performed using an anti-human HLA-A24 antibody and anti-human HLA-B7, B27 antibodies, and expression of HLA protein was examined.

Specifically, iPS cells were reacted with a mouse anti-human HLA-A24 antibody (#K0208-A64, MBL Life Science) labeled with an Alexa-Fluor® 647 fluorescent dye and mouse anti-human HLA-B7, B27 antibodies (#130-106-049, Miltenyi Biotec) labeled with an FITC fluorescent dye, and a proportion of HLA-A24- and HLA-B7-negative cells was calculated by flow cytometry analysis.

Figure 23:
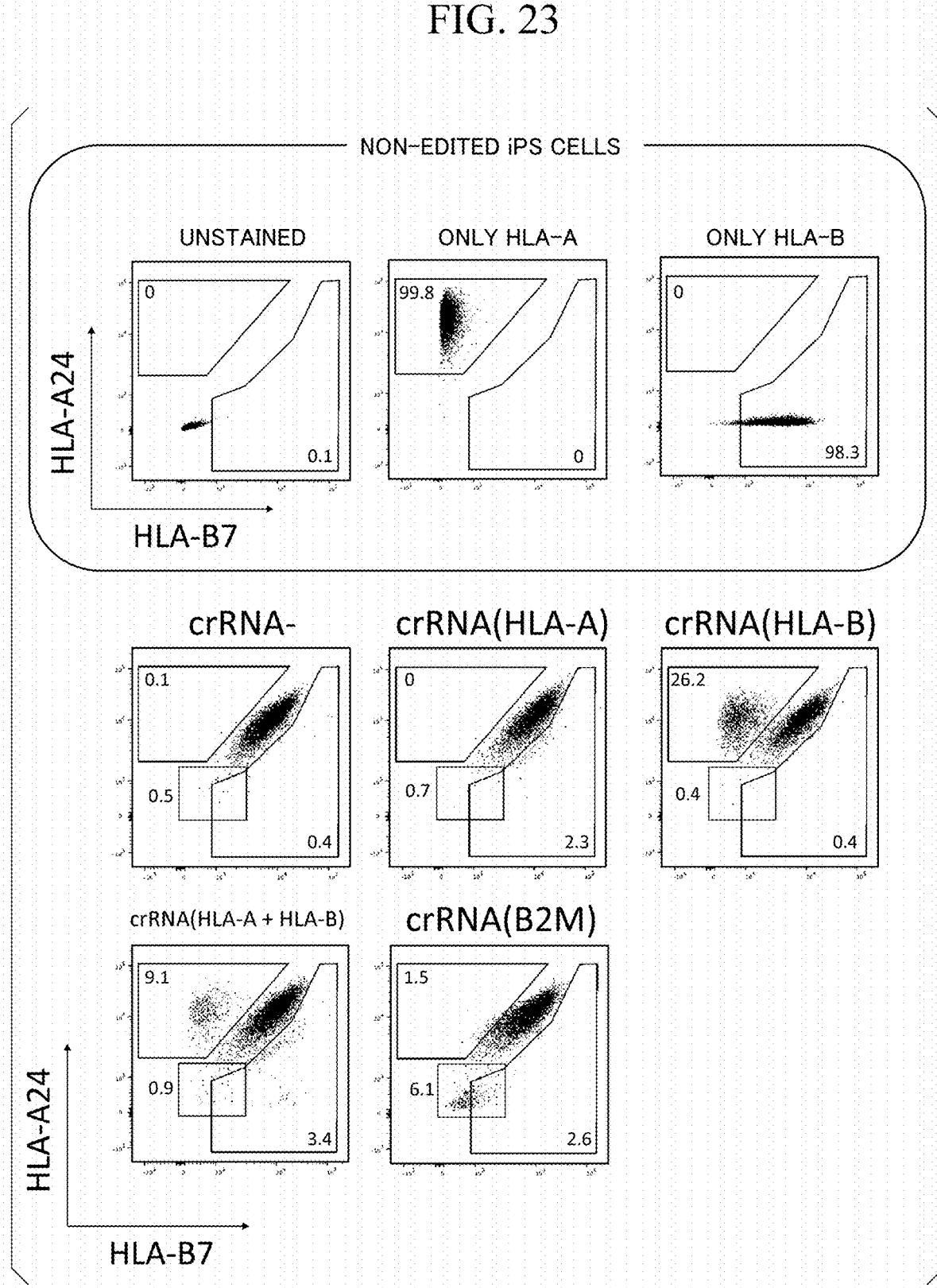
FIG. 23 shows graphs each showing results of flow cytometry analysis in Experimental Example 10.

FIG. 23 shows graphs showing the results of flow cytometry analysis. In FIG. 23, a horizontal axis represents an expression level of HLA-B7, and a vertical axis represents an expression level of HLA-A24. Furthermore, "Non-edited iPS cells" represents the results of analyzing non-edited iPS cells, "Unstained" represents the results of analyzing iPS cells not stained with an anti-human HLA-A24 antibody and anti-human HLA-B7, B27 antibodies, "HLA-A only" represents the result of analyzing iPS cells stained with only an anti-human HLA-A24 antibody, and "HLA-B only" represents the result of analyzing iPS cells stained with only an anti-human HLA-B7, B27 antibody.

Furthermore, "crRNA-" represents the result of analyzing iPS cells into which an expression vector for crRNA was not introduced.

Furthermore, "crRNA (HLA-A)" represents the result of analyzing iPS cells subjected to genome editing by the type I CRISPR system using only an expression vector for crRNA targeting HLA-A24.

Furthermore, "crRNA (HLA-B)" represents the result of analyzing iPS cells subjected to genome editing by the type I CRISPR system using only an expression vector for crRNA targeting HLA-B7.

Furthermore, "crRNA (HLA-A+HLA-B)" represents the result of analyzing iPS cells subjected to genome editing by the type I CRISPR system using a crRNA expression vector having a structure in which both crRNA targeting HLA-A24 and crRNA targeting HLA-B7 are arranged in tandem.

Furthermore, "crRNA (B2M)" represents the result of analyzing iPS cells subjected to genome editing by the type I CRISPR system using an expression vector for crRNA targeting B2M.

As a result, it was clarified that genome editing can be performed on a plurality of target sequences by using only one RNA molecule in a case where genome editing is performed by the type I CRISPR system using a crRNA expression vector shown in FIG. 22 which has a structure in which the target sequences are arranged in tandem.

Experimental Example 11

(Comparison 1 of Genome Editing Efficiency Between HEK 293T Cells and iPS Cells)
<<HEK 293T Cells>>

Genome editing of an EMX1 locus of HEK 293T cells was performed using the type I CRISPR system.

As expression vectors for Cse1, Cse2, Cas5, Cas6, Cas7, and Cas3 genes, six kinds of expression vectors each having a structure shown in FIGS. 3(a) to 3(f) and produced in Experimental Example 1 were used. Furthermore, an expression vector for crRNA with respect to a target sequence (SEQ ID NO: 54) in the EMX1 locus was used.

The day before gene introduction, HEK 293T cells were seeded in a 24-well plate at 150,000 cells/well. Subsequently, per well, 250 ng of each of the above-mentioned expression vectors for the constituent proteins of the type I Cascade complex and for Cas3 protein, and 250 ng of a crRNA expression vector were introduced into the HEK 293T cells using a gene transfection reagent (Lipofectamine™ 2000, Thermo Fisher Scientific™).

Subsequently, the gene-introduced cells were cultured for several days. Subsequently, genomic DNA was purified from this cell population using a commercially available kit (MonoFas Genomic DNA Cultured Cells Extraction Kit VI, GL Sciences Inc.).

Subsequently, PCR was performed with Quick Taq™ HS DyeMix (TOYOBO CO., LTD.) using a sense strand primer (SEQ ID NO: 55) and an antisense strand primer (SEQ ID NO: 56).

Figure 24:
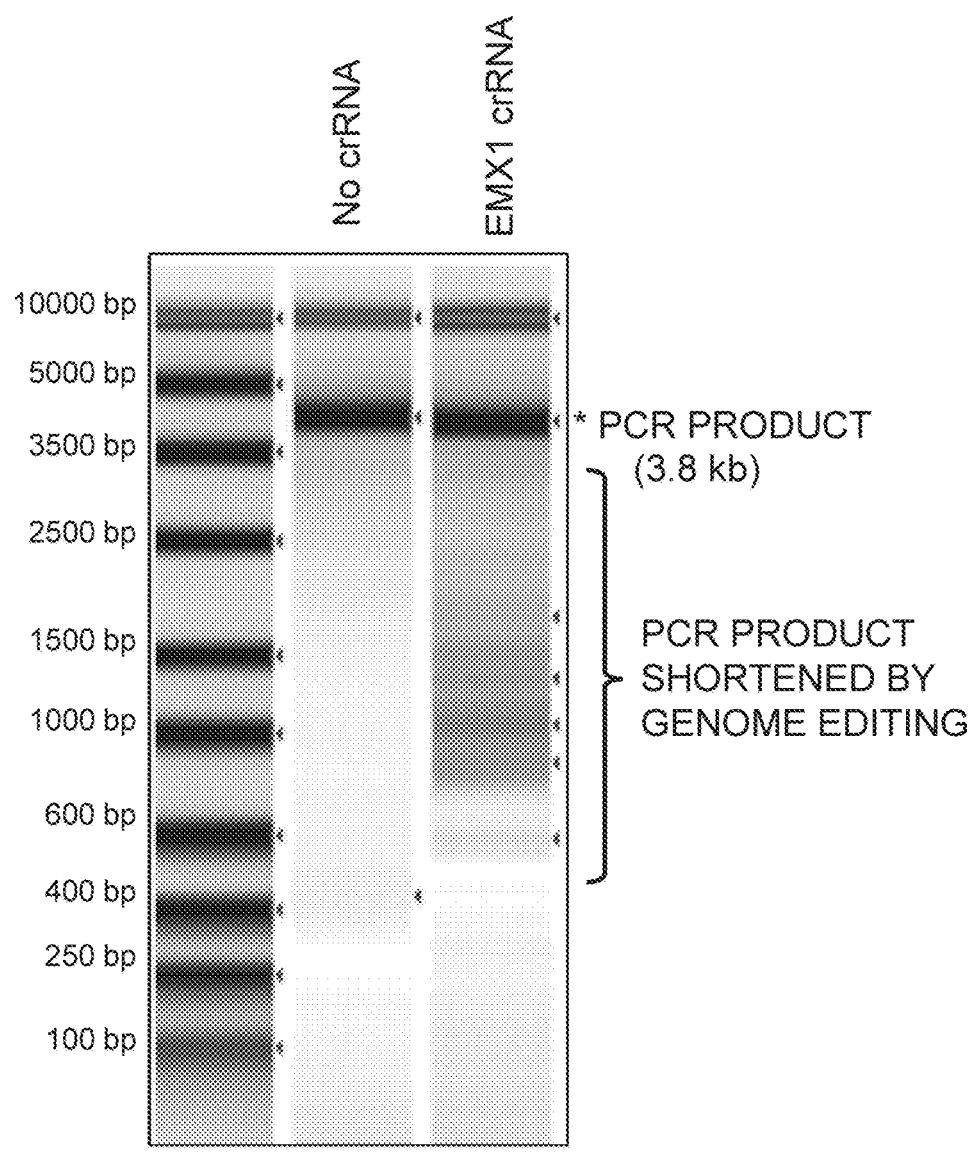
FIG. 24 is an image showing results of analyzing a PCR product in Experimental Example 11.

FIG. 24 is an image showing the results of analyzing a PCR product obtained by the above-mentioned PCR with Agilent 2200 TapeStation D5000 (Agilent Technologies, Inc.). In FIG. 24, "No crRNA" represents the results of control into which the expression vector for crRNA was not introduced, and "EMX1 crRNA" represents the results of HEK 293T cells into which the expression vector for crRNA with respect to a target sequence (SEQ ID NO: 54) in the EMX1 locus was introduced.

As a result, it was clarified that in HEK 293T cells, by gene introduction with 7 kinds of the expression vectors for Cse1, Cse2, Cas5, Cas6, Cas7, Cas3 genes and the expression vector for crRNA, genome editing was induced, and a short PCR product was obtained.

Subsequently, genome editing of a DMD locus of HEK 293T cells was performed using the type I CRISPR system.

As expression vectors for Cse1, Cse2, Cas5, Cas6, Cas7, and Cas3 genes, six kinds of expression vectors each having a structure shown in FIGS. 3(a) to 3(f) and produced in Experimental Example 1 were used. Furthermore, as the crRNA expression vector, an expression vector for crRNA with respect to a target sequence (SEQ ID NO: 17) at the DMD locus or an expression vector for crRNA with respect to a target sequence (SEQ ID NO: 18) at the DMD locus was used.

The day before gene introduction, HEK 293T cells were seeded in a 24-well plate at 150,000 cells/well. Subsequently, per well, 250 ng of each of the above-mentioned expression vectors for the constituent proteins of the type I Cascade complex and for Cas3 protein, and 250 ng of a crRNA expression vector were introduced into the HEK 293T cells using a gene transfection reagent (Lipofectamine™ 2000, Thermo Fisher Scientific™).

Subsequently, the gene-introduced cells were cultured for several days. Subsequently, genomic DNA was purified from this cell population using a commercially available kit (MonoFas Genomic DNA Cultured Cells Extraction Kit VI, GL Sciences Inc.).

Subsequently, PCR was performed with Quick Taq™ HS DyeMix (TOYOBO CO., LTD.) using a sense strand primer (SEQ ID NO: 104) and an antisense strand primer (SEQ ID NO: 105).

Figure 25:
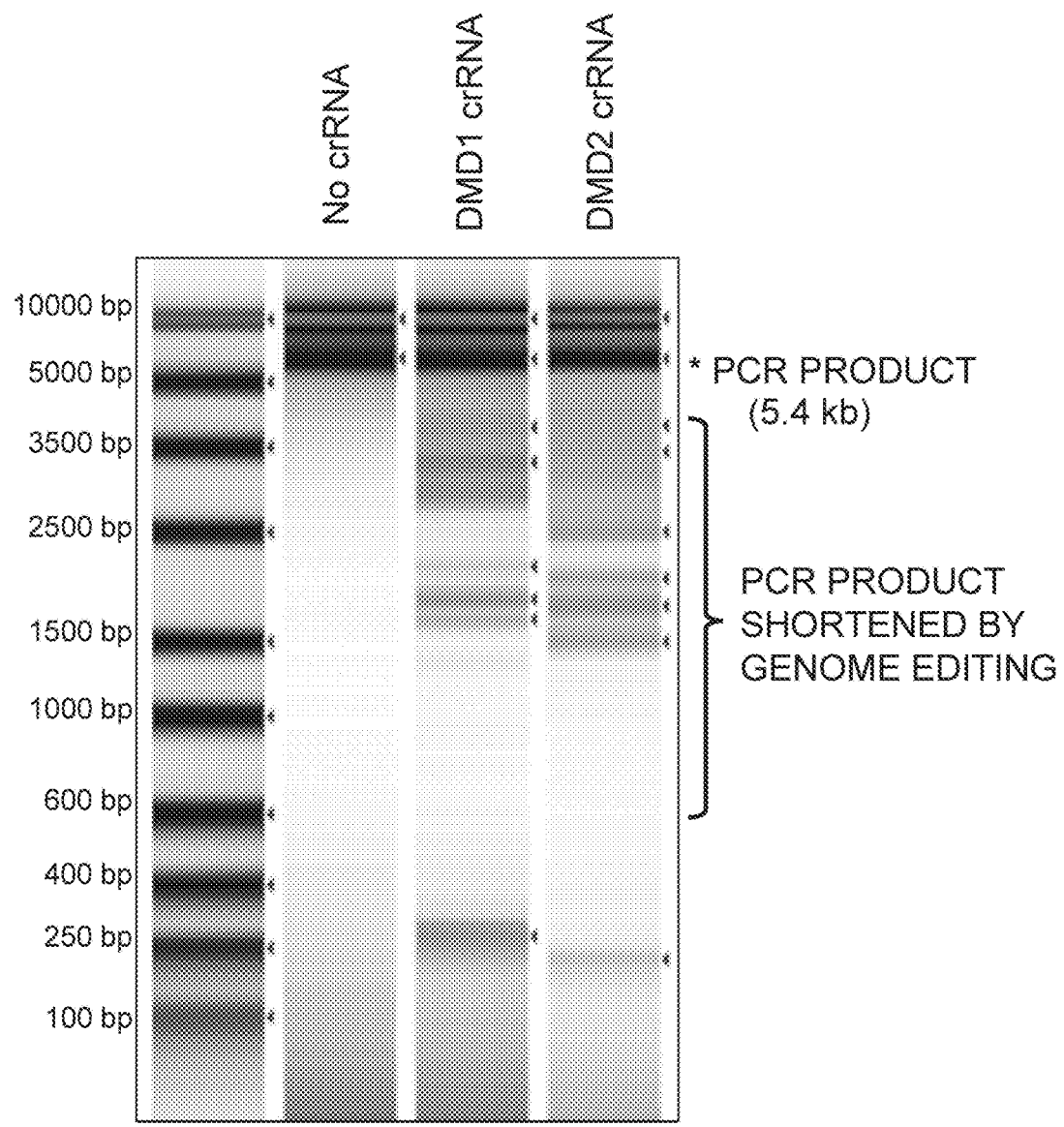
FIG. 25 is an image showing results of analyzing a PCR product in Experimental Example 11.

FIG. 25 is an image showing the results of analyzing a PCR product obtained by the above-mentioned PCR with Agilent 2200 TapeStation D5000 (Agilent Technologies, Inc.). In FIG. 25, "No crRNA" represents the result of a control into which an expression vector for crRNA was not introduced. Furthermore, "DMD1 crRNA" represents the results of HEK 293T cells into which an expression vector for crRNA with respect to a target sequence (SEQ ID NO: 106) at the DMD locus was introduced. Furthermore, "DMD2 crRNA" represents the results of HEK 293T cells into which an expression vector for crRNA with respect to a target sequence (SEQ ID NO: 107) at the DMD locus was introduced.

As a result, it was clarified that in HEK 293T cells, by gene introduction with 7 kinds of the expression vectors for Cse1, Cse2, Cas5, Cas6, Cas7, Cas3 genes and the expression vector for crRNA, genome editing was induced, and a short PCR product was obtained. This result further supports that HEK 293T cells have high genome editing efficiency.

<<iPS Cells>>

Genome editing of an EMX1 locus of iPS cells was performed using the type I CRISPR system. As the iPS cells, iPS cells, which were derived from patients with Duchenne muscular dystrophy and had a mutation in which exons 46 and 47 of the DMD gene had been deleted, were used.

As expression vectors for Cse1, Cse2, Cas5, Cas6, Cas7, and Cas3 genes, six kinds of expression vectors each having a structure shown in FIGS. 3(a) to 3(f) and produced in Experimental Example 1 were used. Furthermore, an expression vector for crRNA with respect to a target sequence (SEQ ID NO: 54) in the EMX1 locus was used.

On the day of gene introduction, iPS cells of 1,000,000 cells/sample was prepared. Subsequently, per sample, 1 µg of each of the above-mentioned expression vectors for the constituent proteins of the type I Cascade complex and for Cas3 protein, 1 µg of a crRNA expression vector, and 2 µg of a vector expressing an EGFP gene and a puromycin-resistant gene were introduced into the iPS cells by electroporation using a gene transfection device (NEPA21, Nepa Gene Co., Ltd.).

Subsequently, 1 µg/mL puromycin was added into a medium of the gene-introduced cells and cultured for several days. Subsequently, genomic DNA was purified from this cell population using a commercially available kit (MonoFas Genomic DNA Cultured Cells Extraction Kit VI, GL Sciences Inc.).

Subsequently, PCR was performed with Quick Taq™ HS DyeMix (TOYOBO CO., LTD.) using a sense strand primer (SEQ ID NO: 55) and an antisense strand primer (SEQ ID NO: 56).

Figure 26:
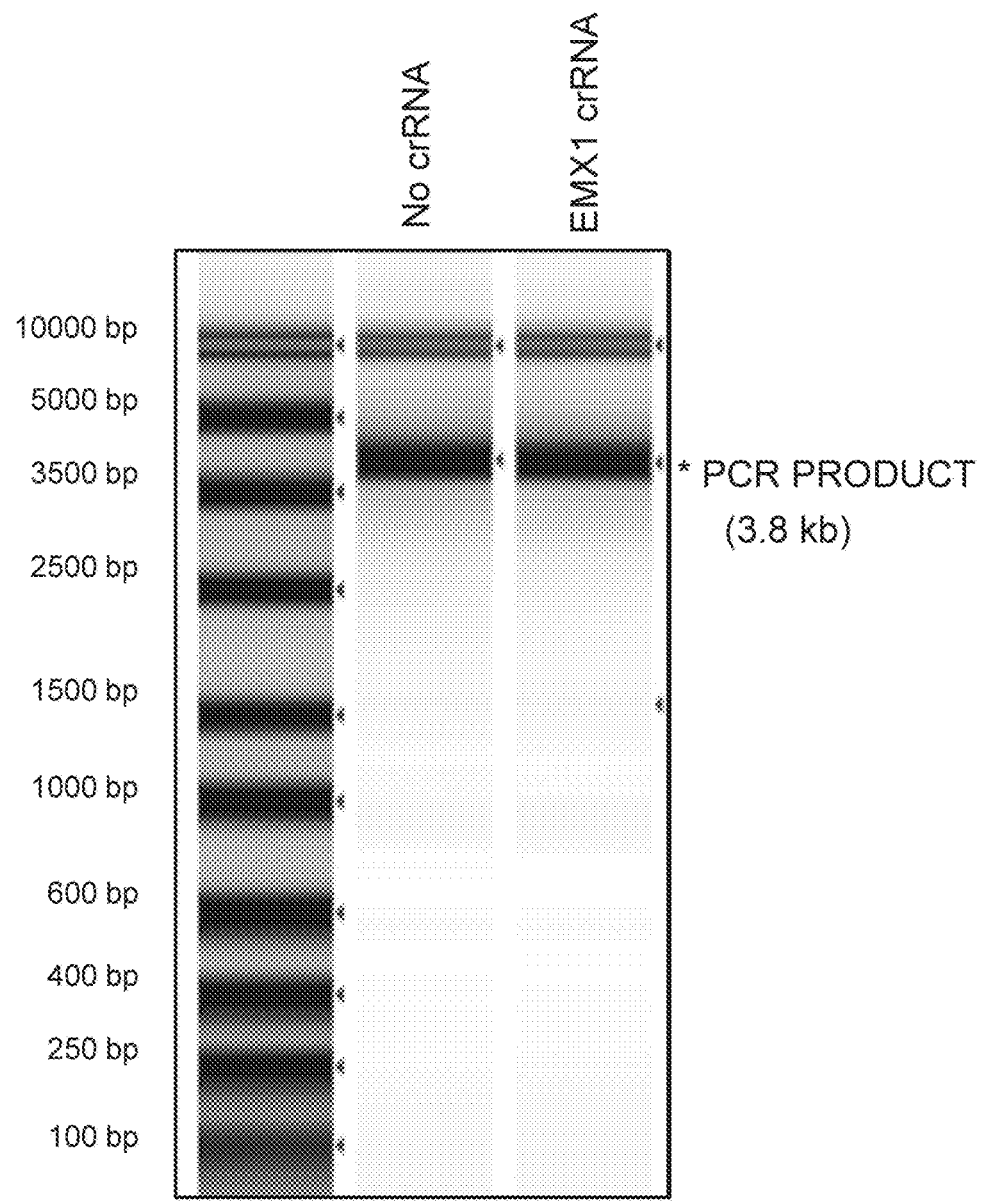
FIG. 26 is an image showing results of analyzing a PCR product in Experimental Example 11.

FIG. 26 is an image showing the results of analyzing a PCR product obtained by the above-mentioned PCR with Agilent 2200 TapeStation D5000 (Agilent Technologies, Inc.). In FIG. 26, "No crRNA" represents the results of control into which the expression vector for crRNA was not introduced, and "EMX1 crRNA" represents the results of iPS cells into which the expression vector for crRNA with respect to a target sequence (SEQ ID NO: 54) in the EMX1 locus was introduced.

As a result, in iPS cells, even when gene introduction with 7 kinds of the expression vectors for Cse1, Cse2, Cas5, Cas6, Cas7, Cas3 genes and the expression vector for crRNA was performed, a short PCR product was not detected, and induction of genome editing was not detected.

Subsequently, genome editing of a DMD locus of iPS cells was performed using the type I CRISPR system. As the iPS cells, iPS cells, which were derived from patients with Duchenne muscular dystrophy and had a mutation in which exons 46 and 47 of the DMD gene had been deleted, were used.

As expression vectors for Cse1, Cse2, Cas5, Cas6, Cas7, and Cas3 genes, six kinds of expression vectors each having a structure shown in FIGS. 3(a) to 3(f) and produced in Experimental Example 1 were used. Furthermore, as the crRNA expression vector, an expression vector for crRNA with respect to a target sequence (SEQ ID NO: 106) at the DMD locus, an expression vector for crRNA with respect to a target sequence (SEQ ID NO: 107) at the DMD locus, or an expression vector for crRNA with respect to a target sequence (SEQ ID NO: 54) at the EMX1 locus was used.

iPS cells were prepared at 200,000 cells/sample on the day of gene introduction. Per sample, 71.4 ng of each of the above-mentioned expression vectors for the constituent proteins of the type I Cascade complex and for Cas3 protein, and 71.4 ng of a crRNA expression vector were introduced into the iPS cells by electroporation using a gene transfection device (4D-Nucleofector, Lonza).

Subsequently, the gene-introduced cells were cultured for several days. Subsequently, genomic DNA was purified from this cell population using a commercially available kit (MonoFas Genomic DNA Cultured Cells Extraction Kit VI, GL Sciences Inc.).

Subsequently, PCR was performed with Quick Taq™ HS DyeMix (TOYOBO CO., LTD.) using a sense strand primer (SEQ ID NO: 104) and an antisense strand primer (SEQ ID NO: 105).

Figure 27:
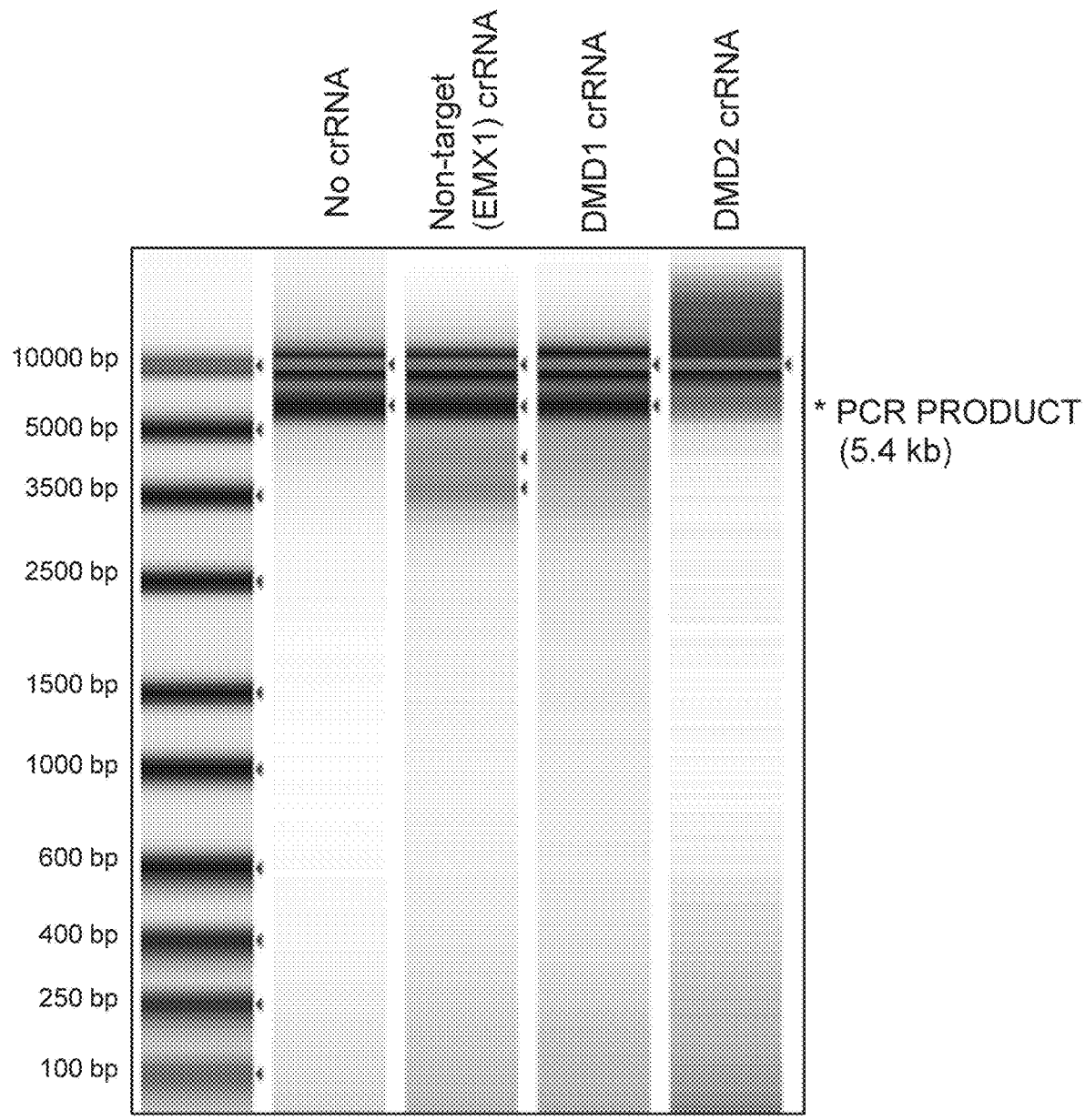
FIG. 27 is an image showing results of analyzing a PCR product in Experimental Example 11.

FIG. 27 is an image showing the results of analyzing a PCR product obtained by the above-mentioned PCR with Agilent 2200 TapeStation D5000 (Agilent Technologies, Inc.). In FIG. 27, "No crRNA" represents the result of a control into which an expression vector for crRNA was not introduced. Furthermore, "Non-target (EMX1) crRNA" represents the results of iPS cells into which an expression vector for crRNA with respect to a target sequence (SEQ ID NO: 54) at the EMX1 locus as a non-target sequence was introduced. Furthermore, "DMD1 crRNA" represents the results of iPS cells into which an expression vector for crRNA with respect to a target sequence (SEQ ID NO: 106) at the DMD locus was introduced. Furthermore, "DMD2 crRNA" represents the results of iPS cells into which an expression vector for crRNA with respect to a target sequence (SEQ ID NO: 107) at the DMD locus was introduced.

As a result, in iPS cells, even when gene introduction with 7 kinds of the expression vectors for Cse1, Cse2, Cas5, Cas6, Cas7, Cas3 genes and the expression vector for crRNA was performed, a short PCR product was not detected, and induction of genome editing was not detected.

Experimental Example 12

(Comparison 2 of Genome Editing Efficiency Between HEK 293T Cells and iPS Cells)

Genome editing of EMX1 loci of HEK 293T cells and iPS cells were performed using the type I CRISPR system.

In a case of gene introduction on HEK 293T cells, as expression vectors for Cse1, Cse2, Cas5, Cas6, Cas7, and Cas3 genes, six kinds of expression vectors each having a structure shown in FIGS. 3(a) to 3(f) and produced in Experimental Example 1 were used. Furthermore, an expression vector for crRNA with respect to a target sequence (SEQ ID NO: 54) in the EMX1 locus was used.

Furthermore, in a case of gene introduction on iPS cells, as expression vectors for Cse1, Cse2, Cas5, Cas6, and Cas7 genes, the expression vector (pTL-Cascade) having the structure shown in FIG. 5 and produced in Experimental Example 2 was used. In this expression vector, each of the constituent proteins of the type I Cascade complex is expressed as an individual protein from a single mRNA by being linked with a P2A sequence. Furthermore, as the expression vector for the Cas3 gene, the expression vector having the structure shown in FIG. 3(f) was used. Furthermore, an expression vector for crRNA with respect to a target sequence (SEQ ID NO: 54) in the EMX1 locus was used.

The day before gene introduction, HEK 293T cells were seeded in a 24-well plate at 125,000 cells/well. Subsequently, per well, 200 ng of each of the above-mentioned expression vectors for the constituent proteins of the type I Cascade complex and for Cas3 protein, and 200 ng of a crRNA expression vector were introduced into the HEK 293T cells using a gene transfection reagent (Lipofectamine™ 2000, Thermo Fisher Scientific™).

Subsequently, the gene-introduced cells were cultured for several days. Subsequently, genomic DNA was purified from this cell population using a commercially available kit (MonoFas Genomic DNA Cultured Cells Extraction Kit VI, GL Sciences Inc.).

Subsequently, PCR was performed with Quick Taq™ HS DyeMix (TOYOBO CO., LTD.) using a sense strand primer (SEQ ID NO: 55) and an antisense strand primer (SEQ ID NO: 56).

Regarding iPS cells, the day before gene introduction, iPS cells were seeded in a 24-well plate at 150,000 cells/well. Subsequently, per well, 700 ng of pTL-Cascade, 150 ng of the expression vector for Cas3 protein, and 150 ng of a crRNA expression vector were introduced into the iPS cells using a gene transfection reagent (Lipofectamine™ Stem, Thermo Fisher Scientific™).

Subsequently, for the purpose of concentrating the gene-introduced cells, puromycin at a final concentration of 1 µg/mL was added 24 hours after the gene introduction, and the gene-introduced cells were selected for one day. Subsequently, the gene-introduced cells were cultured for several days. Subsequently, genomic DNA was purified from this cell population using a commercially available kit (MonoFas Genomic DNA Cultured Cells Extraction Kit VI, GL Sciences Inc.).

Subsequently, PCR was performed with Quick Taq™ HS DyeMix (TOYOBO CO., LTD.) using a sense strand primer (SEQ ID NO: 55) and an antisense strand primer (SEQ ID NO: 56).

Figure 28:
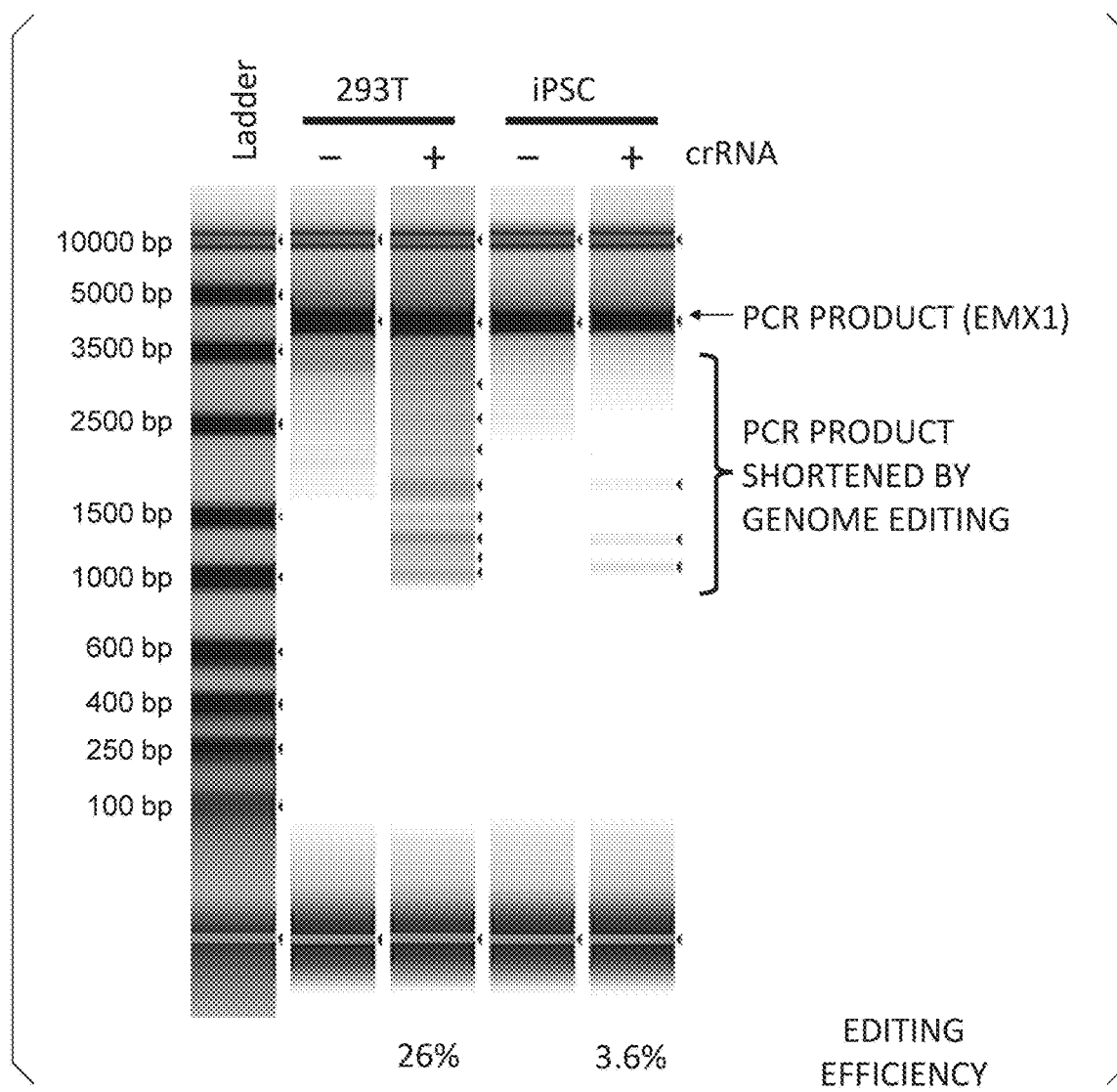
FIG. 28 is an image showing results of analyzing a PCR product in Experimental Example 12.

FIG. 28 is an image showing the results of analyzing a PCR product obtained by the above-mentioned PCR with Agilent 2200 TapeStation D5000 (Agilent Technologies, Inc.). In FIG. 28, "Ladder" represents a D5000 DNA marker (Agilent Technologies, Inc.) for molecular weight reference, "293T" represents the results of HEK 293T cells, "iPSC" represents the results of iPS cells, "−" represents the results of a control into which the expression vector for crRNA was not introduced, and "+" represents the results of introducing the expression vector for crRNA.

As a result, it was clarified that in the HEK 293T cells, by introducing the Cascade factor, the expression vector for Cas3 protein, and the crRNA expression vector, genome editing was induced, and a short PCR product was obtained. Genome editing efficiency was calculated, and it was 26%.

Meanwhile, it was clarified that in the iPS cells, by introducing the Cascade factor, the expression vector for Cas3 protein, and the crRNA expression vector and selecting gene-introduced cells with puromycin in a short period of time (1 day), it became possible to detect the induction of genome editing, and a short PCR product was obtained. Genome editing efficiency was calculated, and it was 3.6%.

Experimental Example 13

(Disruption 5 of B2M Gene by Type I CRISPR System)

B2M genes on the genomes of HEK 293T cells and iPS cells were disrupted using the type I CRISPR system. In the present experimental example, mRNA of the constituent proteins of the type I Cascade complex and mRNA of Cas3 protein were used instead of the expression vectors for the constituent proteins of the type I Cascade complex and the expression vector for Cas3 protein. Furthermore, crRNA was used as an RNA molecule, not for an expression vector.

In the present experimental example, unlike Experimental Example 3, mRNAs expressing each of Cas7, Cas5, and Cse1 as an individual protein from a single mRNA, and mRNAs expressing each of Cse2, Cas6, and Cas3 as an individual protein from a single mRNA were used. These mRNAs were synthesized in vitro using a commercially available kit (MEGAscript™ T7 Transcription Kit, Thermo Fisher Scientific™).

In mRNA synthesis, in addition to ATP, UTP, and CTP, Anti Reverse Cap Analog (ARCA: 3'-O-Me-m7G (5') ppp (5') G, TriLink BioTechnologies), which is a 5' cap analog, and GTP were mixed at a ratio of 4:1 and used. Furthermore, a T7 promoter sequence and a sequence of 5' UTR which perform transcription in vitro, a sequence of SEQ ID NO: 33 as a Kozak sequence, and a sequence of SEQ ID NO: 34 as a sequence of 3' UTR and poly A signal were used. The sequence of 3' UTR is based on a UTR sequence of an α-globin (Hba-a1) gene.

FIG. 29(a) is a schematic diagram showing a construct of mRNA that expresses each of Cas7, Cas5, and Cse1 as individual proteins from a single mRNA. FIG. 29(b) is a schematic diagram showing a construct of mRNA that expresses each of Cse2, Cas6, and Cas3 as individual proteins from a single mRNA. In FIGS. 29(a) and 29(b), a Cap structure or a Cap-like structure is present at the 5'-end of mRNA (upstream from 5' UTR). By providing the Cap structure or the Cap-like structure, an expression level of each of the proteins tends to increase. Furthermore, the proteins are linked with each other by a 2A sequence. For the 2A sequence referred to herein, a P2A sequence and a T2A sequence were used.

Furthermore, crRNA consisting of a base sequence set forth in SEQ ID NO: 13 was synthesized in vitro using a commercially available kit (MEGAshortscript™ T7 Transcription Kit, Thermo Fisher Scientific™). The synthesized crRNA had a leader sequence of crRNA of *Escherichia coli*, a repeated sequence, a target sequence for the B2M gene, and a repeated sequence in this order.

Regarding HEK 293T cells, the day before gene introduction, HEK 293T cells were seeded in a 12-well plate at 300,000 cells/well. Subsequently, per well, 500 ng of each of mRNAs expressing each of Cas7, Cas5, and Cse1 as an individual protein from a single mRNA, mRNAs expressing each of Cse2, Cas6, and Cas3 as an individual protein from a single mRNA, and crRNA were introduced into the HEK 293T cells using a gene transfection reagent (Lipofectamine™ MessengerMAX™, Thermo Fisher Scientific™).

Furthermore, regarding iPS cells, the day before gene introduction, iPS cells were seeded in a 12-well plate at 250,000 cells/well. Subsequently, per well, 500 ng of each of mRNAs expressing each of Cas7, Cas5, and Cse1 as an individual protein from a single mRNA, mRNAs expressing each of Cse2, Cas6, and Cas3 as an individual protein from a single mRNA, and crRNA were introduced into the iPS cells by electroporation using a gene transfection device (4D-Nucleofector, Lonza).

The gene-introduced cells were maintained and cultured for 1 week or longer. Thereafter, the cells were stimulated with IFN-γ at a final concentration of 50 ng/ml from 2 days before immunostaining to induce expression of HLA protein. Subsequently, immunostaining was performed using an anti-human HLA-A2 antibody, and expression of HLA protein was examined. Specifically, the HEK 293T cells and the iPS cells were reacted with a mouse anti-human HLA-A2 antibody (#740082, BD Biosciences) labeled with a BV421 fluorescent dye. Thereafter, a proportion of HLA-A2-negative cells was calculated by flow cytometry.

Figure 30:
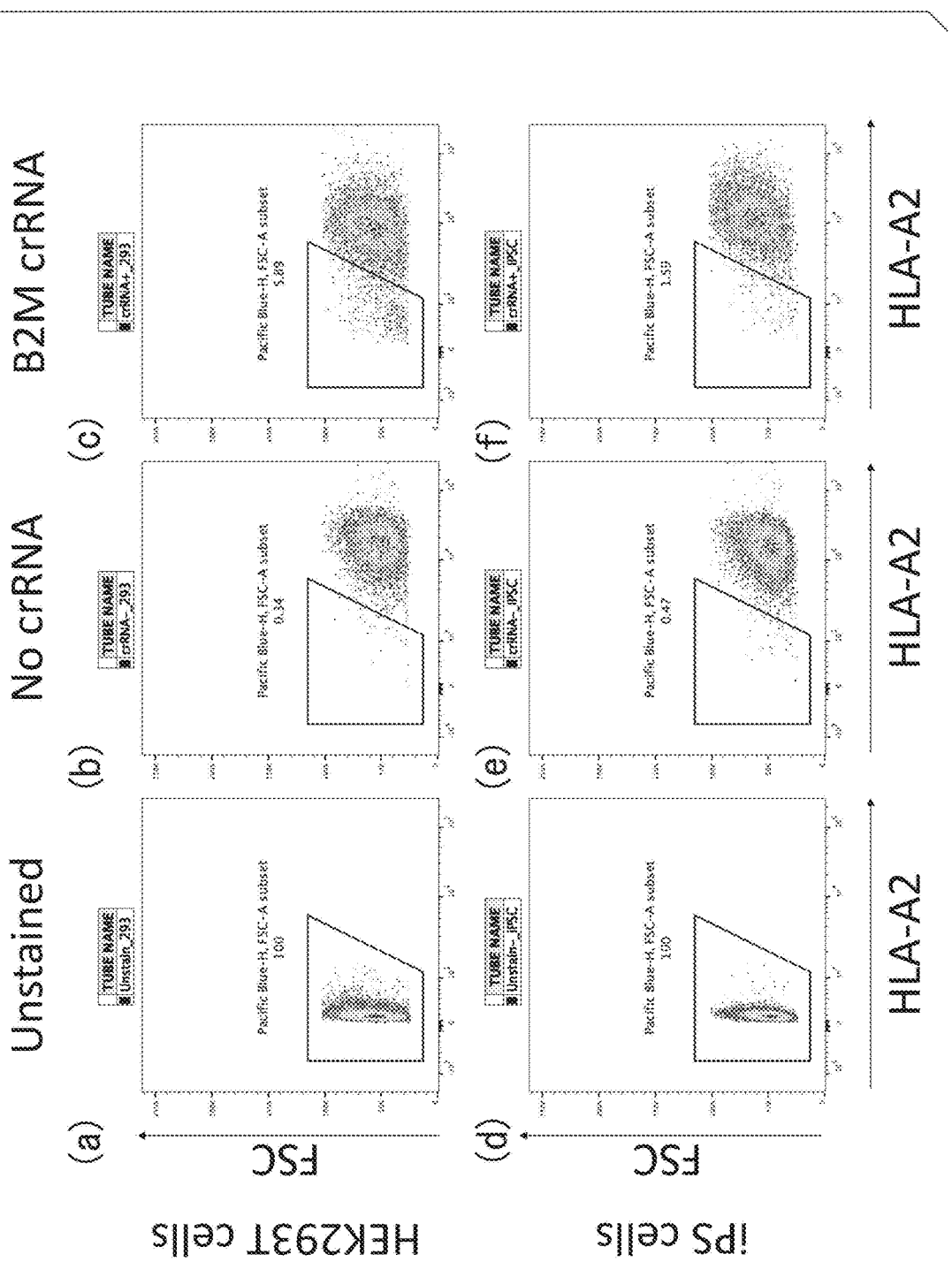
FIGS. 30(a) to 30(f) are graphs each showing results of flow cytometry analysis in Experimental Example 13.

FIGS. 30(a) to 30(f) are graphs showing results of flow cytometry analysis. FIGS. 30(a) to 30(c) each show the results of HEK 293T cells, and FIGS. 30(d) to 30(f) each show the results of HEK 293T cells. Furthermore, in FIGS. 30(a) to 30(f), a horizontal axis represents an expression level of HLA-A2, and a vertical axis represents an intensity of forward scattered light. Furthermore, "Unstained" represents the results of analyzing cells not stained with an anti-human HLA-A2 antibody, "No crRNA" represents the results of ae control into which crRNA was not introduced, and "B2M crRNA" represents the results of introducing crRNA consisting of a base sequence set forth in SEQ ID NO: 13.

As a result, it was clarified that the B2M gene could be disrupted in the HEK 293T cells with higher efficiency than in Experimental Example 3. Furthermore, it was also clarified that the B2M gene could be disrupted in the iPS cells.

Experimental Example 14

(Establishment of Stable Expression Cell Line for Doxycycline-Inducible Type Type I CRISPR System)

Figure 31:
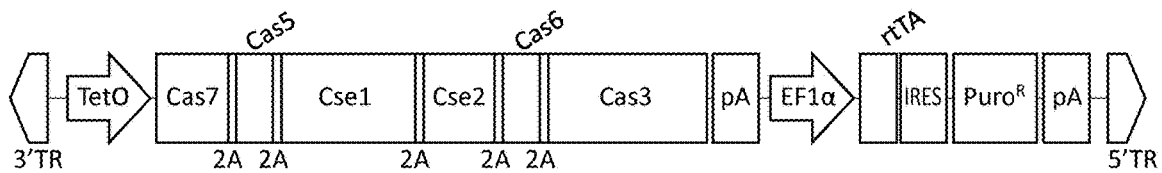
FIG. 31 is a schematic diagram showing a structure of a piggyBac vector produced in Experimental Example 14.

FIG. 31 is a schematic diagram showing a structure of a piggyBac vector in which expression of the constituent proteins of the type I Cascade complex and Cas3 protein is induced in a doxycycline-induced manner.

A vector having the structure shown in FIG. 31 was produced and introduced into HEK 293T cells to obtain a stable expression line. As shown in FIG. 31, into this vector, an expression cassette, in which Cas7, Cas5, Cse1, Cse2, Cas6, and Cas3 are linked with a 2A peptide to downstream of a TetO promoter of which expression is induced by adding a doxycycline analogous compound, is incorporated. Furthermore, rtTA and puromycin-resistant genes which bind to the doxycycline analogous compound are expressed from a constitutive promoter (in this case, an EF1α promoter).

HEK 293T cells were seeded in a 12-well plate at 300,000 cells/well and incubated for 1 day. The next day, 800 ng of the vector shown in FIG. 31 and 200 ng of piggyBac transposase were introduced into the HEK 293T cells using a gene transfection reagent (Lipofectamine™ 2000, Thermo Fisher Scientific™).

Subsequently, 24 hours after the gene introduction, 1 μg/mL puromycin was added into a medium of the HEK 293T cells, and cells that had been subjected to the gene introduction were selected for 1 day. Subsequently, the cells were maintained and cultured for 2 weeks or longer in a medium to which puromycin was added, and thereby a stable expression line was obtained.

Experimental Example 15

(Comparison of Activities Between Leader Sequences of Type I CRISPR System)

Figure 32:
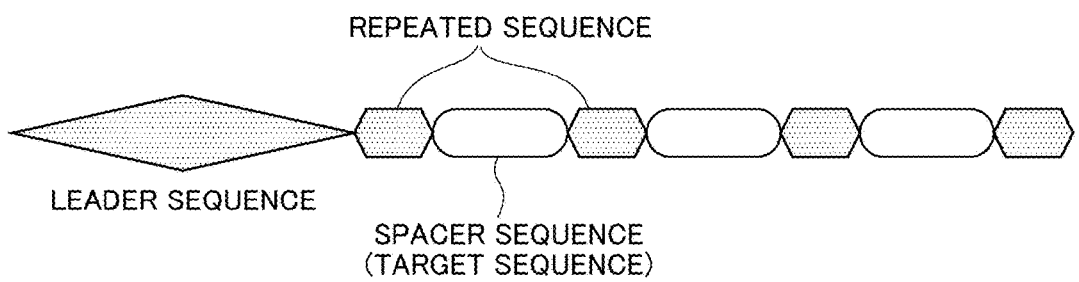
FIG. 32 is a schematic diagram showing a structure of Pre-crRNA in a type I CRISPR system.

FIG. 32 is a schematic diagram showing a structure of Pre-crRNA in a type I CRISPR system. As shown in FIG. 32, crRNA of the type I CRISPR system is transcribed as Pre-crRNA composed of a leader sequence, a repeated sequence, a spacer sequence that complementarily binds to a target sequence, and a repeated sequence in this order.

Figure 33:
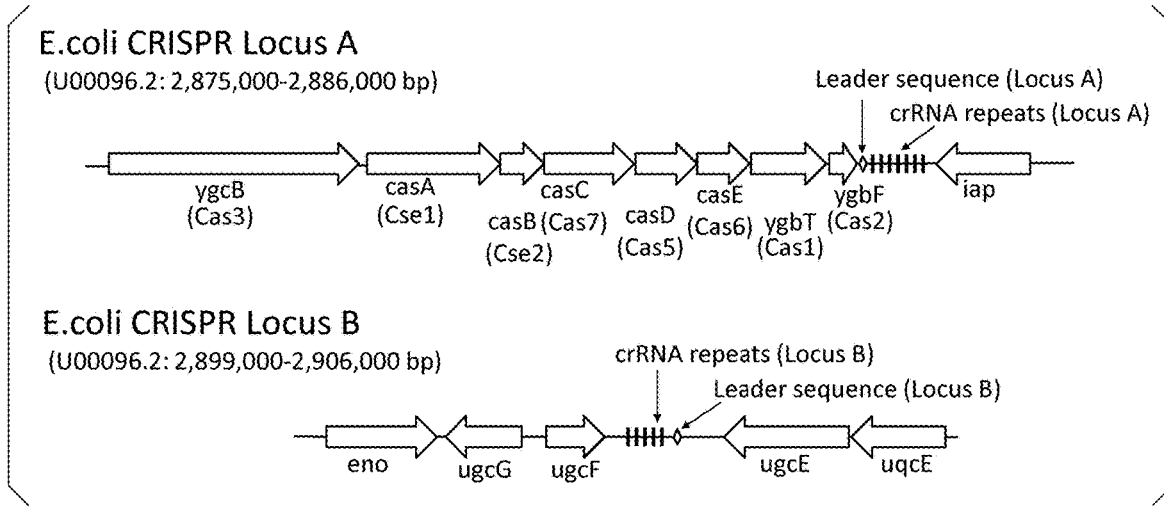
FIG. 33 is a schematic diagram showing a structure of a crRNA repeat region of a type I CRISPR system of *Escherichia coli*.

The inventors of the present invention have examined genomic sequences of *Escherichia coli* (NCBI accession number: U00096.2) and found that there are two crRNA repeat regions of the type I CRISPR system. FIG. 33 is a schematic diagram showing a structure of a crRNA repeat region of a type I CRISPR system of *Escherichia coli*. The two regions were named Locus A and Locus B.

Figure 34:
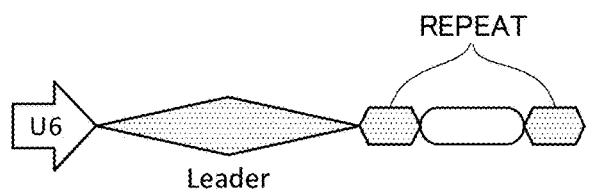
FIG. 34 is a schematic diagram showing a structure of a plasmid DNA vector produced in Experimental Example 15.

In the present experimental example, activities between crRNA having a leader sequence of the Locus A and crRNA having a leader sequence of the Locus B were compared. First, a plasmid DNA vector which has a leader sequence (SEQ ID NO: 57) derived from the Locus A and expresses crRNA with respect to a target sequence (SEQ ID NO: 17) in the intron 44 of a human dystrophin (DMD) gene, and a plasmid DNA vector which has a leader sequence (SEQ ID NO: 58) derived from the Locus B and expresses crRNA with respect to a target sequence (SEQ ID NO: 17) in the intron 44 of a human dystrophin (DMD) gene were constructed. FIG. 34 is a schematic diagram showing a structure of a produced plasmid DNA vector.

Subsequently, exon skipping was induced for the exon number 45 of the dystrophin (DMD) gene, and a difference in activities was compared and examined. Exon skipping efficiency was measured by the same exon skipping model luciferase assay as in Experimental Example 6. crRNA used in the present experimental example has a spacer sequence that binds to a complementary strand of the target sequence which is in the intron 44 of the human DMD gene and is represented by "#1" in FIG. 13.

An examination was conducted using HEK 293T cells that stably express the doxycycline-inducible type type I CRISPR system produced in Experimental Example 14. 100 ng of the above-mentioned reporter vector, 20 ng of a phRL-TK vector expressing *Renilla reniformis* luciferase (*Renilla* Luc) as an internal standard, and 100 ng of a crRNA expression vector were introduced into the HEK 293T cells that stably express the doxycycline-inducible type CRISPR system. The cells were seeded in a 96-well plate at 60,000 cells/100 μL/well. For gene introduction, a gene transfection reagent (Lipofectamine™ 2000, Thermo Fisher Scientific™) was used.

Subsequently, doxycycline was added to a final concentration of 2 μmol/L. Furthermore, as a negative control, wells into which doxycycline was not added were prepared for each sample. Subsequently, two days after the gene introduction, luciferase reporter activity was analyzed using a commercially available kit ("Dual-Glo® Luciferase Assay system" Cat. No. E2920, Promega Corporation).

Figure 35:
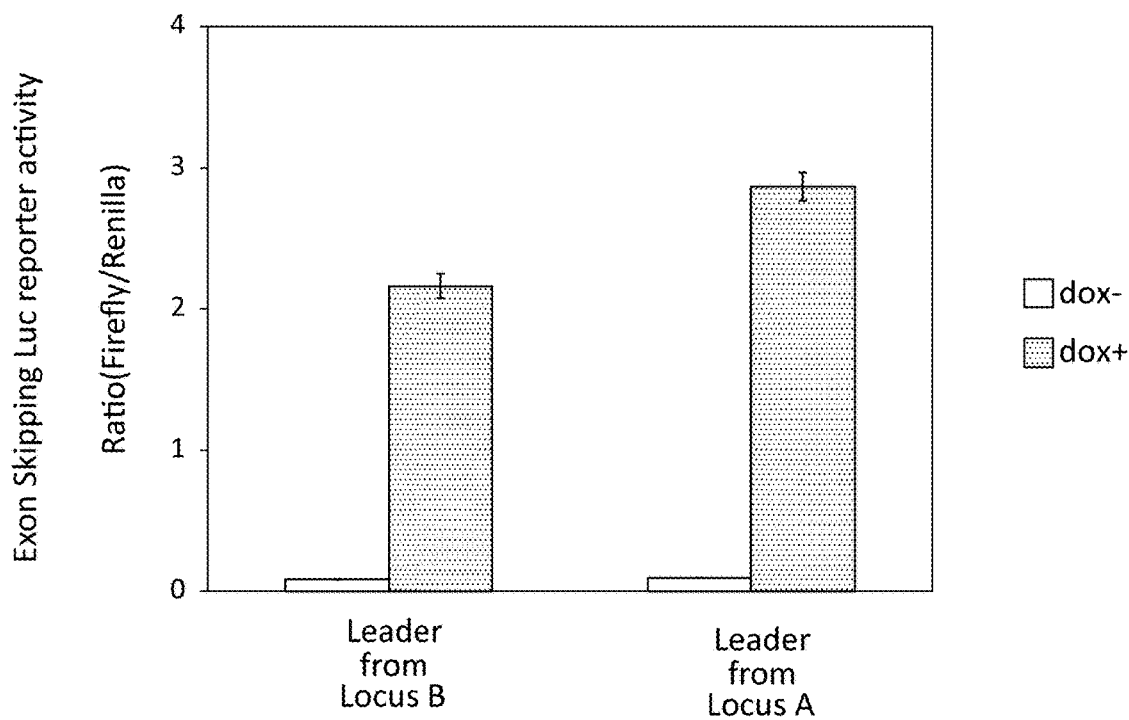
FIG. 35 is a graph showing results of measuring an activity of luciferase in Experimental Example 15.

FIG. 35 is a graph showing results of measuring an activity of Firefly luciferase based on an activity of *Renilla reniformis* luciferase. In FIG. 35, "*Renilla*" represents an activity of *Renilla reniformis* luciferase, "Firefly" represents an activity of Firefly luciferase, "dox-" indicates a sample into which doxycycline was not added, and "dox+" indicates a sample into which doxycycline was added.

As a result, regarding the leader sequences present on the genome of *Escherichia coli*, it was clarified that not only the leader sequence derived from the Locus B but also the leader sequence derived from the Locus A can induce genome cleavage activity in animal cells.

The inventors of the present invention have found for the first time that the leader sequence derived from the Locus A can be used in the type I CRISPR system. Furthermore, since the Locus A is a CRISPR locus derived from *Escherichia coli*, it was thought that the leader sequence derived from the Locus A is preferable in terms of activity than the leader sequence derived from the Locus B.

Experimental Example 16

(Examination of crRNA Repeated Sequence Required for Activation of Type I CRISPR System)

In order for the type I CRISPR system to exhibit high genome editing activity in animal cells, it is preferable to have a leader sequence and a first repeated sequence before a spacer sequence of crRNA.

In order to reduce cost of RNA synthesis, how much crRNA can be shortened while maintaining genome cleavage activity in animal cells was examined. Specifically, the B2M gene on the genome of HEK 293T cells derived from human embryonic kidney was disrupted using crRNA in which a leader sequence and a first repeated sequence were partially or completely deficient.

Figure 36:
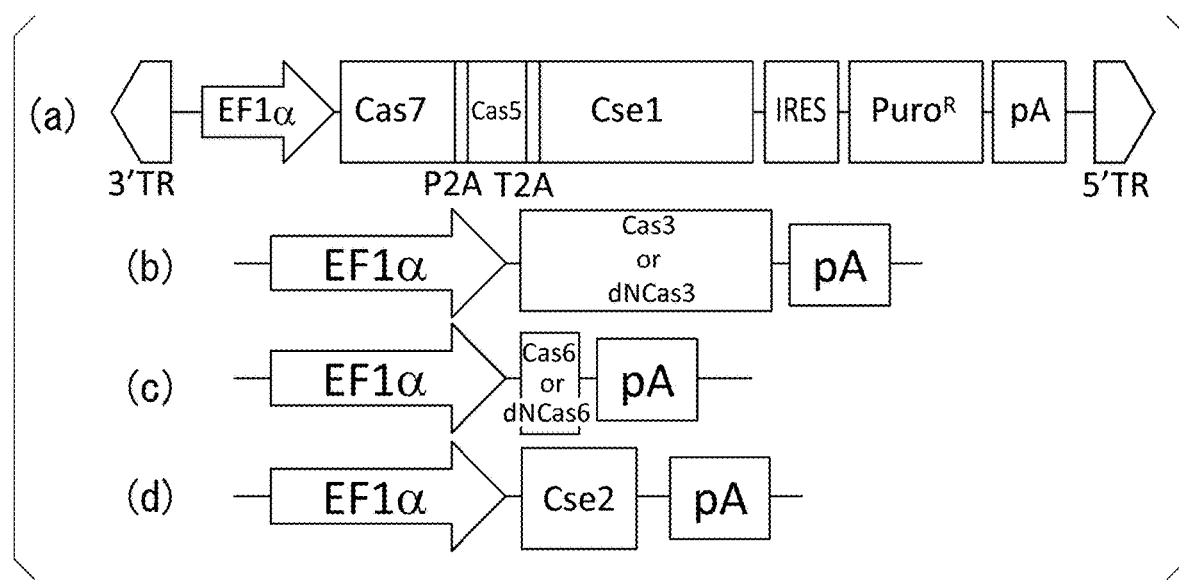
FIGS. 36(a) to 36(d) are schematic diagrams each showing a structure of an expression vector used in Experimental Example 16.

The day before gene introduction, HEK 293T cells were seeded in a 24-well plate at 150,000 cells/well. Subsequently, 600 ng of an expression vector which is for Cas7, Cas5, and Cse1 proteins and has the structure shown in FIG. 36(a), 200 ng of a Cas3 protein expression vector or a dNCas3 protein expression vector, which are expression vectors having the structure shown in FIG. 36(b), 200 ng of a Cas6 protein expression vector or a dNCas6 protein expression vector, which are expression vectors having the structure shown in FIG. 36(c), 200 ng of a Cse2 protein expression vector having the structure shown in FIG. 36(d), and 1,200 ng of any of vectors expressing crRNAs showing base sequences of SEQ ID NOs: 59 to 65 were introduced into the HEK 293T cells using a gene transfection reagent (Lipofectamine™ 2000, Thermo Fisher Scientific™).

Herein, dNCas3 represents a Cas3 protein having an amino acid sequence of SEQ ID NO: 66 (where a base sequence is shown in SEQ ID NO: 67) deficient in DNase activity due to the 82nd histidine mutating to alanine, and dNCas6 represents a Cas6 protein having an amino acid sequence of SEQ ID NO: 68 (where a base sequence is shown in SEQ ID NO: 69) deficient in RNase activity due to the 28th histidine mutating to alanine.

The gene-introduced cells were maintained and cultured for 1 week or longer. Thereafter, the cells were stimulated with IFN-γ at a final concentration of 50 ng/ml from 2 days before immunostaining to induce expression of HLA protein. Subsequently, immunostaining was performed using an anti-human HLA-A2 antibody, and expression of HLA protein was examined. Specifically, the HEK 293T cells were reacted with a mouse anti-human HLA-A2 antibody (#740082, BD Biosciences) labeled with a BV421 fluorescent dye. Thereafter, a proportion of HLA-A2-negative cells was calculated by flow cytometry.

Figure 37:
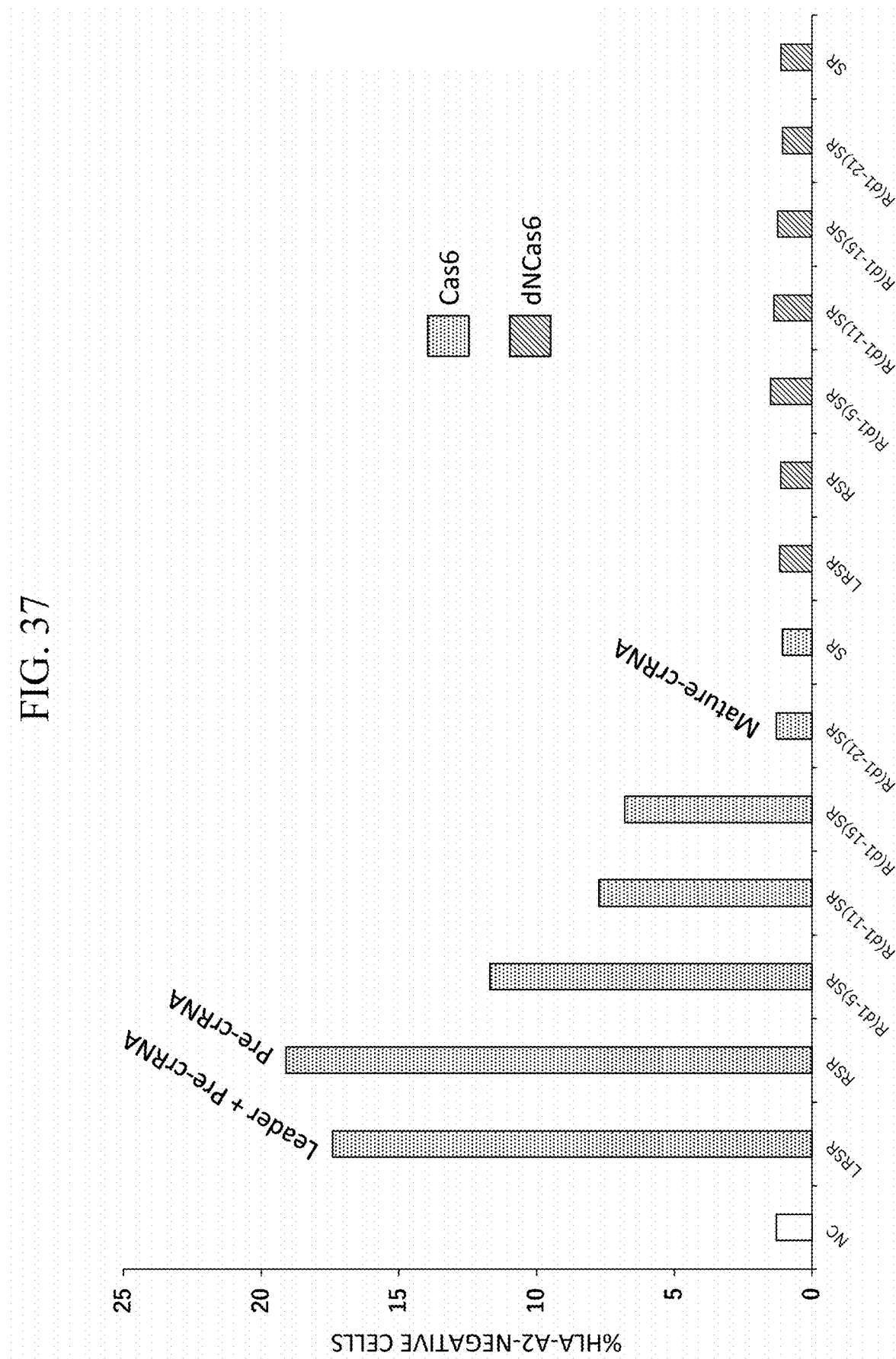
FIG. 37 is a graph showing results of flow cytometry analysis in Experimental Example 16.

FIG. 37 shows graphs showing the results of flow cytometry analysis. In FIG. 37, a vertical axis represents a proportion (%) of cells in which HLA-A2 expression is deleted due to loss of function of the B2M gene. Furthermore, "Cas6" represents the results of analyzing HEK 293T cells subjected to gene introduction with the Cas6 protein expression vector, and "dNCas6" represents the results of analyzing HEK 293T cells subjected to gene introduction with the dNCas6 protein expression vector.

Furthermore, "NC" represents the results of analyzing HEK 293T cells subjected to gene introduction with the dNCas3 protein expression vector. Furthermore, "LRSR" represents the results of analyzing HEK 293T cells that were subjected to gene introduction with the expression vector for crRNA having a full-length leader sequence and a first repeated sequence and showing a base sequence in SEQ ID NO: 59. Furthermore, "RSR" represents the results of analyzing HEK 293T cells that were subjected to gene introduction with the expression vector for crRNA deficient in the leader sequence and showing a base sequence in SEQ ID NO: 60. Furthermore, "R (d1-5) SR" represents the results of analyzing HEK 293T cells that were subjected to gene introduction with the expression vector for crRNA deficient in 5 bases from the 1st to 5th on the 5'-side of the leader sequence and the first repeated sequence and showing a base sequence in SEQ ID NO: 61. Furthermore, "R (d1-11) SR" represents the results of analyzing HEK 293T cells that were subjected to gene introduction with the expression vector for crRNA deficient in 11 bases from the 1st to 11th on the 5'-side of the leader sequence and the first repeated sequence and showing a base sequence in SEQ ID NO: 62.

Furthermore, "R (d1-15) SR" represents the results of analyzing HEK 293T cells that were subjected to gene introduction with the expression vector for crRNA deficient in 15 bases from the 1st to 15th on the 5'-side of the leader sequence and the first repeated sequence and showing a base sequence in SEQ ID NO: 63. Furthermore, "R (d1-21) SR" represents the results of analyzing HEK 293T cells that were subjected to gene introduction with the expression vector for crRNA deficient in 21 bases from the 1st to 21st on the 5'-side of the leader sequence and the first repeated sequence and showing a base sequence in SEQ ID NO: 64. Furthermore, "SR" represents the results of analyzing HEK 293T cells that were subjected to gene introduction with the expression vector for crRNA deficient in the leader sequence and the first repeated sequence and showing a base sequence in SEQ ID NO: 65.

Figure 38:
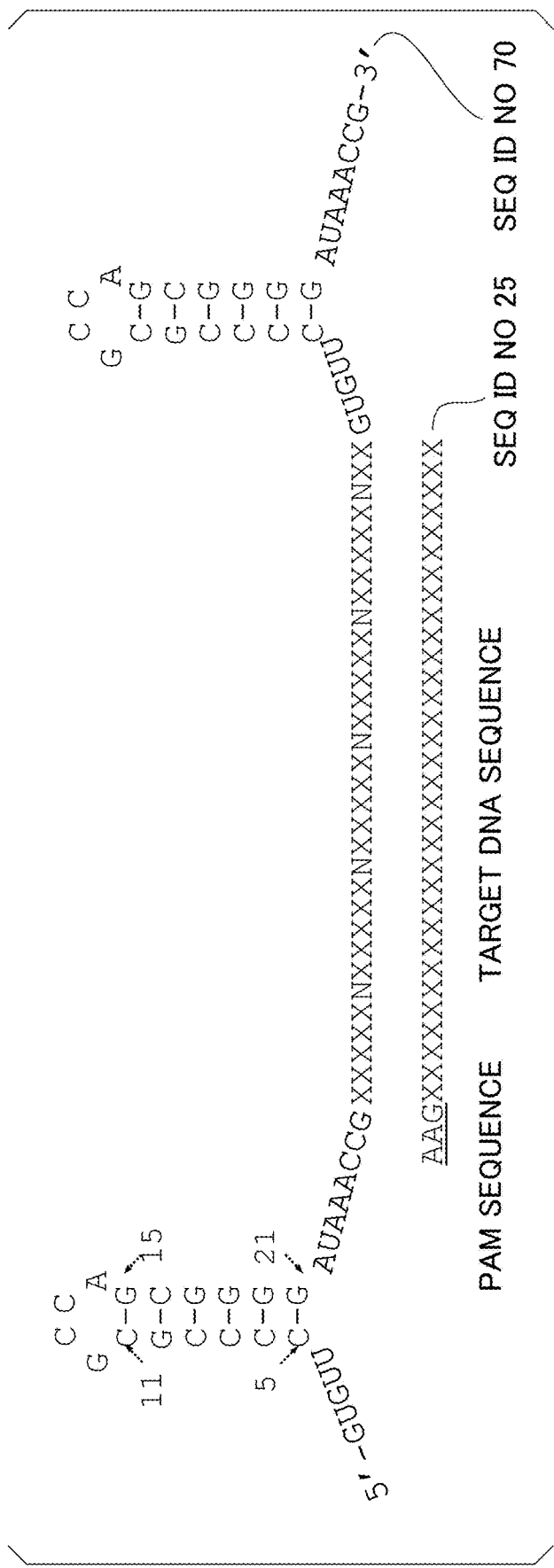
FIG. 38 is a schematic diagram showing a state in which crRNA forms a secondary structure.
Figure 39:
FIGS. 39(a) to 39(e) are schematic diagrams each showing a secondary structure of a repeated sequence of *Escherichia coli*.

Furthermore, FIG. 38 is a schematic diagram showing a state in which crRNA (SEQ ID NO: 70) forms a secondary structure.

As a result, in order for the type I CRISPR system to exhibit high genome editing activity in animal cells, it was clarified that it is preferable to use a crRNA expression vector having at least the 16th and subsequent first repeated sequences from the 5'-side, a spacer sequence that binds to a complementary strand of a target sequence, and a second repeated sequence in this order. Furthermore, it was also clarified that RNase activity of Cas6 protein is essential for the type I CRISPR system to exhibit genome editing activity in animal cells.

In the expression of crRNA, a naturally occurring sequence can be preferably used as the spacer sequence. Furthermore, the inventors of the present invention have examined genomic sequences of *Escherichia coli* (NCBI accession number: U00096.2) and found that they include a repeated sequence group having a secondary structure schematically shown in FIGS. 39(a) to 39(e). It was thought that all of the base sequences (SEQ ID NOS: 71 to 75) shown in FIGS. 39(a) to 39(e) can be used for genome editing as repeated sequences of crRNA.

Experimental Example 17

(Examination of PAM Sequence)

It is known that base sequences of ATG, AAG, AGG, and GAG function in bacteria and in vitro as a PAM sequence of the type I CRISPR system (refer to, for example, Hayes R. P., et al., Structural basis for promiscuous PAM recognition in type I-E Cascade from *E. coli*., Nature, 530 (7591), 499-503, 2016.; Hochstrasser M. L., et al., CasA mediates Cas3-catalyzed target degradation during CRISPR RNA-guided interference, Proc Natl Acad Sci USA., 111(18), 6618-6623, 2014.; Westra E. R., CRISPR immunity relies on the consecutive binding and degradation of negatively supercoiled invader DNA by Cascade and Cas3, Mol Cell., 46 (5), 595-605, 2012.; and the like).

To identify PAM sequences that function to induce genome editing in animal cells, the B2M gene on the genome of HEK 293T cells derived from human embryonic kidney was disrupted using crRNAs having various PAM sequences.

The day before gene introduction, HEK 293T cells were seeded in a 24-well plate at 150,000 cells/well. Subsequently, 1,000 ng of the expression vector of the type I CRISPR system which has the structure shown in FIG. 9(d), and 1,000 ng of any of crRNA expression vectors with base sequences set forth in SEQ ID NOs: 76 to 89 as target sequences were introduced into the HEK 293T cells using a gene transfection reagent (Lipofectamine™ 2000, Thermo Fisher Scientific™).

The gene-introduced cells were maintained and cultured for 1 week or longer. Thereafter, the cells were stimulated with IFN-γ at a final concentration of 50 ng/ml from 2 days before immunostaining to induce expression of HLA protein. Subsequently, immunostaining was performed using an anti-human HLA-A2 antibody, and expression of HLA protein was examined. Specifically, the HEK 293T cells were reacted with a mouse anti-human HLA-A2 antibody (#740082, BD Biosciences) labeled with a BV421 fluorescent dye. Thereafter, a proportion of HLA-A2-negative cells was calculated by flow cytometry.

Figure 40:
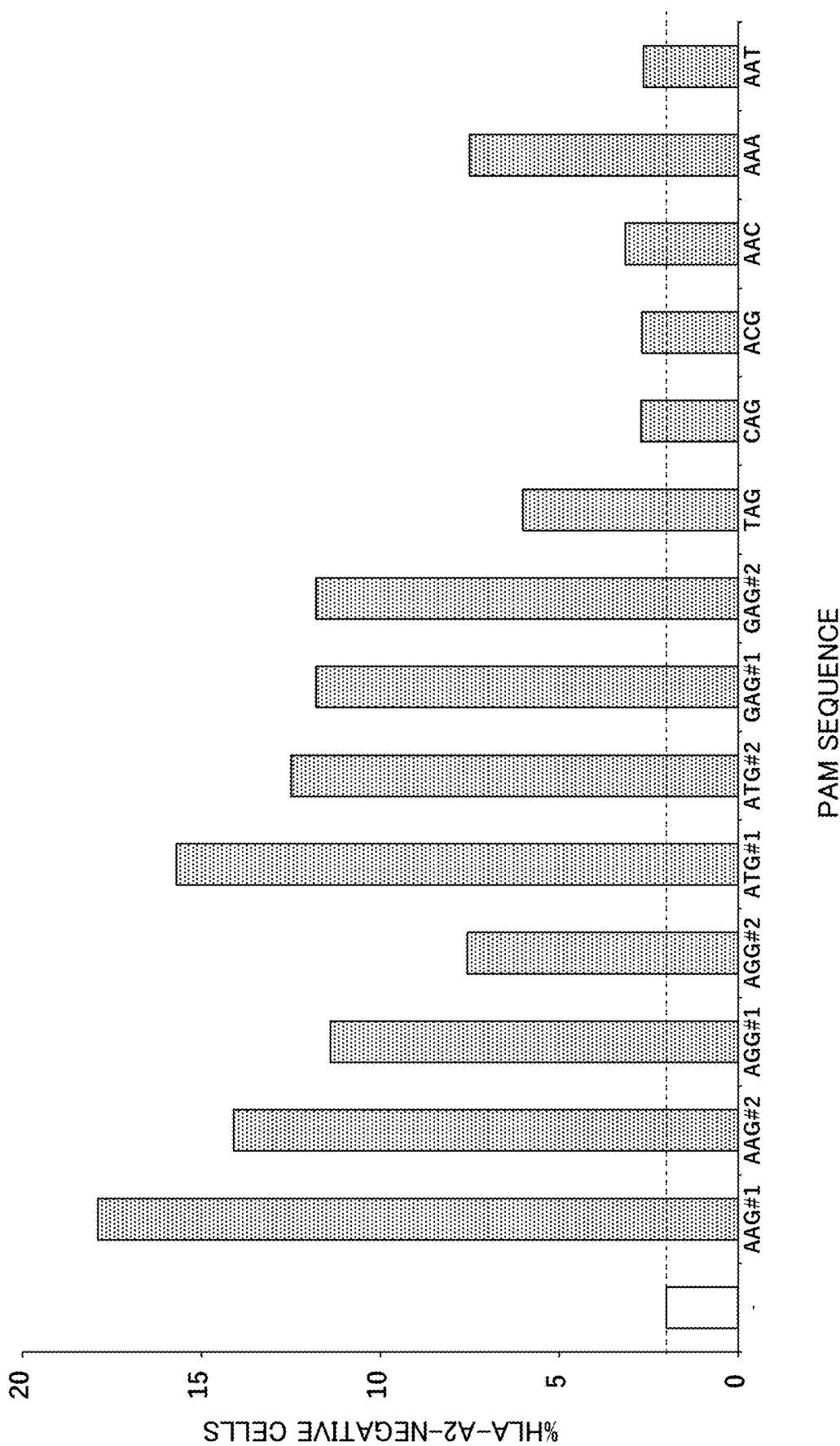
FIG. 40 is a graph showing results of flow cytometry analysis in Experimental Example 17.

FIG. 40 shows graphs showing the results of flow cytometry analysis. In FIG. 40, a vertical axis represents a proportion (%) of cells in which HLA-A2 expression is deleted due to loss of function of the B2M gene. Furthermore, "−" represents the results of analyzing HEK 293T cells subjected to gene introduction with an empty crRNA expression vector that does not target the B2M gene. Furthermore, "AAG #1 and AAG #2" each represent the results of analyzing HEK 293T cells subjected to gene introduction with an expression vector for crRNA having target sequences set forth in SEQ ID NOs: 76 and 77 and having AAG as a PAM sequence. Furthermore, "AGG #1 and AGG #2" each represent the results of analyzing HEK 293T cells subjected to gene introduction with an expression vector for crRNA having target sequences set forth in SEQ ID NOs: 78 and 79 and having AGG as a PAM sequence. Furthermore, "ATG #1 and ATG #2" each represent the results of analyzing HEK 293T cells subjected to gene introduction with an expression vector for crRNA having target sequences set forth in SEQ ID NOs: 80 and 81 and having ATG as a PAM sequence. Furthermore, "GAG #1 and GAG #2" each represent the results of analyzing HEK 293T cells subjected to gene introduction with an expression vector for crRNA having target sequences set forth in SEQ ID NOs: 82 and 83 and having GAG as a PAM sequence. Furthermore, "TAG" represents the results of analyzing HEK 293T cells subjected to gene introduction with an expression vector for crRNA having a target sequence set forth in SEQ ID NO: 84 and having TAG as a PAM sequence. Furthermore, "CAG" represents the results of analyzing HEK 293T cells that were subjected to gene introduction with an expression vector for crRNA having a target sequence set forth in SEQ ID NO: 85 and having CAG as a PAM sequence. Furthermore, "ACG" represents the results of analyzing HEK 293T cells that were subjected to gene introduction with an expression vector for crRNA having a target sequence set forth in SEQ ID NO: 86 and having ACG as a PAM sequence. Furthermore, "AAC" represents the results of analyzing HEK 293T cells that were subjected to gene introduction with an expression vector for crRNA having a target sequence set forth in SEQ ID NO: 87 and having AAC as a PAM sequence. Furthermore, "AAA" represents the results of analyzing HEK 293T cells that were subjected to gene introduction with an expression vector for crRNA having a target sequence set forth in SEQ ID NO: 88 and having AAA as a PAM sequence. Furthermore, "AAT" represents the results of analyzing HEK 293T cells that were subjected to gene introduction with an expression vector for crRNA having a target sequence set forth in SEQ ID NO: 89 and having AAT as a PAM sequence.

As a result, HLA-A2-negative cells could be observed in a case of using the expression vector for crRNA in which a PAM sequence had a base sequence of DDR (where D represents A, G, or T, and R represents A or G). It was clarified that a gene can be deleted more preferably in a case of using an expression vector having a sequence of RDG among them as a PAM sequence. In particular, a system capable of inducing genome editing even when the PAM sequence is a base sequence of "AAA" is not known, and is therefore useful.

Experimental Example 18

(Induction of DMD Multi-Exon Skipping Using Type I CRISPR System)

An examination was conducted using HEK 293T cells that stably express the doxycycline-inducible type I CRISPR system produced in Experimental Example 14.

HEK 293T cells stably expressing the doxycycline-inducible type type I CRISPR system were seeded in a 24-well plate at 100,000 cells/well. Furthermore, doxycycline was added into a medium at a final concentration of 2 μmol/L, and incubated for 1 day.

The next day, 1,000 ng of an expression vector for crRNA targeting the intron 44 of the DMD gene (DMD #19, DMD #20, or DMD #21, where a target sequence of DMD #19 is set forth in SEQ ID NO: 90, a target sequence of DMD #20 is set forth in SEQ ID NO: 91, and a target sequence of DMD #21 is set forth in SEQ ID NO: 92), and 1,000 ng of an expression vector for crRNA targeting the intron 55 of the DMD gene (DMD #22, DMD #23, or DMD #24, where a target sequence of DMD #22 is set forth in SEQ ID NO: 93, a target sequence of DMD #23 is set forth in SEQ ID NO: 94, and a target sequence of DMD #24 is set forth in SEQ ID NO: 95) were introduced into the HEK 293T cells using a gene transfection reagent (Lipofectamine™ 2000, Thermo Fisher Scientific™).

After the gene-introduced cells were maintained and cultured for 3 days, genomic DNA was purified from the bulk HEK 293T cells using a commercially available kit (MonoFas Genomic DNA Cultured Cells Extraction Kit VI, GL Sciences Inc.).

Subsequently, PCR was performed with Quick Taq™ HS DyeMix (TOYOBO CO., LTD.) using an exon 45-side primer (Primer-DMD-Int44-YK #114, SEQ ID NO: 96) and an exon 55-side primer (Primer-DMD-Int55-YK #116, SEQ ID NO: 97).

Figure 41:
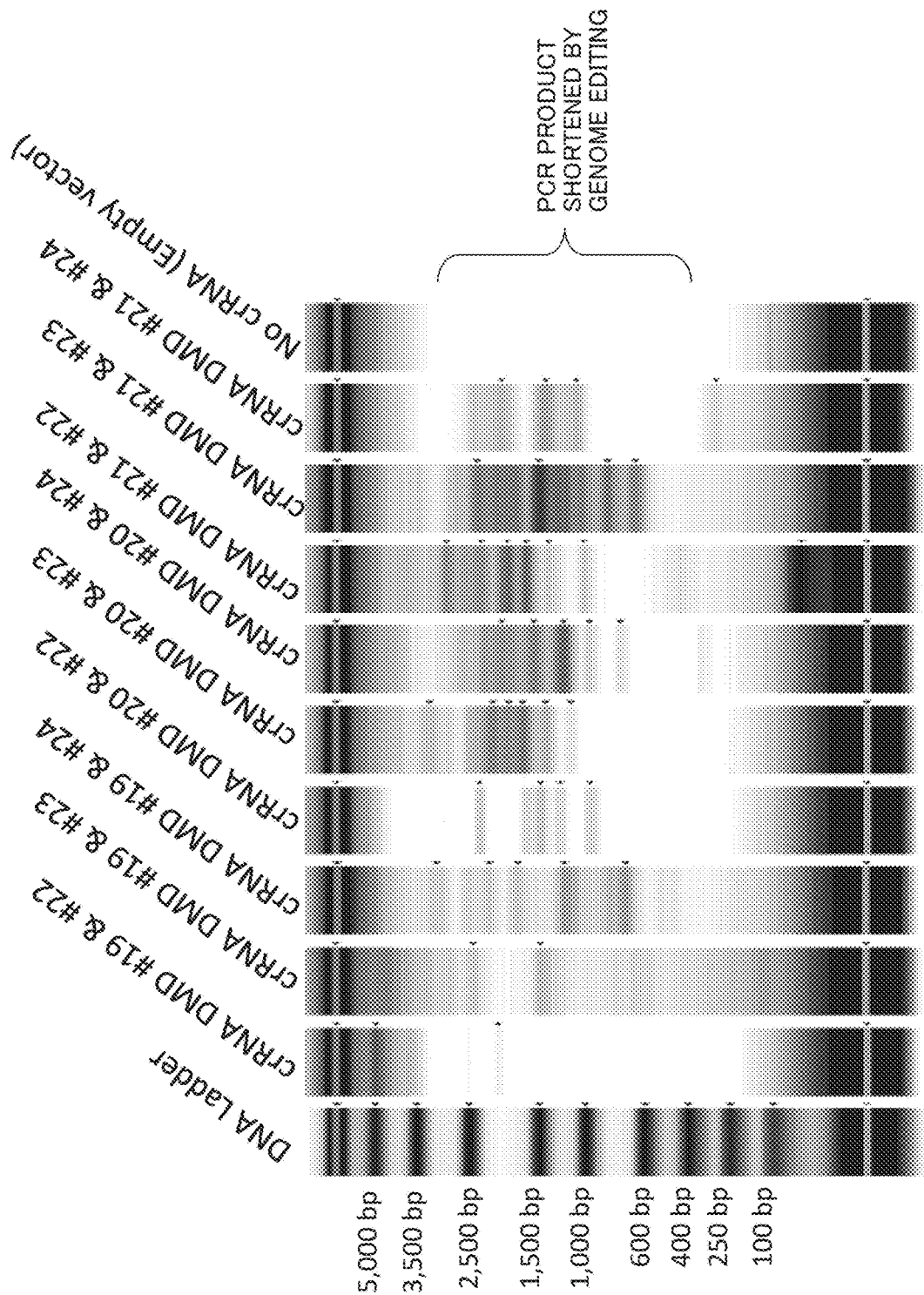
FIG. 41 is an image showing results of analyzing PCR products in Experimental Example 18.

FIG. 41 is an image showing the results of electrophoresis of the PCR product obtained above with TapeStation D5000 (Agilent Technologies, Inc.). As a result, a plurality of bands, which were thought to be bands in which a deletion occurred by the type I CRISPR system and a molecular weight of the amplified product was reduced than that of the wild type, was confirmed.

Subsequently, PCR was performed with Quick Taq™ HS DyeMix (TOYOBO CO., LTD.) using an exon 45-side primer (Primer-DMD-Int44-YK #110, SEQ ID NO: 98) and an exon 55-side primer (Primer-DMD-Int55-YK #107, SEQ ID NO: 99), and agarose electrophoresis was performed. Subsequently, among the PCR products of the sample that had been subjected to gene introduction with "crRNA (DMD #21)" and "crRNA (DMD #23)," a DNA band of about 2.3 kb or less and 0.5 kb or more was excised from an agarose gel, and a DNA fragment was purified. The obtained PCR product was TA cloned, and using the obtained colonies, base sequence analysis was performed by Sanger sequence.

Figure 42:
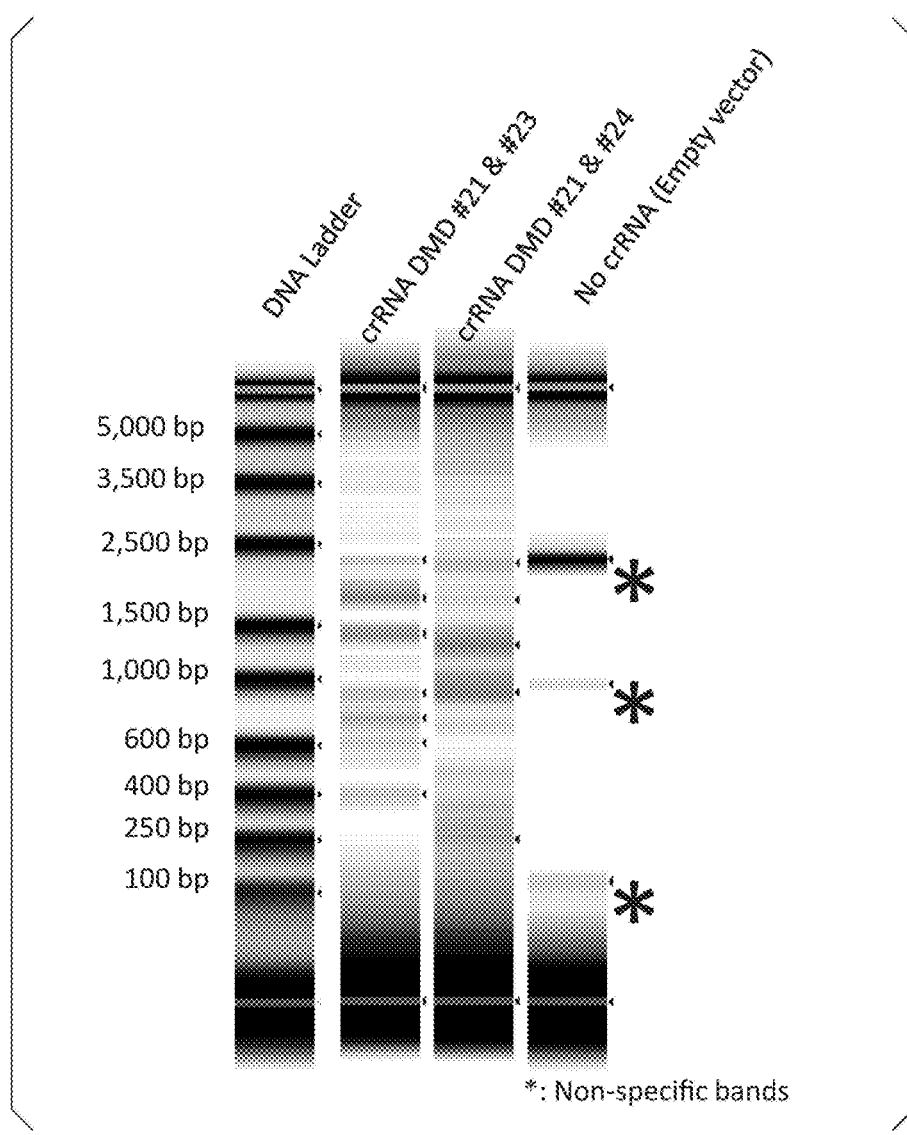
FIG. 42 is an image showing results of analyzing PCR products in Experimental Example 18.

FIG. 42 is an image showing the results of analyzing the same PCR product as that were subjected to agarose gel electrophoresis by electrophoresis on a D5000 tape using TapeStation (Agilent Technologies, Inc.). As a result, a plurality of bands, which were thought to be bands in which a deletion occurred by the type I CRISPR system and a molecular weight of the amplified product was reduced than that of the wild type, was confirmed.

FIG. 43 is a diagram showing the results of aligning the analyzed base sequences with respect to a base sequence of human DMD by using software (Integrative Genomics Viewer (IGV), software.broadinstitute.org/software/igv/). In FIG. 43, "exon45" and "exon55" each represent the exon number of the DMD gene and its region, "Primer (Int44-YK #110)" and "Primer (Int55-YK #107)" each represent an approximate position of a primer, which was used for PCR amplification, at the DMD locus, "crRNA (DMD #21)" and "crRNA (DMD #23)" each represent an approximate position of crRNA, which was used for large-scale deficiency, at the DMD locus, and "#1-1" to "#18" on the left side each indicate the *Escherichia coli* clone number obtained by TA cloning. Furthermore, the region at which the sequence results of the Sanger sequencing was aligned (mapped) with the DMD locus is indicated by a rectangle, and a DNA deletion region is indicated by a straight line including an arrow.

As a result, it was confirmed that 30 sequences out of the sequenced 40 colonies were aligned with the base sequence of human DMD. It was clarified that, for 27 sequences among them, a base sequence spanned a range of both the vicinity of the exon 45 and the vicinity of exon 55. Furthermore, for one sequence, a base sequence was aligned only in the vicinity of the exon 45. Furthermore, for two sequences, a base sequence was aligned only in the vicinity of the exon 55.

As a result, it was clarified that by using the type I CRISPR system and further using two kinds of crRNAs with cleave directions facing inward, a large-scale deficiency between the exon 45 to exon 55 regions of the DMD gene, that is, deficiency of 340 kb or more can be introduced into the genome.

INDUSTRIAL APPLICABILITY

According to the present invention, it is possible to provide a technique of efficiently introducing a deletion of more than 100 bases of nucleotides into a target region of genomic DNA in cells including stem cells (particularly preferably pluripotent stem cells, and further preferably induced pluripotent stem cells).

The invention claimed is:

1. A production method of an induced pluripotent stem (iPS) cell in which genomic DNA is modified, the method comprising:
   introducing Cse1 protein, Cse2 protein, Cas7 protein, Cas5 protein, Cas6 protein, and Cas3 protein into the iPS cell in the form of an expression vector or an mRNA; and
   contacting a type I CRISPR associated complex for anti-viral defense (type I Cascade complex), CRISPR RNA (crRNA), and the Cas3 protein with the genomic DNA of the iPS cell,
   wherein the type I Cascade complex consists of the Cse1 protein, the Cse2 protein, the Cas7 protein, the Cas5 protein, and the Cas6 protein,
   wherein the expression vector is for expressing three proteins selected from the group consisting of the Cse1 protein, the Cse2 protein, the Cas7 protein, the Cas5 protein, the Cas6 protein, and the Cas3 protein by one promoter,
   wherein the mRNA is for expressing three proteins selected from the group consisting of the Cse1 protein, the Cse2 protein, the Cas7 protein, the Cas5 protein, the Cas6 protein, and the Cas3 protein as individual proteins from a single mRNA.

2. The production method according to claim 1, wherein a target region of the crRNA is in a β2-microglobulin (B2M) gene or a regulatory region thereof, or vicinities thereof; a Human Leukocyte Antigen (HLA) gene or a regulatory region thereof, or vicinities thereof; or a dystrophin (DMD) gene or a regulatory region thereof, or vicinities thereof.

3. The production method according to claim 1, wherein a deletion of more than 100 bases of nucleotides is introduced into a target region of the genomic DNA.

* * * * *